US009911034B2

(12) United States Patent
Chulinin

(10) Patent No.: US 9,911,034 B2
(45) Date of Patent: *Mar. 6, 2018

(54) METHODS AND SYSTEMS THAT USE HIERARCHICALLY ORGANIZED DATA STRUCTURE CONTAINING STANDARD FEATURE SYMBOLS IN ORDER TO CONVERT DOCUMENT IMAGES TO ELECTRONIC DOCUMENTS

(71) Applicant: ABBYY Development LLC, Moscow (RU)

(72) Inventor: Yury Georgievich Chulinin, Moscow (RU)

(73) Assignee: ABBYY DEVELOPMENT LLC, Moscow (RU)

(*) Notice: Subject to any disclaimer, the term of this patent is extended or adjusted under 35 U.S.C. 154(b) by 0 days.

This patent is subject to a terminal disclaimer.

(21) Appl. No.: 14/781,656

(22) PCT Filed: Jun. 18, 2013

(86) PCT No.: PCT/RU2013/000515
§ 371 (c)(1),
(2) Date: Oct. 1, 2015

(87) PCT Pub. No.: WO2014/204338
PCT Pub. Date: Dec. 24, 2014

(65) Prior Publication Data
US 2016/0267323 A1   Sep. 15, 2016

(51) Int. Cl.
*G06K 9/00* (2006.01)
*G06K 9/68* (2006.01)
*G06K 9/72* (2006.01)

(52) U.S. Cl.
CPC ....... *G06K 9/00463* (2013.01); *G06K 9/6814* (2013.01); *G06K 9/6842* (2013.01); *G06K 9/723* (2013.01); *G06K 2209/01* (2013.01)

(58) Field of Classification Search
CPC .... G06F 17/275; G06F 3/018; G06F 17/2223; G06F 17/2863; G06K 2209/01;
(Continued)

(56) References Cited

U.S. PATENT DOCUMENTS 5,528,701 A * 6/1996 Aref ................... G06K 9/00879
382/178
5,621,859 A * 4/1997 Schwartz .............. G10L 15/142
704/256

(Continued)

FOREIGN PATENT DOCUMENTS

RU   2216767 C2   11/2003

OTHER PUBLICATIONS

Atici, A. Alper, and Fatos T. Yarman-Vural. "A heuristic algorithm for optical character recognition of Arabic script." Signal processing 62.1 (1997): 87-99.*

(Continued)

*Primary Examiner* — Aaron W Carter
(74) *Attorney, Agent, or Firm* — Lowenstein Sandler LLP

(57) ABSTRACT

The current application is directed to methods and systems that convert document images, which contain Arabic text and text in other languages in which symbols are joined together to produce continuous words and portions of words, into corresponding electronic documents. In one implementation, a document-image-processing method and system to which the current application is directed employs numerous techniques and features that render efficiently computable an otherwise intractable or impractical document-image-to-electronic-document conversion. These techniques and features include transformation of text-image morphemes and words into feature symbols with associated parameters, efficiently identifying similar morphemes and words in an electronic store of standard-feature-symbol-encoded mor- (Continued)

phemes and words, and identifying candidate inter-character division points and corresponding traversal paths using the similar morphemes and words identified in the word store.

20 Claims, 65 Drawing Sheets

(58) Field of Classification Search
CPC .. G06K 9/00442; G06K 9/00456; G06K 9/72; G06K 9/344; G06K 9/00; G06K 2209/013; G06K 9/00852; G06K 9/00859; G06K 9/00865; H04N 1/00331
USPC .... 382/182, 185–187, 224, 226, 229; 704/8, 704/9
See application file for complete search history.

(56) References Cited

U.S. PATENT DOCUMENTS

| | | | | |
|---|---|---|---|---|
| 9,633,256 | B2* | 4/2017 | Chulinin | G06K 9/00456 |
| 9,710,704 | B2* | 7/2017 | Panferov | G06K 9/00483 |
| 2003/0190077 | A1* | 10/2003 | Ross | G06F 17/30592 382/229 |
| 2007/0225977 | A1 | 9/2007 | Emam | |
| 2007/0294199 | A1 | 12/2007 | Nelken et al. | |
| 2008/0270115 | A1 | 1/2008 | Emam | |
| 2012/0321175 | A1* | 12/2012 | Hedau | G06K 9/6231 382/159 |
| 2014/0023275 | A1* | 1/2014 | Krishna Kumar | G06K 9/58 382/182 |
| 2014/0169678 | A1* | 6/2014 | Chulinin | G06K 9/46 382/195 |
| 2015/0169995 | A1* | 6/2015 | Panferov | G06K 9/00463 382/182 |
| 2015/0213313 | A1* | 7/2015 | Chulinin | G06K 9/00456 382/182 |
| 2015/0213330 | A1* | 7/2015 | Chulinin | G06F 17/2863 382/185 |
| 2016/0048728 | A1* | 2/2016 | Chulinin | G06K 9/00456 382/185 |
| 2016/0063323 | A1* | 3/2016 | Isupov | G06K 9/00476 382/200 |
| 2016/0098597 | A1* | 4/2016 | Chulinin | G06K 9/00463 382/112 |
| 2016/0147747 | A1* | 5/2016 | Chulinin | G06F 17/2241 704/7 |
| 2016/0188541 | A1* | 6/2016 | Chulinin | G06K 9/00463 704/8 |
| 2016/0217123 | A1* | 7/2016 | Chulinin | G06K 9/03 |
| 2016/0247019 | A1* | 8/2016 | Chulinin | G06K 9/00456 |
| 2016/0267323 | A1* | 9/2016 | Chulinin | G06K 9/00463 |

OTHER PUBLICATIONS

Borovikov, Eugene, and Ilya Zavorin. "A multi-stage approach to Arabic document analysis." Guide to OCR for Arabic scripts. Springer London, 2012. 55-78.*

Maddouri, S. Snoussi, and Hamid Amiri. "Combination of local and global vision modelling for arabic handwritten words recognition." Frontiers in Handwriting Recognition, 2002. Proceedings. Eighth International Workshop on. IEEE, 2002.*

Kim, et al: "Utilization of Hierarchical, Stochastic Relationship Modeling for Hangul Character Recognition", Pattern Analysis and Machine Intelligence, IEEE Transactions on, IEEE Service Center, Los Alamitos, CA, US, vol. 26, No. 9, Sep. 1, 2004 (Sep. 1, 2004), pp. 1185-1196, XP011115615, ISSN: 0162-8828, DOI: 10.1109/TPAMI.2004.74.

Belaid, et al: "Human Reading Based Strategies for Off-Line Arabic Word Recognition", Sep. 27, 2006 (Sep. 27, 2006), Arabic and Chinese Handwriting Recognition; [Lecture Notes in Computer Science]. Springer Berlin Heidelberg, Berlin, Heidelberg, p. 36-56, XP019087062, ISBN: 978-3-540-78198-1.

R.G. Casey et al: "A survey of methods and strategies in character segmentation", IEEE Transactions on Pattern Analysis and Machine Intelligence, vol. 18. No. 7, Jul. 1, 1996 (Jul. 1, 1996), pp. 690-706, XP055087686, ISSN: 0162-8828, DOI: 10.1109/34.506792.

International Search Report for Application No. PCT/RU2013/000513 dated Apr. 22, 2014, 6 pages.

International Search Report for Application No. PCT/RU2013/000515 dated Nov. 4, 2014, 5 pages.

L. Likforman-Sulem et al.: "Chapter 6."Features for HMM-Based Arabic Handwritten Word Recognition Systems"" In: V. Margner et al. (Eds.): "Guide to OCR for Arabic Scripts", 2012. Springer Verlag, XP002721822, pp. 123-143, Section 6.3. "Features for Grapheme-Based Systems".

Dengel A et al: "Chapter 8: Techniques for Improving OCR Results" In: Bunke H 0; Wang P S P: "Handbook of character recognition and document image analysis", Jan. 1, 1997 (Jan. 1, 1997), Handbook of Character Recognition and Document Image Analysis, World Scientific, Singapore [U.A.]. XP002402960, ISBN: 978-981-2-2270-3 pp. 227-258, Section 3.2. "Top-down Methods".

Russian Office Action for Russian Application No. 2015155360/08 (085423), dated Jun. 22, 2017, 14 pages.

A. Atici et al "A heuristic algorithm for optical character recognition of Arabic script" Signal processing, Elsevier Science publishers B.V. Amsterdam, Oct. 1, 1997, pp. 87-99.

E. Borovikov et al "A Multi-stage Approach to Arabic Scripts Document Analysis" Guide to OCR for Arabic Scripts, 2012, pp. 55-76.

* cited by examiner

<My goal was supposed to be a math teacher, however, I ended up to be hired by a personal computer company.>

Taking programing classes in my college and purchasing a microcomputer seemed to be a trigger for working with a computer. One day, when I got news that a new, high performance computer had been on r sale, I chose the computer company as a part time job. The job was to answer to customer's questions in the show room, and I was allowed to use those computers anytime when I had nothing to do.

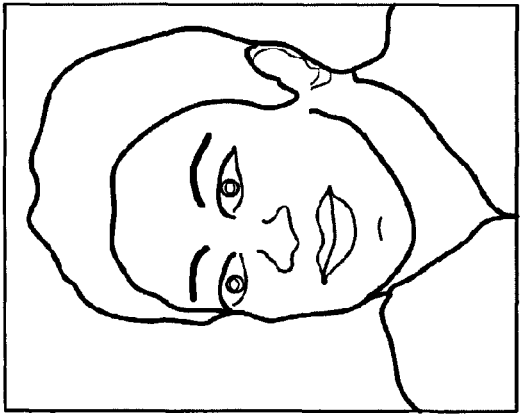

Fall Down
Seven Times,
Get up Eight

Handmade Search Engine
by Grope

"You soon get tired of one thing. I wonder how you can keep taking care of high school students by three years as a teacher", one day an executive of the company said, which made me sense certainly. Then, I made a decision to get a job in the company.It was a small venture business where I was working for. While working there being given a lot of different roles at the developmental fields, every day was absolutely fulfillment for me. The company was happened to be sold by TOSHIBA, Inc., when it was my tenth year. If you work for a corporation, your goal should be getting a position as "president". However, TOSHIBA had more than thirty executives; many of them were so smart people, it was totally impossible for me to be the president.

Born in Tokyo in 1957. Graduate from Tokyo University of Science in 1979, got employed by Sword Machine Systems. Moving to Soft Bank Laboratory, Soft Bank, then funded Yahoo Inc, in January 1996. President & CEO Yahoo Inc from January 1996. Jazz music and reading science fiction as hobby and interest. His current favorite is "Perry Rhodan Universe Hero", which has been written by multiple writers novel relay in Germany.

FIG. 1B

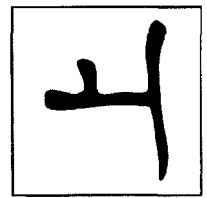 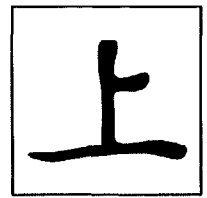 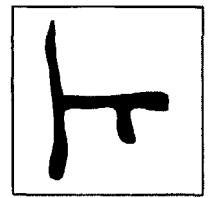 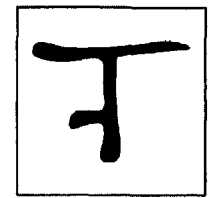
1702
0 1 1 0 0 0 1 1 = 99
1 1 0 0 0 1 1 0 = 198
0 1 1 0 1 1 0 0 = 108
0 0 1 1 0 1 1 0 = 54
1704
1706
FIG. 17

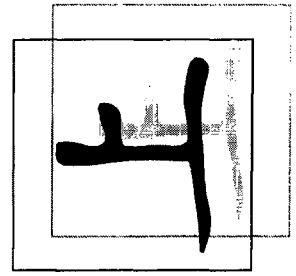
% overlap = 6
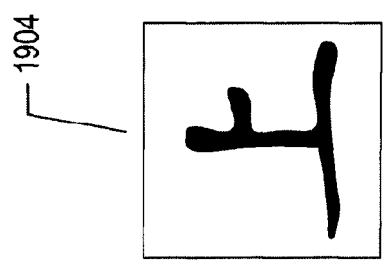
1904
% overlap = 100
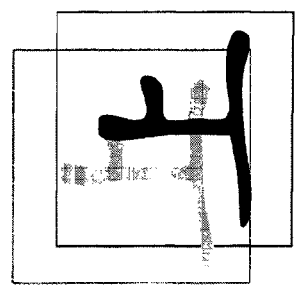
% overlap = 4
FIG. 19B

FIG. 22

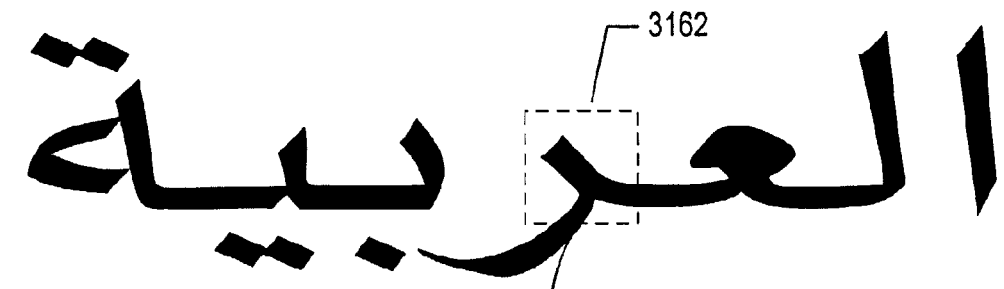
FIG. 31J
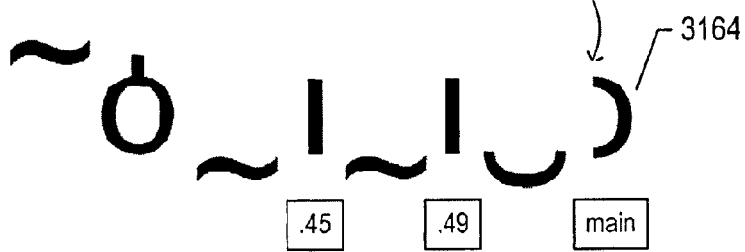
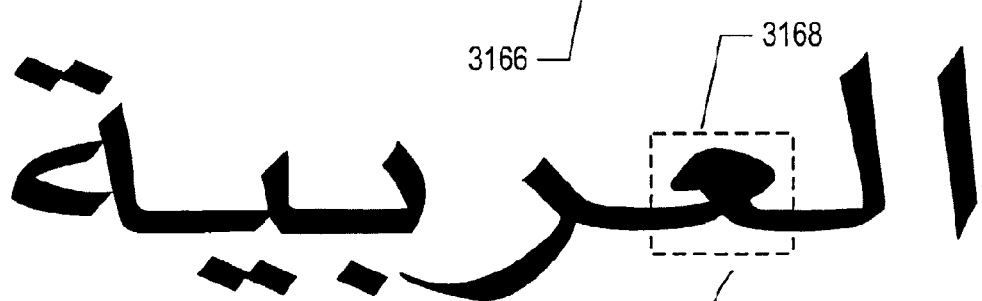
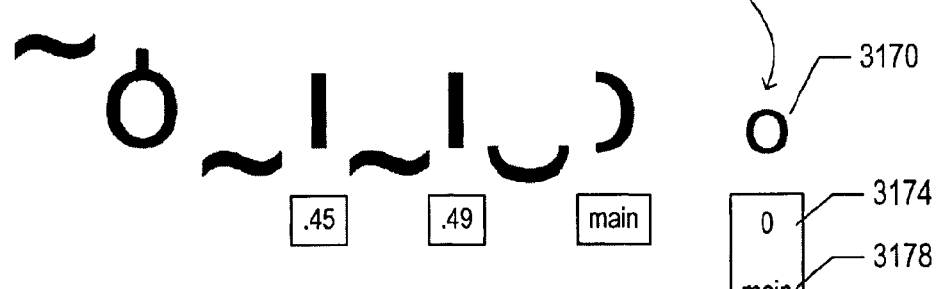
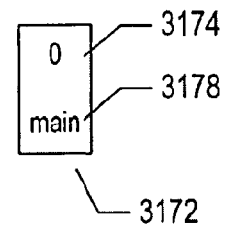
FIG. 31K

| Arabic script feature | feature symbol | symbol name | parameter(s) | symbol encoding |
|---|---|---|---|---|
| ﹏ | ~ | upper diacritical | | DIACRITIC, Top |
| ⊲ | ȯ | peak/loop | | PEAK_LOOP |
| ⁓ | ~ | lower diacritical | | DIACRITIC, Bottom |
| لد | I | peak | relative height | PEAK |
| ⌣ | ⌣ | crater | | CRATER |
| ⟩ | ) | right crater | position | RIGHT_CRATER |
| ⟨ | ( | left crater | position | LEFT_CRATER |
| 𝟐 | O | loop | size of opening; presence/absence of opening; position | LOOP |

FIG. 32

| trie → trie ↓ | ~ | ⁓⁓ | ~ | ǀ | ◡ | ) |
|---|---|---|---|---|---|---|
| ~ | 0 | ⁓⁓ | 50 | 70 | 100 | 100 |
| ⁓⁓ | ⁓⁓ | ⁓⁓ | ⁓⁓ | ⁓⁓ | ⁓⁓ | ⁓⁓ |
| ~ | 50 | ⁓⁓ | 0 | 70 | 25 | 100 |
| ǀ | 70 | ⁓⁓ | 70 | 0 | 100 | 25 |

FIG. 37B

METHODS AND SYSTEMS THAT USE HIERARCHICALLY ORGANIZED DATA STRUCTURE CONTAINING STANDARD FEATURE SYMBOLS IN ORDER TO CONVERT DOCUMENT IMAGES TO ELECTRONIC DOCUMENTS

TECHNICAL FIELD

The current application is directed to automated processing of scanned-document images and other text-containing images and, in particular, to methods and systems that convert document images of documents containing Arabic text, and text in other languages in which alphabetic symbols are continuously linked together to form words, into electronic documents.

BACKGROUND

Printed, typewritten, and handwritten documents have long been used for recording and storing information. Despite current trends towards paperless offices, printed documents continue to be widely used in commercial, institutional, and home environments. With the development of modern computer systems, the creation, storage, retrieval, and transmission of electronic documents has evolved, in parallel with continued use of printed documents, into an extremely efficient and cost-effective alternative information-recording and information-storage medium. Because of advantages in efficiency and cost effectiveness enjoyed by modern electronic-document-based information storage and information transactions, printed documents are routinely converted into electronic documents by various methods and systems, including conversion of printed documents into digital scanned-document images using electro-optico-mechanical scanning devices, digital cameras, and other devices and systems followed by automated processing of the scanned-document images to produce electronic documents encoded according to one or more of various different electronic-document-encoding standards. As one example, it is now possible to employ a desktop scanner and sophisticated optical-character-recognition ("OCR") programs running on a personal computer to convert a printed-paper document into a corresponding electronic document that can be displayed and edited using a word-processing program.

While modern OCR programs have advanced to the point that complex printed documents, which include pictures, frames, line boundaries, and other non-text elements as well as text symbols of any of many common alphabet-based languages, can be automatically converted to electronic documents, challenges remain with respect to conversion of printed documents containing Arabic text and text in other languages in which symbols are joined to together, in continuous fashion, to produce words and portions of words.

SUMMARY

The current application is directed to methods and systems that convert document images, which contain Arabic text and text in other languages in which symbols are joined together to produce continuous words and portions of words, into corresponding electronic documents. In one implementation, a document-image-processing method and system to which the current application is directed employs numerous techniques and features that render efficiently computable an otherwise intractable or impractical document-image-to-electronic-document conversion. These techniques and features include transformation of text-image morphemes and words into feature symbols with associated parameters, efficiently identifying similar morphemes and words in an electronic store of feature-symbol-encoded morphemes and words, and identifying candidate inter-character division points and corresponding traversal paths using the similar morphemes and words identified in the word store.

BRIEF DESCRIPTION OF THE DRAWINGS

FIGS. 1A-B illustrate a printed document.

FIGS. 15-17 illustrate one computational approach to determining the identity and orientation of the symbol within a symbol image.

FIGS. 20A-13 illustrate a type of classifier that may be used to generate hypotheses with respect to resolving an image of a line of text into a sequence of symbol images.

FIG. 22 illustrates certain characteristics of Arabic-like text.

FIGS. 31A-M illustrate transformation of a morpheme or word extracted from a text-line image into a sequence of feature symbols with associated parameters.

FIG. 32 illustrates the set of features that can be extracted from Arabic-like text in the described implementation.

FIGS. 37A-B show portions of table of penalties used in searching a trie with feature-symbol-encoded entries for words and morphemes similar to an input sequence of feature symbols with associated parameters.

DETAILED DESCRIPTION

The current application is directed to methods and systems, that employ the methods, involved with optical character recognition. En the current application, the methods and systems to which the current application is directed are described using control-flow diagrams and various illustrated examples. As those familiar with modern science and technology well appreciate, optical character recognition involves transforming digitally encoded document images into electronic documents and storing the electronic documents in electronic memories and mass-storage subsystems with a computer system. These operations involve physical changes within the physical data-storage components. These physical changes, like all physical changes, can be described in terms of thermodynamic state variables, including enthalpy and entropy, and occur over time intervals. Computationally efficient optical-character-recognition systems are generally associated with either or both of lower energy consumption and smaller operational latencies. Thus, optical character recognition is tangible, physical process involving physical transformations that can be characterized by power consumption, changes in thermodynamic state variables, and durations. It is common to describe the control of physical processes, including the operation of computer systems, using mathematical expressions and/or actual computer code or pseudocode. However, these representations are employed to describe physical processes associated with physical changes within a computer system controlled by computer instructions as well as within other objects and systems that electronically communicate with the computer system.

The current application is directed to methods and systems that convert document images to corresponding electronic documents, where the document images contain Arabic text or text in other languages in which symbols are joined together to form word parts and words. Various dialects of Arabic and other languages in which the alphabetic symbols within printed text are joined together, as letters are joined together in cursive English and Russian, are referred to below as "Arabic-like languages." In the following discussion, scanned-document images and electronic documents are first introduced, followed by a discussion of techniques for general orientation of text-containing scanned-document-image regions. A second subsection discusses currently available OCR methods and systems. A third subsection discusses challenges with respect to converting document images containing Arabic-like text into electronic documents. Finally, a detailed description of the methods and systems to which the current application is directed is provided in a fourth subsection.

Scanned Document Images and Electronic Documents

Figure 1A:
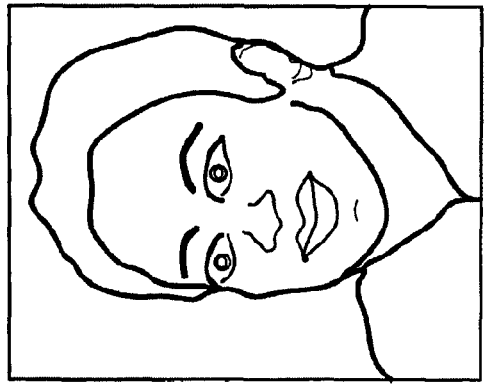

FIGS. 1A-B illustrates a printed document. FIG. 1A shows the original document with Japanese text. The printed document 100 includes a photograph 102 and five different text-containing regions 104-108 that include Japanese characters. This is an example document used in the following discussion of the method and systems for text-image orientation. The Japanese text may be written in left-to-right fashion, along horizontal rows, as English is written, but may alternatively be written in top-down fashion within vertical columns. For example, region 107 is clearly written vertically while text block 108 includes text written in horizontal rows. FIG. 1B shows the printed document illustrated in FIG. 1A translated into English.

Figure 2:
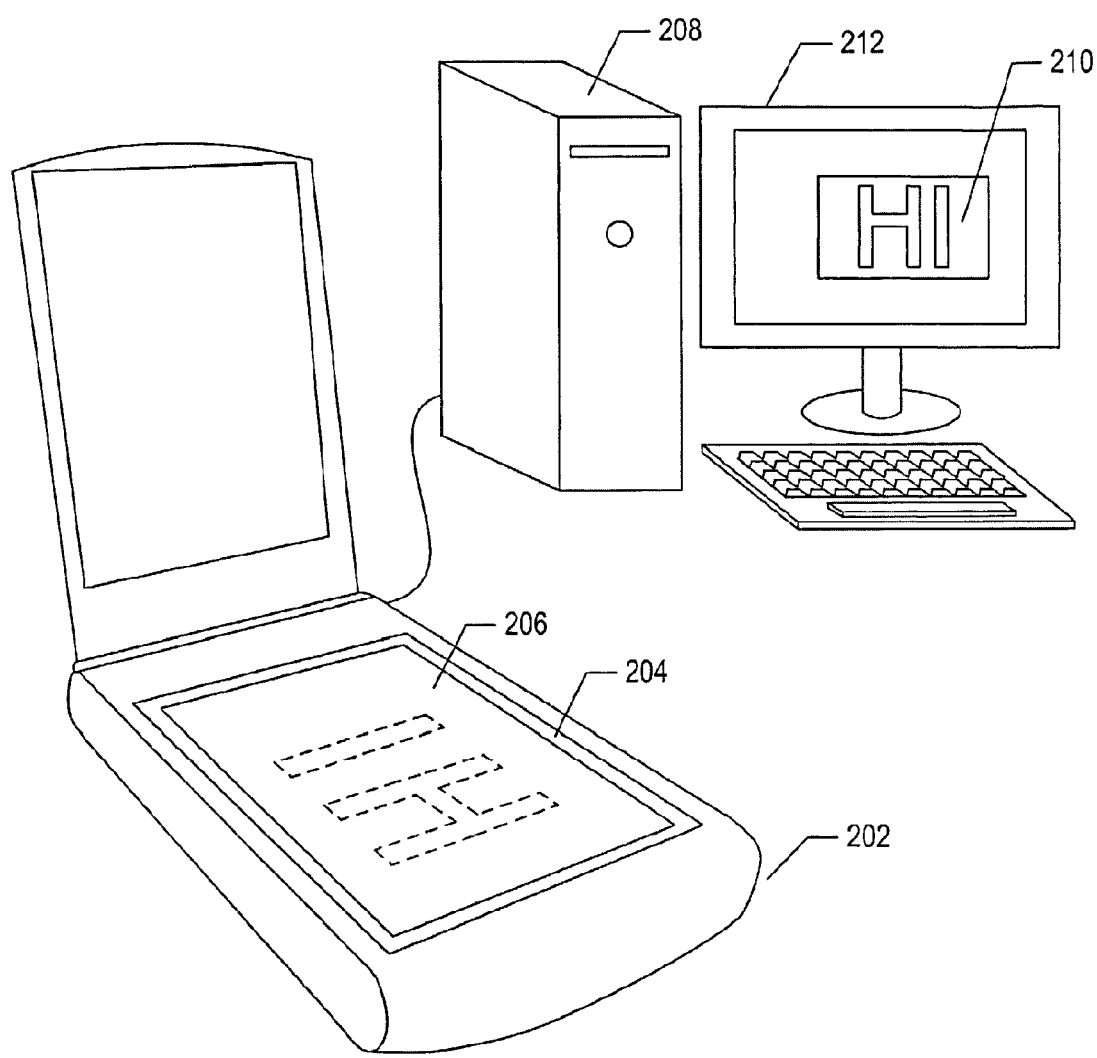
FIG. 2 illustrates a typical desktop scanner and personal computer that are together used to convert printed documents into digitally encoded electronic documents stored in mass-storage devices and/or electronic memories.

Printed documents can be converted into digitally encoded, scanned-document images by various means, including electro-optico-mechanical scanning devices and digital cameras. FIG. 2 illustrates a typical desktop scanner and personal computer that are together used to convert printed documents into digitally encoded electronic documents stored in mass-storage devices and/or electronic memories. The desktop scanning device 202 includes a transparent glass bed 204 onto which a document is placed, face down 206. Activation of the scanner produces a digitally encoded scanned-document image which may be transmitted to the personal computer ("PC") 208 for storage in a mass-storage device. A scanned-document-image-rendering program may render the digitally encoded scanned-document image for display 210 on a PC display device 212.

Figure 3:
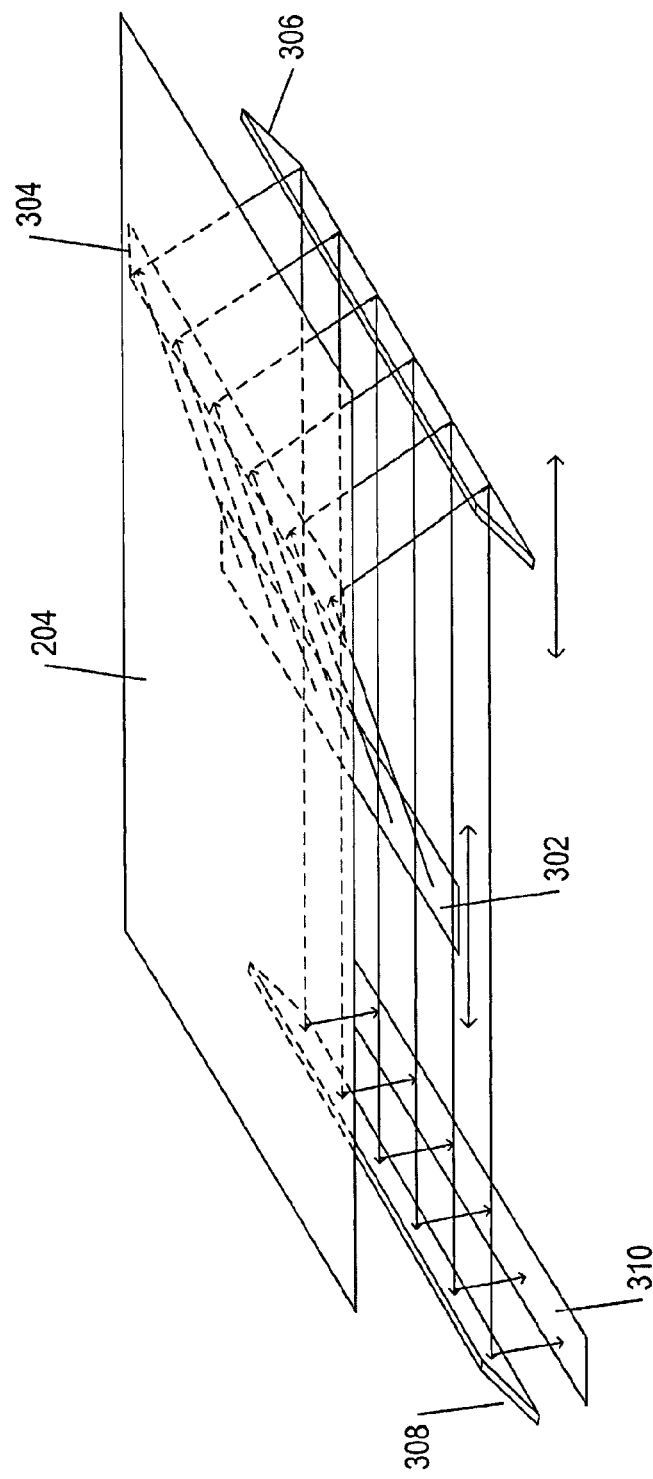
FIG. 3 illustrates operation of the optical components of the desktop scanner shown in FIG. 2.

FIG. 3 illustrates operation of the optical components of the desktop scanner shown in FIG. 2. The optical components in this charge-coupled-device ("CCD") scanner reside below the transparent glass bed 204. A laterally translatable bright-light source 302 illuminates a portion of the document being scanned 304 which, in turn, re-emits and reflects light downward. The re-emitted and reflected light is reflected by a laterally translatable mirror 306 to a stationary mirror 308, which reflects the emitted light onto an array of CCD elements 310 that generate electrical signals proportional to the intensity of the light falling on each of the CCD elements. Color scanners may include three separate rows or arrays of CCD elements with red, green, and blue filters. The laterally translatable bright-light source and laterally translatable mirror move together along a document to produce a scanned-document image. Another type of scanner is referred to as a "contact-image-sensor scanner" ("CIS scanner"). In a CIS scanner, moving colored light-emitting diodes ("LEDs") provide document illumination, with light reflected from the LEDs sensed by a photodiode array that moves together with the colored light-emitting diodes.

Figure 4:
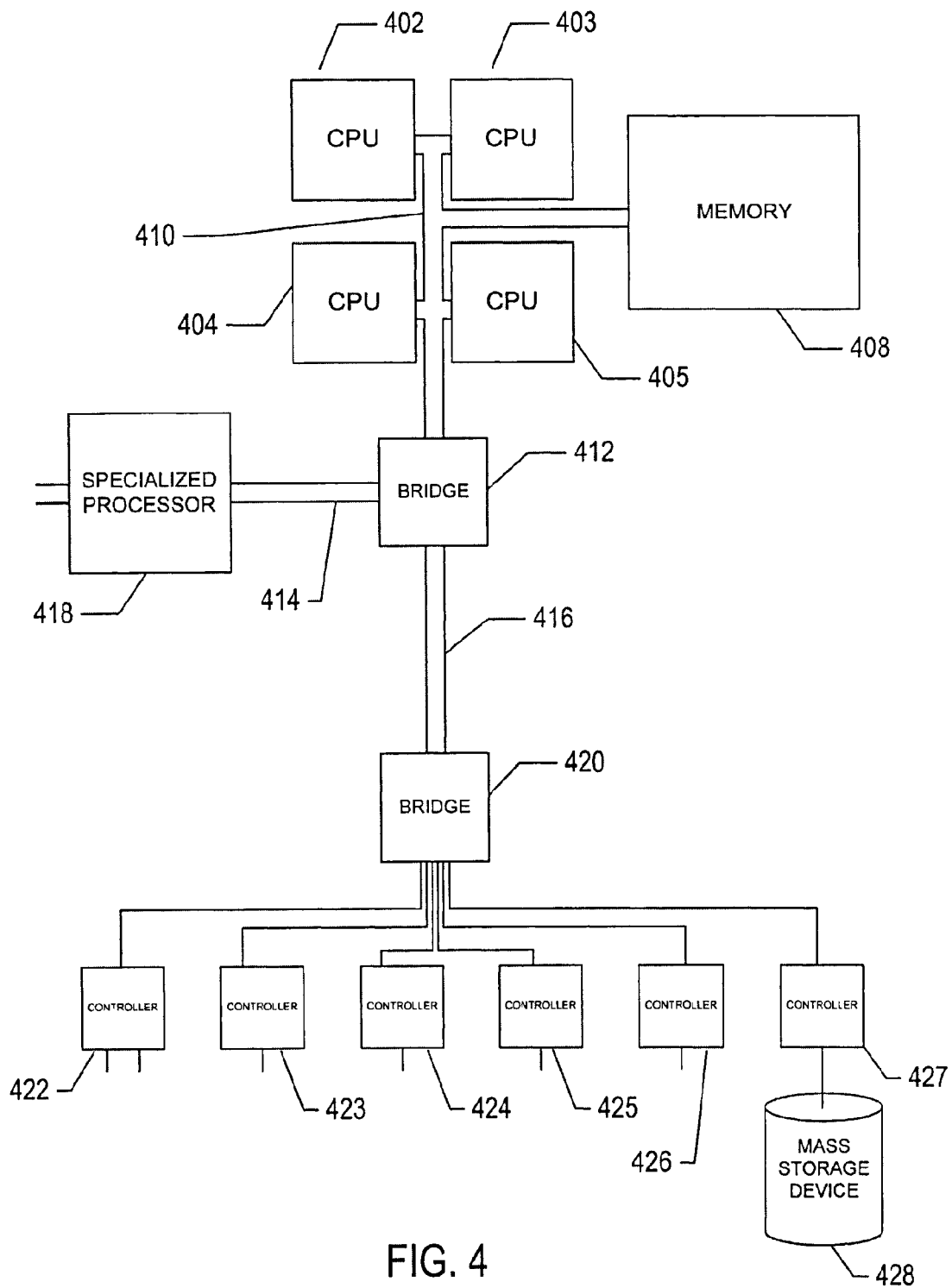
FIG. 4 provides a general architectural diagram for various types of computers and other processor-controlled devices.

FIG. 4 provides a general architectural diagram for various types of computers and other processor-controlled devices. The high-level architectural diagram may describe a modern computer system, such as the PC in FIG. 2, in which scanned-document-image-rendering programs and optical-character-recognition programs are stored in electronic memories for transfer to electronic memory and execution by one or more processors. An electronic memory may include various types of random access memories, non-volatile memories, and various types of data-storage peripherals, including magnetic-disk, optical-disk, and solid-state mass-storage devices. The computer system contains one or multiple central processing units ("CPUs") 402-405, one or more electronic memories 408 interconnected with the CPUs by a CPU/memory-subsystem bus 410 or multiple busses, a first bridge 412 that interconnects the CPU/memory-subsystem bus 410 with additional busses 414 and 416, or other types of high-speed interconnection media, including multiple, high-speed serial interconnects. These busses or serial interconnections, in turn, connect the CPUs and memory with specialized processors, such as a graphics processor 418, and with one or more additional bridges 420, which are interconnected with high-speed serial links or with multiple controllers 422-427, such as controller 427, that provide access to various different types of mass-storage devices 428, electronic displays, input devices, and other such components, subcomponents, and computational resources.

Figure 5:
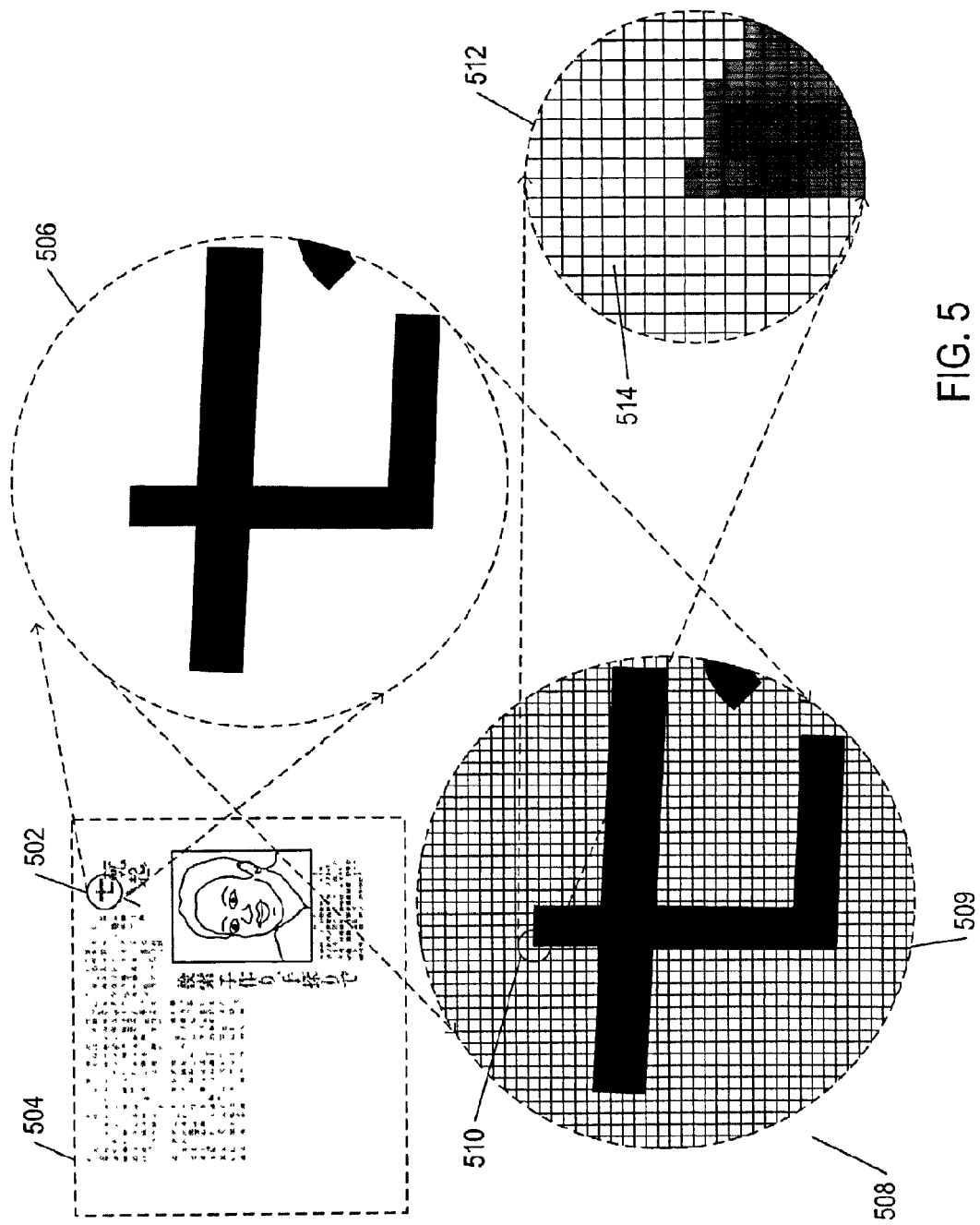
FIG. 5 illustrates digital representation of a scanned document.

FIG. 5 illustrates digital representation of a scanned document. In FIG. 5, a small disk-shaped portion 502 of the example printed document 504 is shown magnified 506. A corresponding portion of the digitally encoded scanned-document image 508 is also represented in FIG. 5. The digitally encoded scanned document includes data that represents a two-dimensional array of pixel-value encodings. In the representation 508, each cell of a grid below the characters, such as cell 509, represents a square matrix of pixels. A small portion 510 of the grid is shown at even higher magnification, 512 in FIG. 5, at which magnification the individual pixels are represented as matrix elements, such as matrix element 514. At this level of magnification, the edges of the characters appear jagged, since the pixel is the smallest granularity element that can be controlled to emit or receive light intensity. In a digitally encoded scanned-document file, each pixel is represented by a fixed number of bits, with the pixel encodings arranged sequentially. Header information included in the file indicates the type of pixel encoding, dimensions of the scanned image, and other information that allows a digitally encoded scanned-document-image rendering program to extract the pixel encodings and issue commands to a display device or printer to reproduce the pixel encodings in a two-dimensional representation of the original document. Scanned-document images digitally encoded in monochromatic grayscale commonly use 8-bit or 16-bit pixel encodings, while color scanned-document images may use 24 bits or more to encode each pixel according to various different color-encoding standards. As one example, the commonly used RGB standard employs three 8-bit values encoded within a 24-bit value to represent the intensity of red, green, and blue light. Thus, a digitally encoded scanned image generally represents a document in the same fashion that visual scenes are represented in digital photographs. Pixel encodings represent light intensity in particular, tiny regions of the image and, for colored images, additionally represent a color. There is no indication, in a digitally encoded scanned-document image, of the meaning of the pixels encodings, such as indications that a small two-dimensional area of contiguous pixels represents a text character.

By contrast, a typical electronic document produced by a word-processing program contains various types of line-drawing commands, references to image representations, such as digitally encoded photographs, and digitally encoded text characters. One commonly used encoding standard for text characters is the Unicode standard. The Unicode standard commonly uses 8-bit bytes for encoding American Standard Code for Information Exchange ("ASCII") characters and 16-bit words for encoding symbols and characters of many languages, including Japanese, Mandarin, and other non-alphabetic-character-based languages. A large part of the computational work carried out by an OCR program is to recognize images of text characters in a digitally encoded scanned-document image and convert the images of characters into corresponding Unicode encodings. Clearly, encoding text characters in Unicode takes far less storage space than storing pixilated images of text characters. Furthermore, Unicode-encoded text characters can be edited, reformatted into different fonts, and processed in many additional ways by word-processing programs while digitally encoded scanned-document images can only be modified through specialized image-editing programs.

Figure 6:
FIG. 6 shows six different regions within a scanned-document image recognized during an initial phase of scanned-document-image conversion, using the example document 100 shown in FIG. 1.

In an initial phase of scanned-document-image-to-electronic-document conversion, a printed document, such as the example document 100 shown in FIG. 1, is analyzed to determine various different regions within the document. In many cases, the regions may be logically ordered as a hierarchical acyclic tree, with the root of the tree representing the document as a whole, intermediate nodes of the tree representing regions containing smaller regions, and leaf nodes representing the smallest identified regions. FIG. 6 shows six different regions within the example document 100 shown in FIG. 1 recognized during an initial phase of scanned-document-image conversion. In this case, the tree representing the document would include a root node corresponding to the document as a whole and six leaf nodes each corresponding to one of the identified regions 602-607. The regions can be identified using a variety of different techniques, including many different types of statistical analyses of the distributions of pixel encodings, or pixel values, over the area of the image. For example, in a color document, a photograph may exhibit a larger variation in color over the area of the photograph as well as higher-frequency variations in pixel-intensity values than regions containing text.

Once an initial phase of analysis has determined the various different regions of a scanned-document image, those regions likely to contain text are further processed by OCR routines in order to identify text characters and convert the text characters into Unicode or some other character-encoding standard. In order for the OCR routines to process text-containing regions, an initial orientation of the text-containing region needs to be determined so that various pattern-matching methods can be efficiently employed by the OCR routines to identify text characters. It should be noted that the images of documents may not be properly aligned within scanned-document images due to positioning of the document on a scanner or other image-generating device, due to non-standard orientations of text-containing regions within a document, and for other reasons. Were the OCR routines unable to assume a standard orientation of lines and columns of text, the computational task of matching character patterns with regions of the scanned-document image would be vastly more difficult and less efficient, since the OCR routines would generally need to attempt to rotate a character pattern at angular intervals over 360° and attempt to match the character pattern to a potential text-symbol-containing image region at each angular interval.

Figure 7:
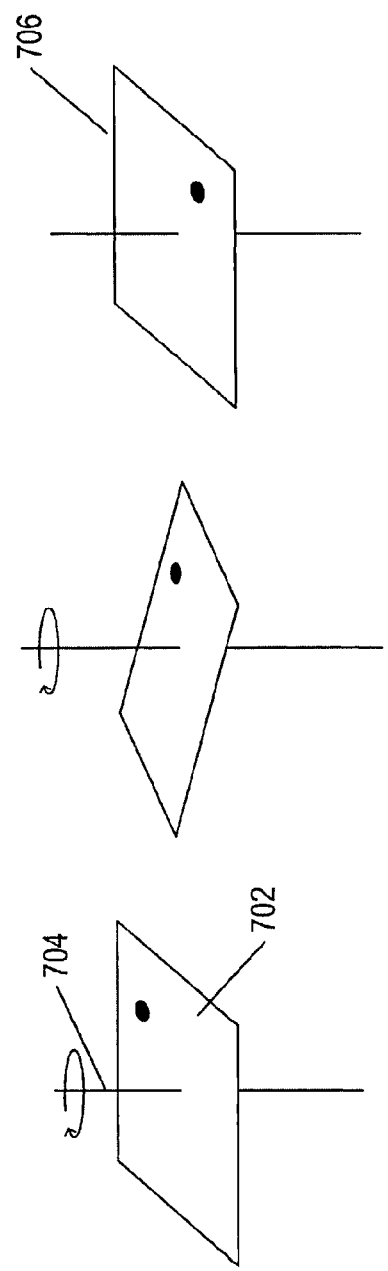
FIG. 7 illustrates a rotation in a horizontal plane.

To be clear, the initial orientation is concerned with rotations of the text-containing region in the horizontal plane. FIG. 7 illustrates a rotation in a horizontal plane. In FIG. 7, a square region of a scanned-document image 702 is positioned horizontally with a vertical rotation axis 704 passing through the center of the region. Rotation of the square region in a clockwise direction by 90° produces the orientation 706 shown at the right-hand side of FIG. 7.

Generally, once a text-containing region is identified, the image of the text-containing region is converted from a pixel-based image to a bitmap, in a process referred to as "binarization," with each pixel represented by either the bit value "0," indicating that the pixel is not contained within a portion of a text character, or the bit value "1," indicating that the pixel is contained within a text character. Thus, for example, in a black-and-white-text-containing scanned-document-image region, where the text is printed in black on a white background, pixels with values less than a threshold value, corresponding to dark regions of the image, are translated into bits with value "1" while pixels with values equal to or greater than the threshold value, corresponding to background, are translated into bits with value "0." The bit-value convention is, of course, arbitrary, and an opposite convention can be employed, with the value "1" indicating background and the value "0" indicating character. The bitmap may be compressed, using run-length encoding, for more efficient storage.

Figure 8:
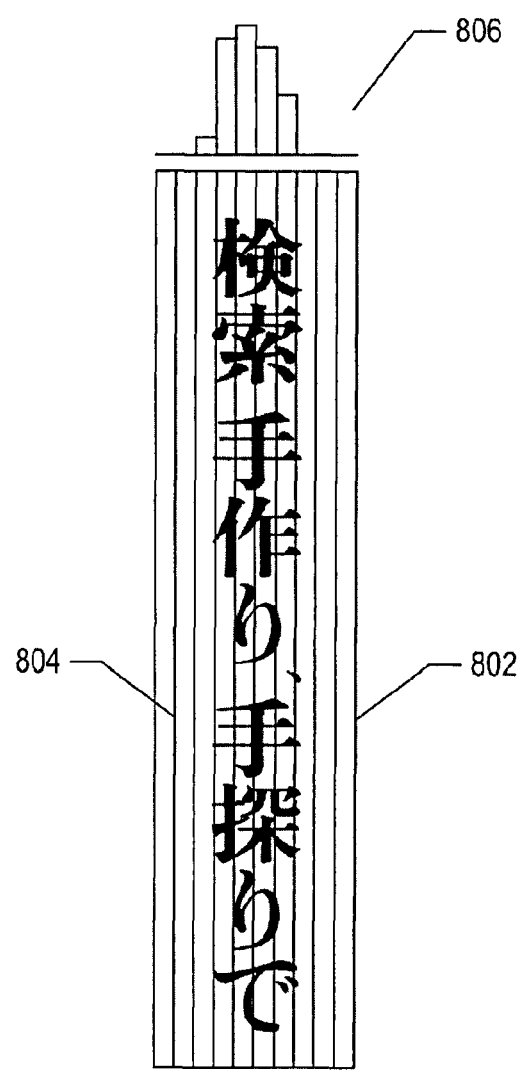
FIGS. 8-10 illustrate one approach to determining an initial orientation for a text-containing region.
Figure 9:
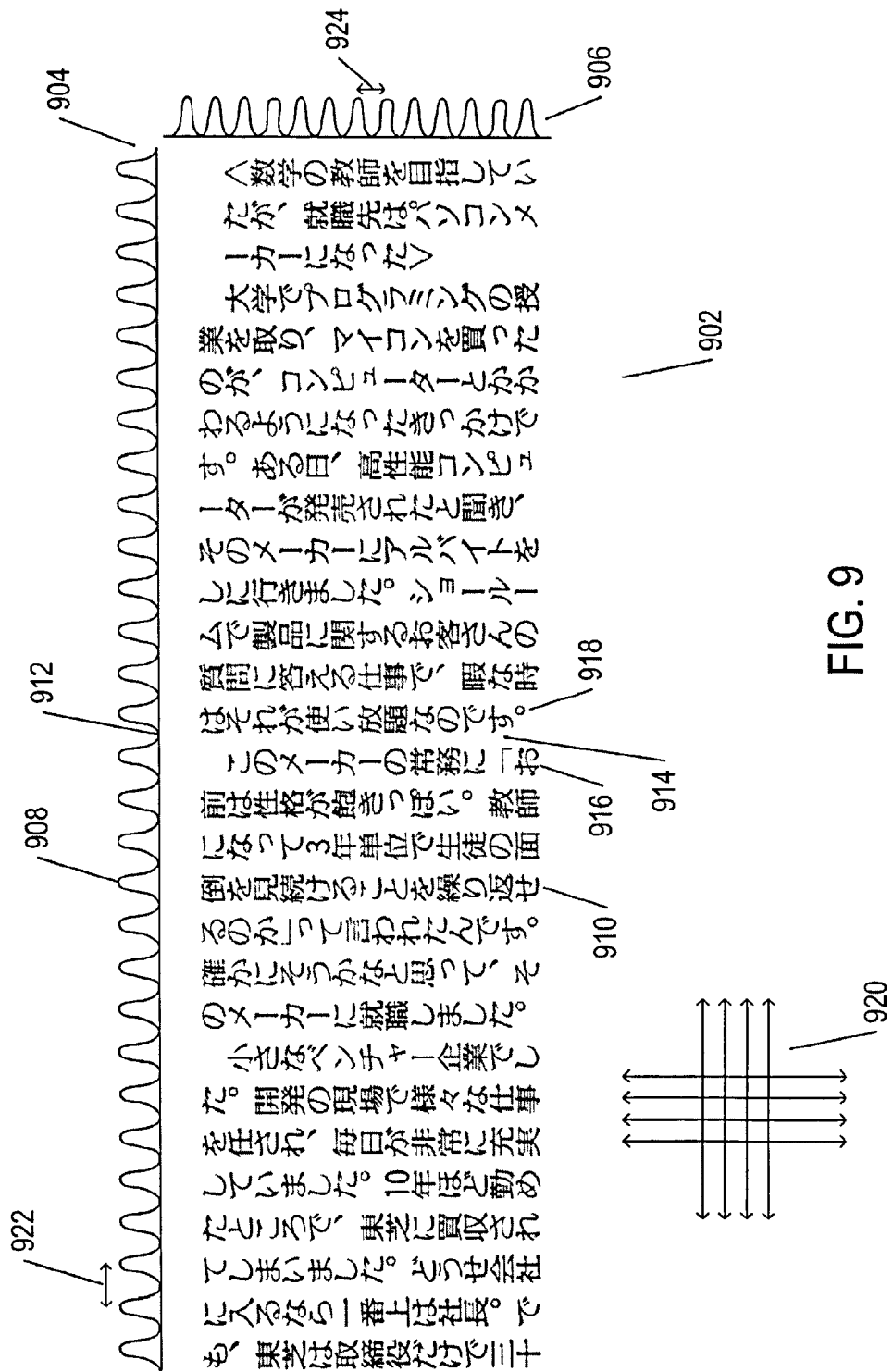
Figure 10:
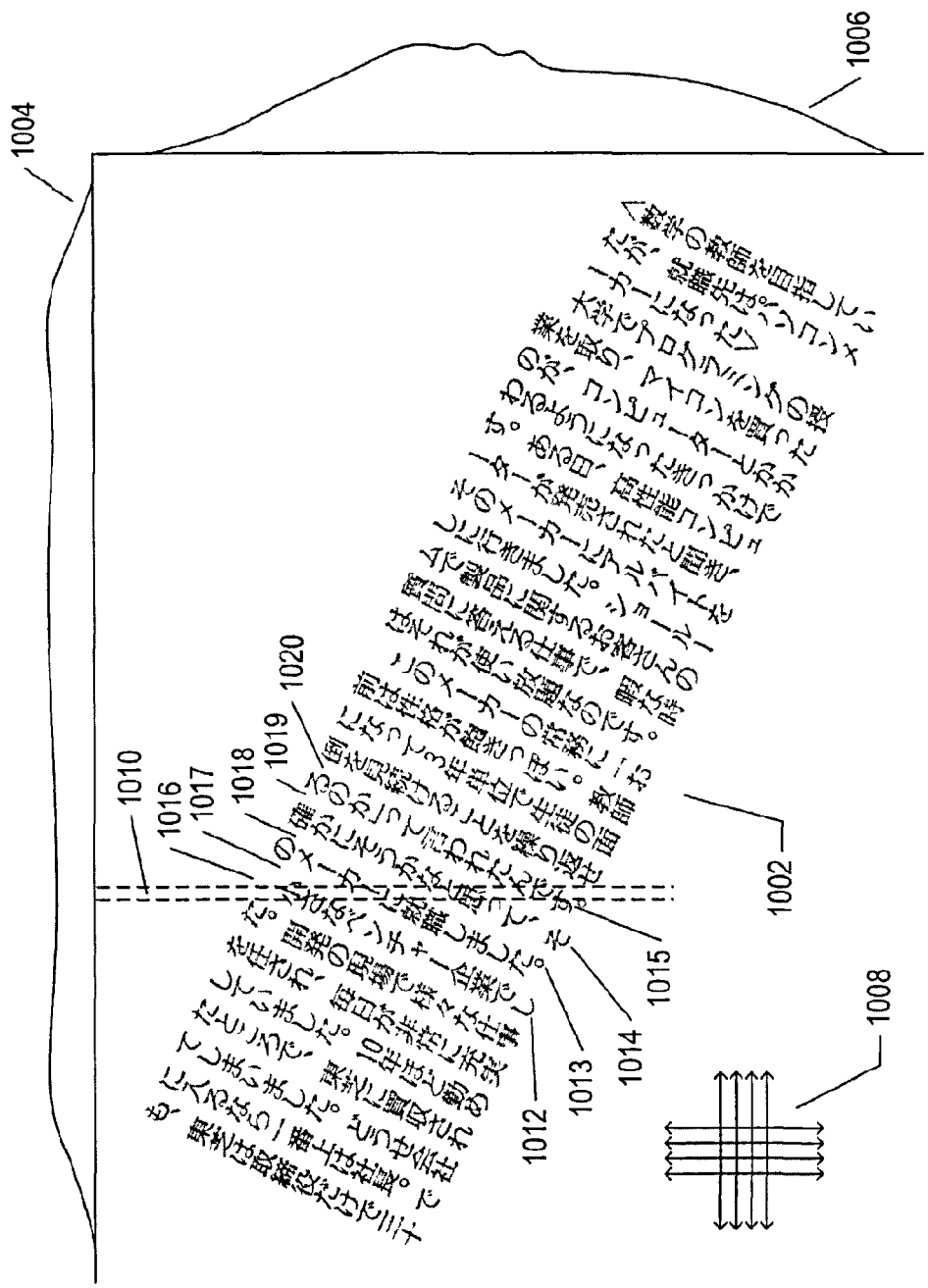

FIGS. 8-10 illustrate one approach to determining an initial orientation for a text-containing region. FIG. 8 shows the generation of a histogram corresponding to one orientation of a text-containing region. In FIG. 8, a text-containing region 802 is vertically oriented. The text-containing region is partitioned into columns demarcated by vertical lines, such as vertical line 804. The number of "1" valued bits in the bitmap corresponding to the text-containing region is counted, in each column, and used to generate a histogram 806 shown above the text-containing region. Columns in the text-containing region containing no portions of characters or, equivalently, only "0"-valued bits, have no corresponding columns in the histogram while columns containing portions of characters are associated with columns in the histogram with heights corresponding to the proportion of bits within the column having value "1." The histogram column heights may alternatively be scaled to reflect the absolute number of "1" valued bits or may alternatively represent a fraction of bits in the column with value "1" or the fraction of the number of "1"-valued bits in a column with respect to the total number of "1"-valued bits in the text-containing region.

FIG. 9 shows histograms generated for columns and rows of a properly oriented text-containing region. In FIG. 9, a text-containing region 902 is aligned with the page boundaries, with rows of text parallel to the top and bottom of the page and columns of text parallel to the sides of the page. The histogram-generation method discussed above with reference to FIG. 8 has been applied to the entire text-containing region 902 to generate histograms for vertical columns within the text-containing region 904 and for horizontal rows within the text-containing region 906. Note that the histograms are shown as continuous curves with the peaks of the curves, such as peak 908 in histogram 904, corresponding to the central portions of text columns and rows, such as text column 910 to which peak 908 corresponds, and valleys, such as valley 912, corresponding to the white-space columns and rows between text columns and text rows, such as the white-space column 914 between text columns 916 and 918. The grid of arrows 920 in FIG. 9 indicates the direction of the vertical and horizontal partitionings used to generate the column histogram 904 and the row histogram 906.

FIG. 10 shows the same text-containing image region shown in FIG. 9 but having a different rotational orientation. The same technique described above with reference to FIG. 9 is applied to the differently oriented text-containing region 1002 to generate the column histogram 1004 and row histogram 1006 using column and row partitions in the direction of the vertical and horizontal arrows 1008. In this case, the histograms are generally featureless, and do not show the regularly spaced peaks and valleys as in the histograms shown in FIG. 9. The reason for this is easily seen by considering the vertical column 1010 shown in FIG. 10 with dashed lines. This vertical column passes through text columns 1012-1015 and white-space columns 1016-1020. Almost every vertical column and horizontal row, other than those at the extreme ends of the histograms, passes through both text and white space, as a result of which each of the vertical columns and horizontal rows generally includes "1" valued bits and "0" valued bits.

Thus, the optical-character-recognition ("OCR") routines can initially orient a text-containing region by rotating the text-containing region through 90° and computing column and row histogram at angular intervals and by then selecting an initial orientation which produces at least one comb-like histogram and generally two comb-like histograms, as shown in FIG. 9, with best peak-to-trough ratios. Note also that the spacing between characters in rows and columns may be inferred from the spacings 922 and 924 between peaks in the column and row histograms.

Currently Available OCR Methods and Systems

Figure 11A:
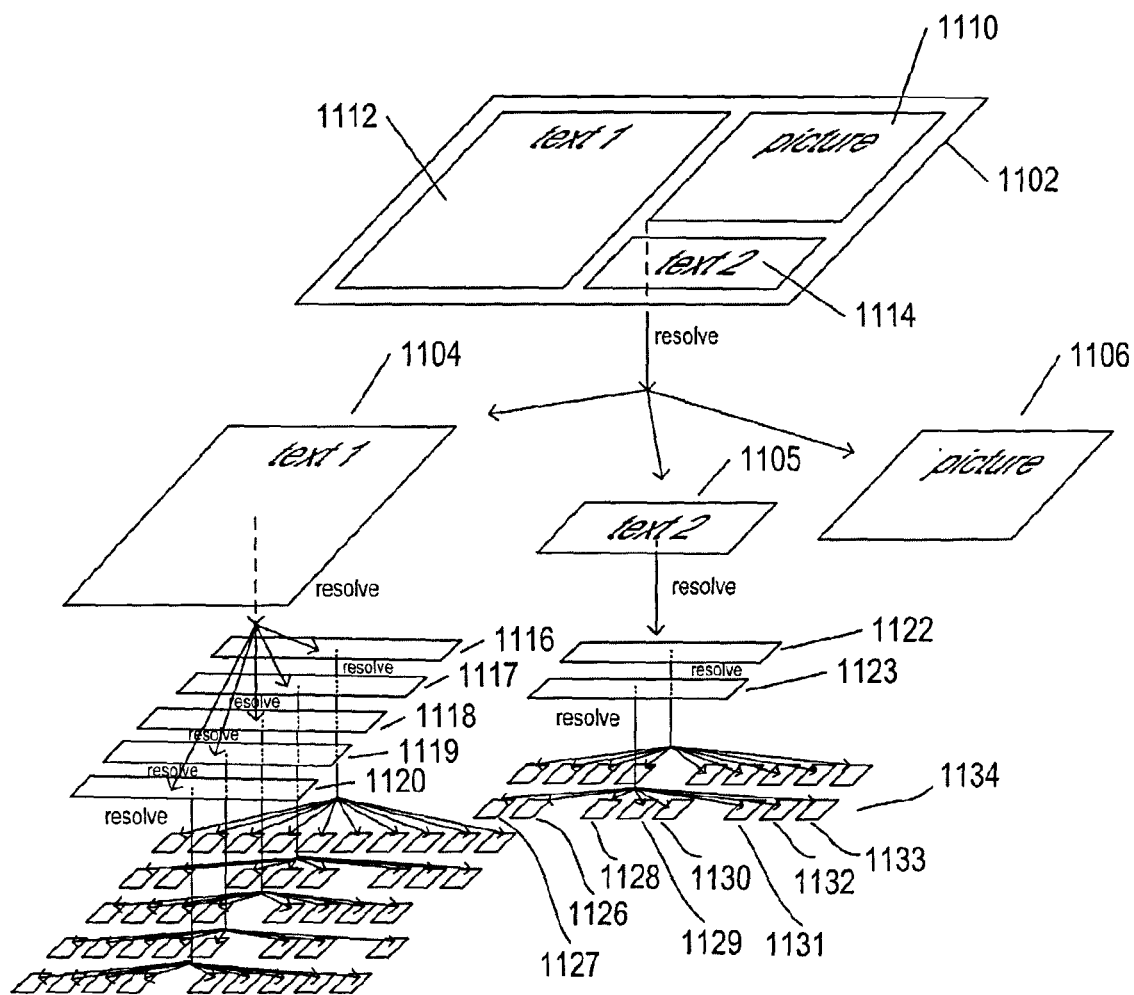
FIGS. 11A-C illustrate one approach to conversion of a document image to an electronic document that is used in certain currently available OCR systems.
Figure 11B:
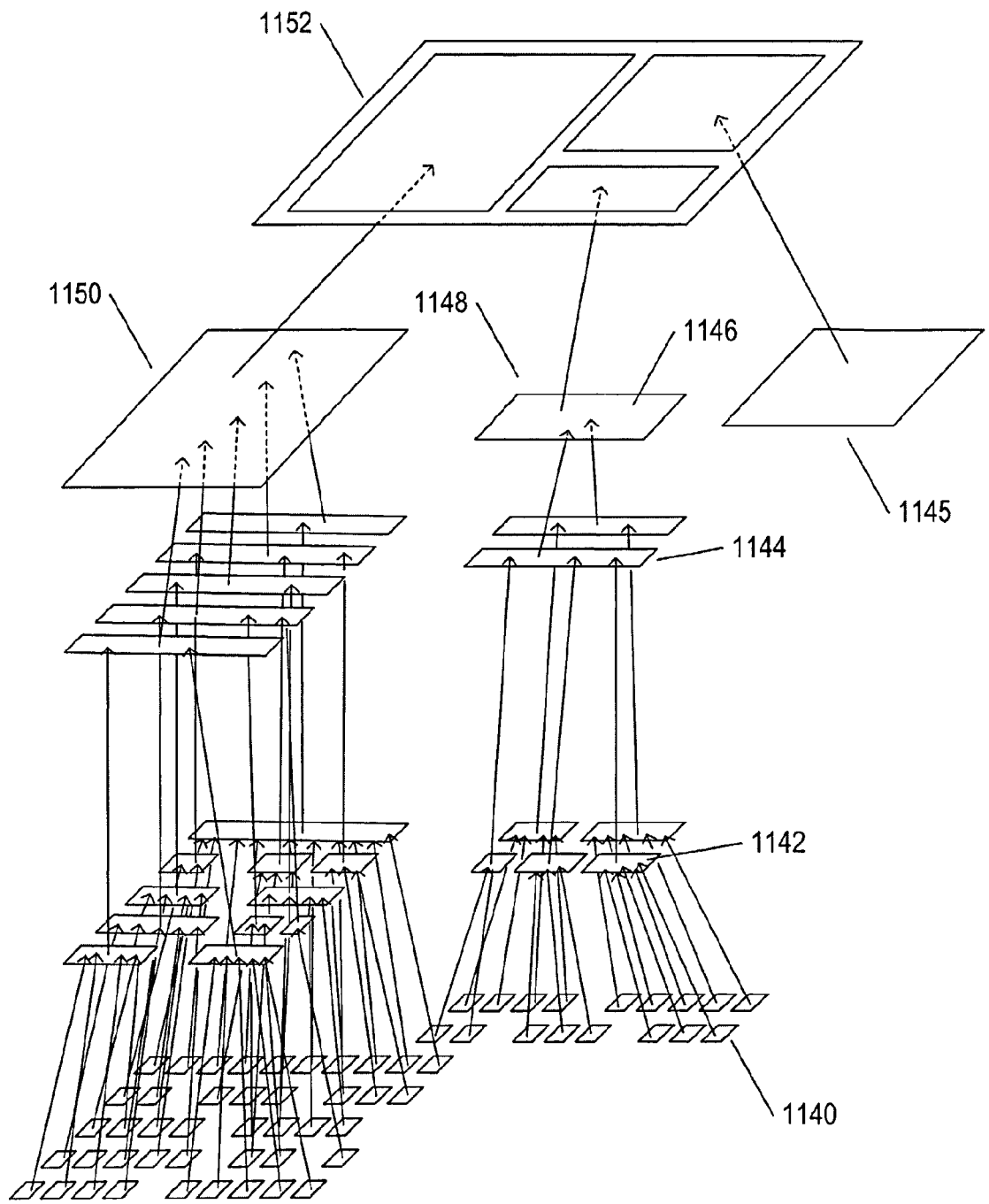
Figure 11C:
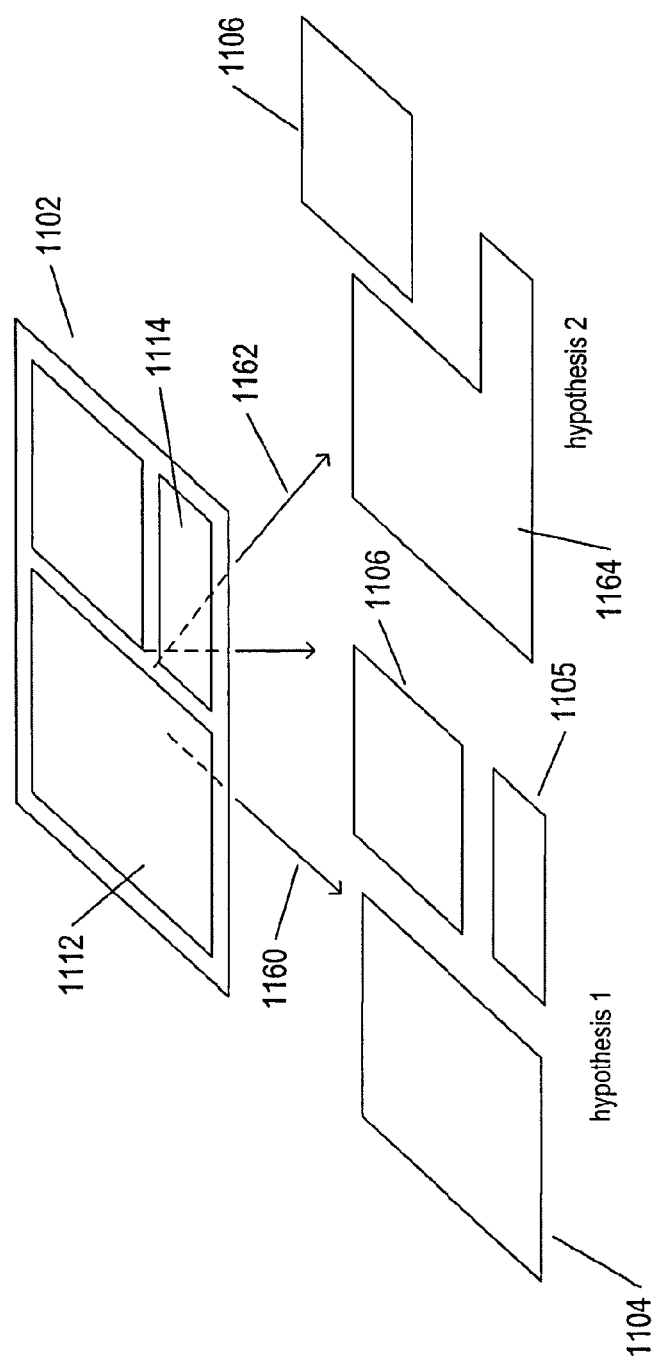

FIGS. 11A-C illustrate one approach to conversion of a document image to an electronic document that is used in certain currently available OCR systems. This approach is hierarchical in nature and can be understood and implemented recursively, although non-recursive or partially recursive orientations are also possible. Following initial orientation, a document image 1102 is processed to resolve the document image into high-level document-image portions or elements 1104-1106. In the example shown in FIG. 11A, the document image includes a picture 1110, a first text block 1112, and a second text block 1114. These are the high-level elements of the document image that are resolved into a corresponding first text-block image 1104, a corresponding second text-block image 1105, and a corresponding picture 1106. In this case, the picture is a fundamental element of the document image and cannot be resolved further. However, in a second level of resolution, the first text-block image 1104 is resolved into individual text-line images 1116-1120 and the second text-block image 1105 is further resolved into text-line images 1122-1123. In a final level of resolution, each text-line image, such as text-line image 1123, is further resolved into individual symbols, such as symbol images 1126-1134 corresponding to text-line image 1123. In certain implementations, the resolution of text-line images into symbol images may involve at least partial initial resolution of text-line images into word images, for those languages in which alphabetic symbols are combined into words.

As illustrated in FIG. 11A, certain OCR methods and systems first resolve a document image 1102 into symbol images, such as symbol images 1126-1134 before constructing an electronic document corresponding to the document image. In many of these systems, the symbol image is the finest granularity of resolution carried out by the OCR methods and systems with respect to text images. OCR methods and systems next employ a variety of different methods to transform images of individual characters into a corresponding Unicode encoding of the character. Of course, various transformations can be applied to generate any of various different types of character encodings.

Finally, as shown in FIG. 11B, these OCR methods and systems generate an electronic document corresponding to the document image in a reverse hierarchical fashion, beginning with single-character encodings and fully resolved non-text elements. The character encodings, such as a character encoding 1140, are combined into words, such as word 1142, for those languages in which alphabetic symbols are combined to form words. In a next level of electronic-document construction, the words are combined to produce text lines, such as text line 1144 that contains word 1142. In yet an additional level of electronic-document construction, the text lines are combined to produce text blocks, such as text block 1146 that contains text line 1144. Finally, all of the highest-element document elements, such as picture 1106, text block 1148, and text block 1150 are combined together to produce an electronic document 1152 corresponding to document image 1102. The electronic document, as discussed above, may contain Unicode representations of alphabetic symbols or characters and various types of control sequences to generate frames, borders, and other electronic-document features. Thus, alphabetic symbol 1140 is generally a digitally encoded symbol, such as a Unicode character, that corresponds to the symbol image 1133 in FIG. 11A. Similarly, picture 1145 is generally a type of compressed image file corresponding to the picture 1106 scanned as part of the document image. In other words, viewing the resolution of the document image into document-image elements as a tree, as shown in FIG. 11A, the leaf nodes of the tree are converted from scanned images into appropriate digital encodings that represent the information contained in the scanned images, and the digital encodings are then recombined, in the process shown in FIG. 11B, to produce a digitally encoded electronic document.

In FIGS. 11A-B, the resolution of a document image into fully resolved image elements, transformation of image elements to corresponding electronic-document elements, and construction of an electronic document from the electronic-document elements are illustrated, for simplicity, using one-to-many mappings from higher-level elements to lower-level elements and from lower-level elements to higher-level elements. In both diagrams, all of the elements at a given level combine together to produce a single-higher level element at the next-highest level. However, in general, the OCR methods and systems encounter many different ambiguities and uncertainties during processing of document images, resulting in generation of multiple possible resolutions from a higher-level element to multiple sets of lower-level elements during the resolution phase and, during electronic-document-construction phase, a set of lower-level elements may be combined in different ways to lead to different higher-level elements.

FIG. 11C shows one example of the generation of multiple hypotheses during document-image resolution. In FIG. 11C, the initial document image 1102 is, according to one hypothesis represented by arrow 1160, resolved into the three lower-level components 1104-1106 discussed above with reference to FIG. 11A. However, according to a second hypothesis 1162, the text image may be alternatively resolved into a single text block 1164 and the picture 1106. In this case, the border between the first text block 1112 and the second text block 1114 may be indistinct or entirely absent, in which case the OCR methods and systems may need to test the two alternative hypotheses. Generation of multi-way-hypothesis branching during both resolution and construction phases of the conversion of document images to electronic documents can lead to literally thousands, tens of thousands, hundreds of thousands, millions, or more possible alternative conversions. In general, OCR methods and systems employ statistical reasoning, a wide variety of different types of metrics, and a wide variety of different types of automated hypothesis-testing techniques to constrain multi-way hypothesis generation and to accurately and efficiently navigate the potentially enormous state space of resolutions and electronic-document constructions to determine a single most likely electronic document corresponding to the document image.

Figure 12:
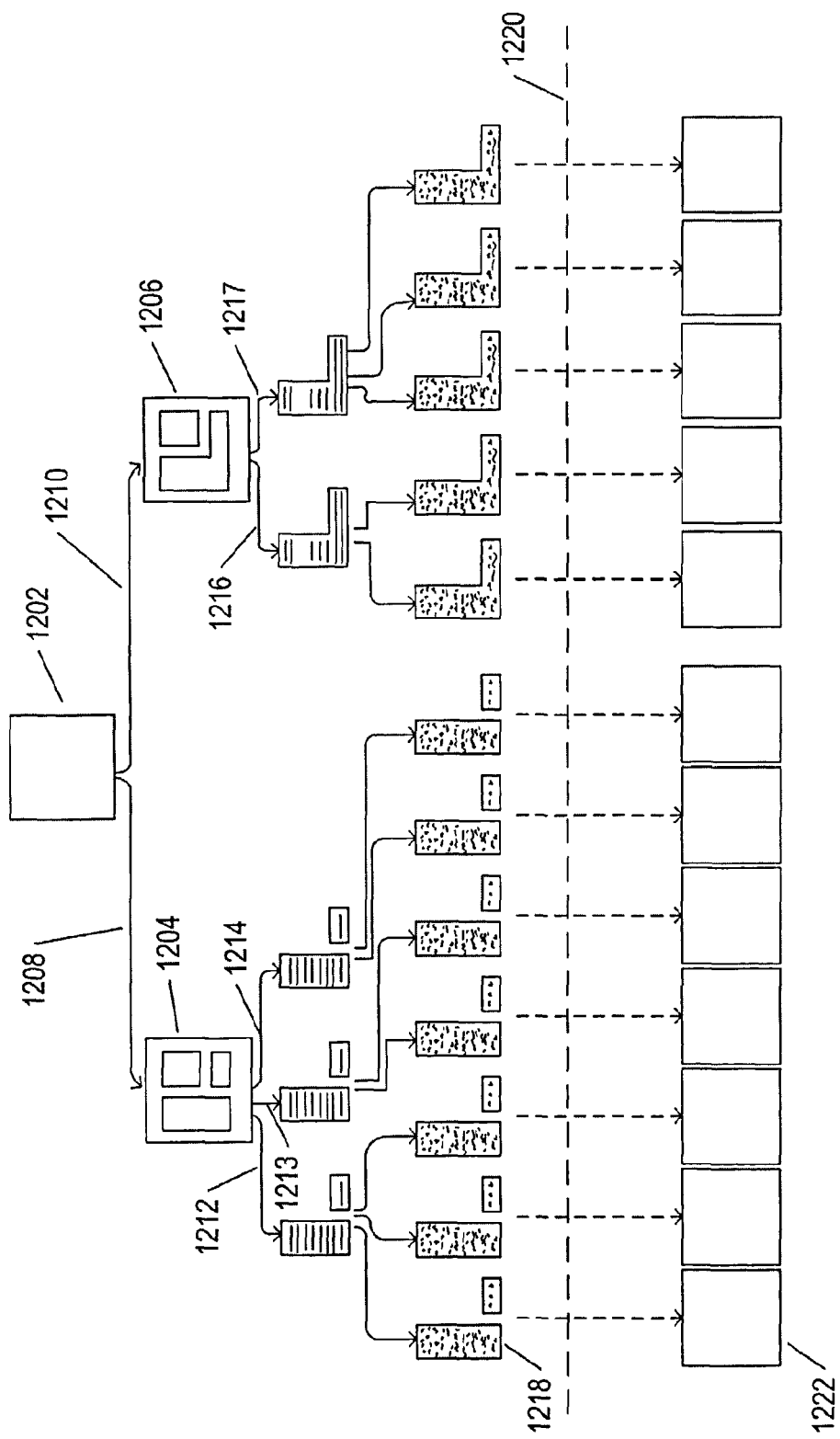
FIG. 12 alternatively represents the process of converting a document image into an electronic document used by various currently available OCR methods and systems.

FIG. 12 alternatively represents the process of converting a document image into an electronic document used by various currently available OCR methods and systems. The document image 1202 is resolved into sets of highest-level image elements 1204 and 1206 via two alternative hypotheses 1208 and 1210, respectively. In a next level of resolution, the text-block images in the first initial resolution 1204 and the single text-block image in the second initial resolution 1206 are resolved into text-line images according to three different hypotheses 1212-1214 for the first highest-level resolution 1204 and two hypotheses 1216-1217 for the second highest-level resolution 1206. Each of these five different second-level resolutions are further resolved, in a next level of resolution, into individual symbol images according to multiple different hypotheses, finally generating 12 different leaf-node resolutions, such as leaf-node resolution 1218. In a second phase of document-image-to-electronic-document conversion, each leaf-node resolution is transformed to an equivalent electronic-document-element-based resolution, and, in a third phase of document-image-to-electronic-document conversion, each electronic-document-element-based resolution is constructed into a corresponding electronic document, such as electronic document 1222 corresponding to leaf-node resolution 1218. FIG. 12 illustrates the potential multitude of electronic documents that may be produced via alternative hypotheses during the conversion process although, in actuality, the various alternative intermediate hypotheses and alternative electronic documents are filtered during the process so that a final, best-estimate electronic document is selected from among a reasonable number of alternatives during the final stages of electronic-document construction. In other words, although the potential state space of possible electronic documents is large, filtering and pruning occur throughout the resolution and construction phases so that the conversion process actually explores only a relatively minute subspace of the total space of possible electronic document reconstructions. The first level of electronic-document-element-based resolution, in which a sequence of characters is resolved into a word, essentially assigned a lexical identification to the sequence of characters and, in turn, to the portion of a text-lime image corresponding to the sequence of characters.

Figure 13A:
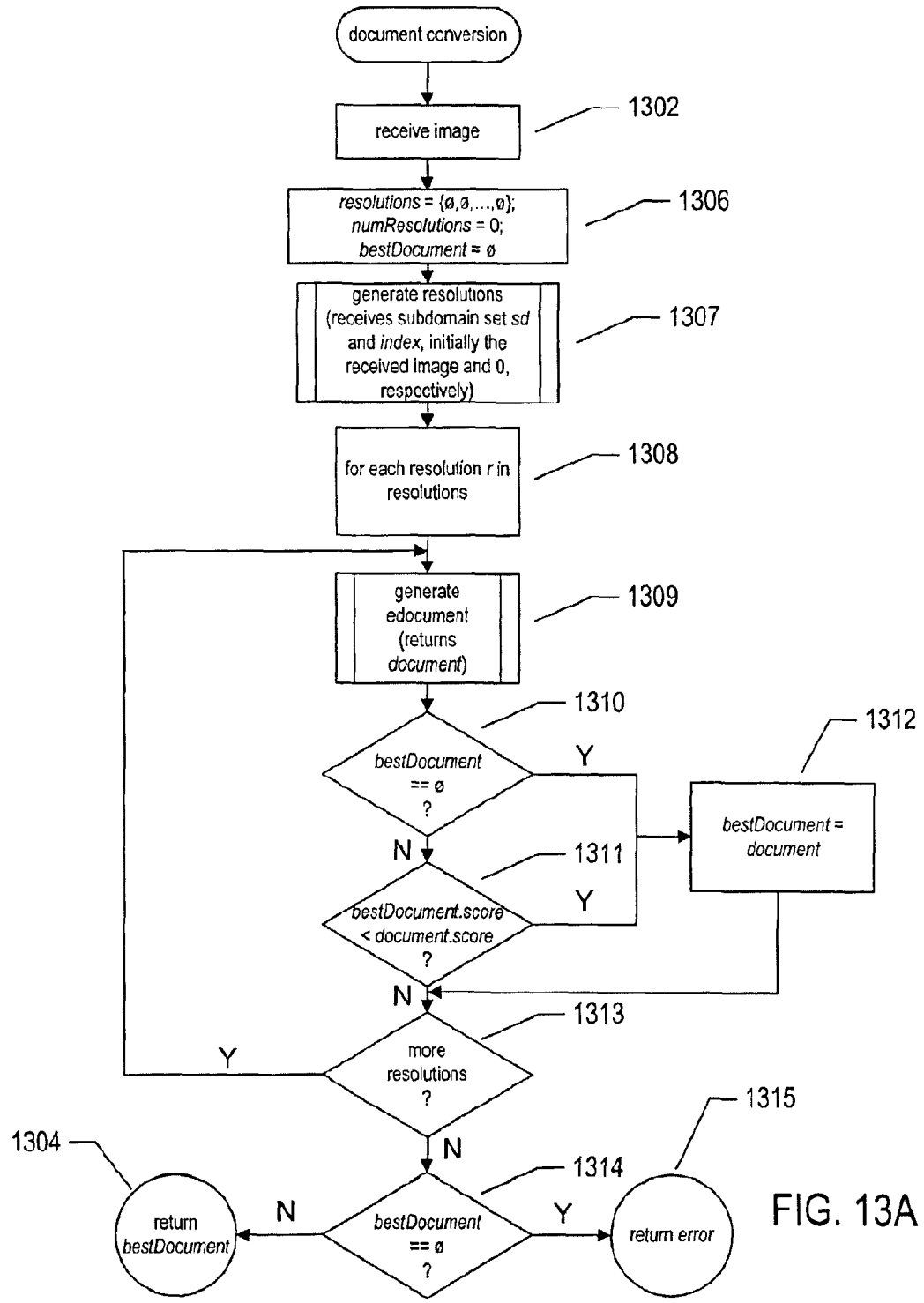
FIGS. 13A-E illustrate, using control-flow diagrams, an example of currently available document-conversion methods employed in OCR systems.

FIGS. 13A-E illustrate, using control-flow diagrams, an example of currently available document-conversion methods employed in OCR systems. FIG. 13A provides a control-flow diagram for the routine "document conversion" which receives, in step 1302, a document image, converts the document image to an electronic document, and returns the electronic document in step 1304. In step 1306, the routine "document conversion" initializes each set in a set of resolutions to null, sets the variable numResolutions to 0, and sets the variable bestDocument to null. The resolutions contained in the set of resolutions are leaf nodes in the resolution tree shown in FIG. 12, as one example. In step 1307, the routine "document conversion" calls a routine "generate resolutions" to carry out the first phase of document conversion, generating a set of different resolutions of the received document image, such as the resolutions discussed above with reference to FIG. 12, including resolution 1218, directly above the horizontal dashed line 1220 separating the resolution phase from the electronic-document-construction phase. Following the call to the routine "generate resolutions," in step 1307, the variable resolutions, set to null in step 1306, contains the most probable or highest-scored resolutions of the received document image. The variable resolutions is thus a set of resolutions, each resolution itself a set of image elements obtained by the first resolution phase of the conversion process. Next, in the for-loop of steps 1308-1313, the routine "document conversion" generates an electronic document for each resolution in the set referenced by the variable resolutions and selects the best or highest-scored electronic document produced. In step 1309, the routine "generate edocument" is called to generate an electronic document from a currently considered resolution. When either the variable bestDocument is null, as determined in step 1310, or the score associated with the electronic document referenced by the variable bestDocument is less than the score associated with the electronic document just generated in step 1309, as determined in step 1311, the variable bestDocument is assigned to reference the just-returned electronic document in step 1312. The loop continues to a next iteration when there are more resolutions to process, as determined in step 1313. When all resolutions have been considered in the for-loop, then, when the variable bestDocument still has a null value, as determined in step 1314, an error is returned in step 1315. Otherwise, as discussed above, the electronic document referenced by variable bestDocument is returned in step 1304.

Figure 13B:
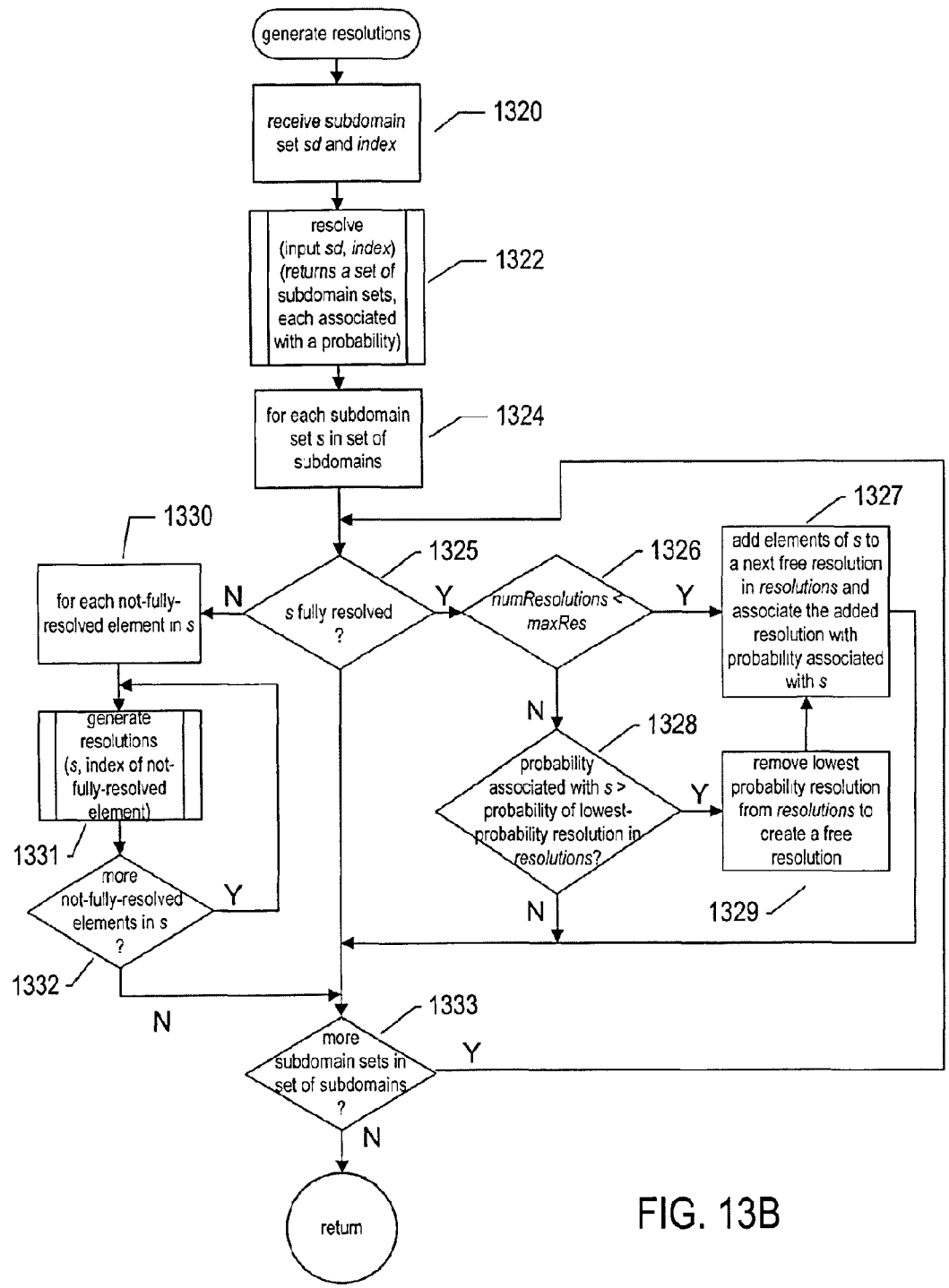

FIG. 13B provides a control-flow diagram for the routine "generate resolutions" called in step 1307 of FIG. 13A. In step 1320, the routine "generate resolutions" receives a set of subdomains sd and an index of a particular subdomain within the set of subdomains to be next expanded, or resolved. Initially, in the first call to the routine "generate resolutions," the set of subdomains is a single-element set containing the entire document image. In step 1322, the routine "generate resolutions" calls a routine "resolve" to resolve the set of subdomains into a set of subdomain sets by resolving the indexed subdomain into lower-level subdomains. Each subdomain set in the set of subdomain sets is associated with a metric or probability that indicates the likelihood of the resolution represented by the subdomain set to be correct. In the for-loop of steps 1324-1333, each subdomain set s in the set of subdomain sets returned by the routine "resolve" is considered. When the subdomain set s is fully resolved, as determined in step 1325, then, when the number of resolutions is less than the maximum desired number of resolutions, as determined in step 1326, the elements of the subdomain set s are added to a next free resolution in the set of resolutions and a probability associated with the subdomain set is associated with the resolution in step 1327. When the maximum number of resolutions has already been obtained, but the probability associated with the currently considered subdomain set s is greater than the lowest-probability-associated resolution in the set of resolutions, then the lowest-probability resolution is removed from the set of resolutions to create a free resolution and the elements of the subdomain set s are added to the free resolution in step 1327. When s is not fully resolved, then for each not-fully-resolved element in s, the routine "generate resolutions" is called with the argument index specifying that element to expand the element into lower-level subdomains in the for-loop of steps 1330-1332.

Figure 13C:
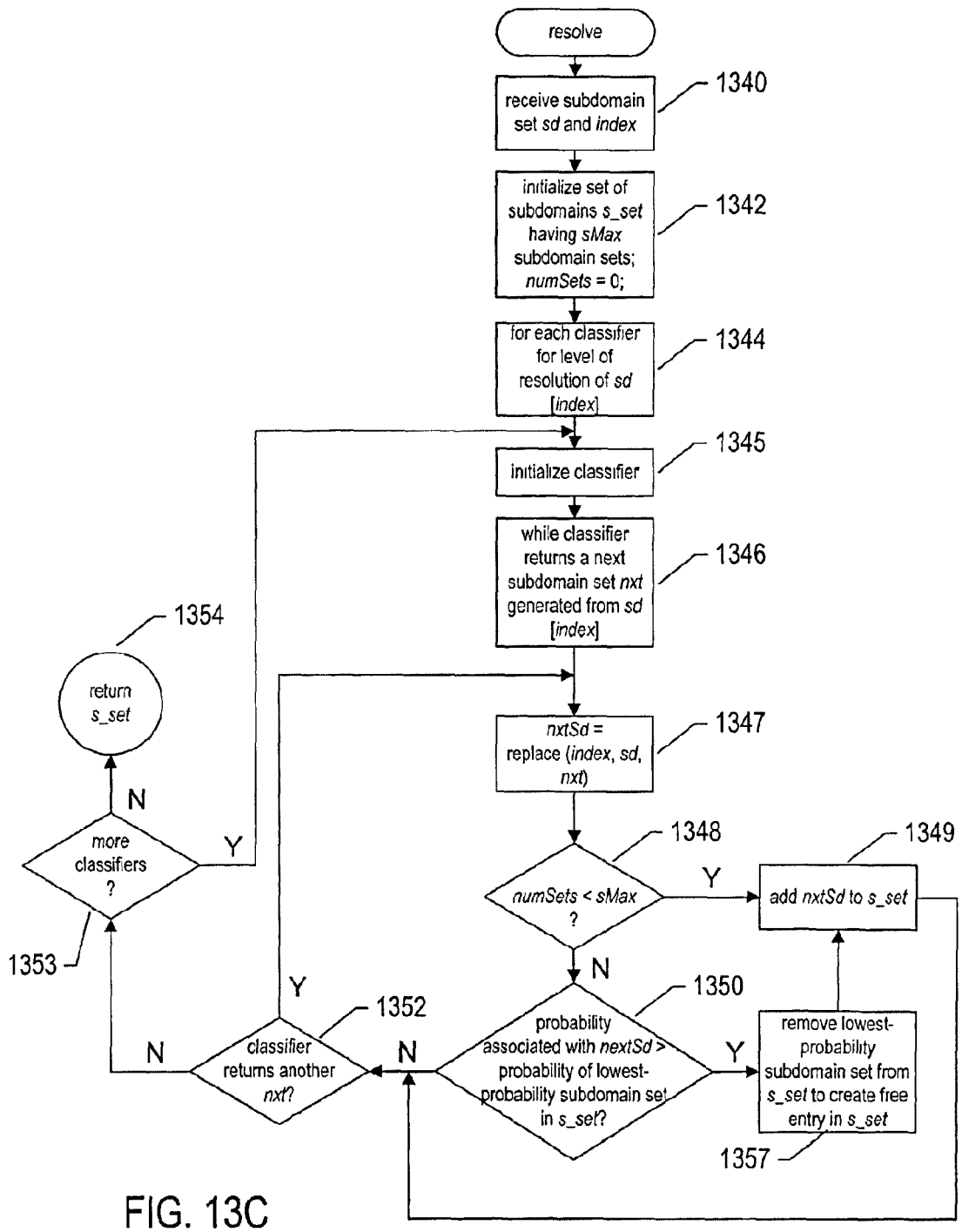

FIG. 13C provides a control-flow diagram for the routine "resolve" called in step 1322 of FIG. 13B. In step 1340, the routine "resolve" receives a subdomain set sd and an index. In step 1342, the routine "resolve" initializes a set of subdomains s_set that can contain up to sMax subdomain sets. In step 1342, the routine "resolve" also sets the variable numSets to 0. Then, in the for-loop of steps 1344-1353, each of a set of classifiers is used to determine a resolution of the subdomain indexed by the argument index in order to generate a set lower-level resolutions, nxt, for the subdomain set sd. Classifiers are subroutines that resolve an image element, or subdomain, at a first level into next-level subdomains or that transform a document-image element into an electronic-document element. Classifiers are generally particular to particular types of image subdomains at particular resolution levels. In step 1345, the next-considered classifier is initialized and in the while-loop of steps 1346-1352, the classifier is iteratively called to generate successive subdomain sets for the subdomain of the subdomain set sd indexed by index. In step 1347, the subdomain set, nxt, generated for the subdomain indexed by index is used to replace the subdomain indexed by index within the subdomain set sd and generate a new, more resolved subdomain set nxtSd. The classifier associates the generated subdomain set with a probability that is then incorporated into an overall probability associated with nxtSd. When the number of sets stored in s_set is less than sMax, as determined in step 1348, the subdomain set nextSd is added to the set of subdomains s_set in step 1349. Otherwise, when the probability associated with nextSd is greater than the probability of the lowest-probability subdomain set in s_set, as determined in step 1350, then the lowest-probability subdomain set is removed from s_set, in step 1351, and nextSet is added to the subdomain set s_set in step 1349. When a classifier can return another subdomain set nxt, as determined in step 1352, the next subdomain set nxt is processed beginning with step 1347. Otherwise, when there are more classifiers to apply to the subdomain set sd, as determined in step 1353, control flows back to step 1345 to begin generating subdomain sets using the next classifier. Otherwise, the set of subdomain sets s_set is returned in step 1354.

Figure 13D:
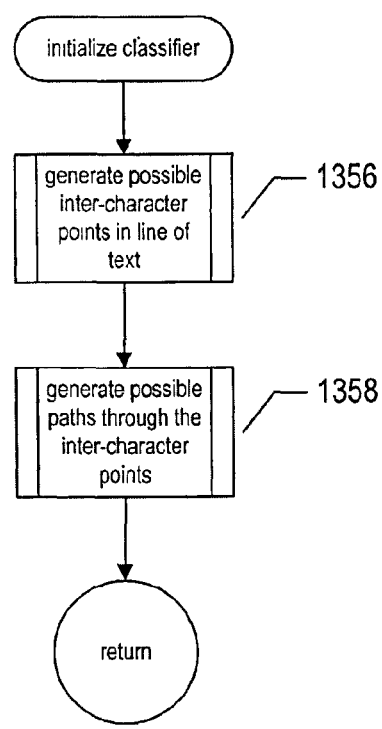

FIG. 13D provides a control-flow diagram for the routine "initialize classifier" called in step 1345 of FIG. 13C. The routine "initialize classifier" shown in FIG. 13D is a particular initialization routine for a classifier that generates possible inner-character division points in a line of text. In step 1356, the routine "initialize classifier" generates a set of possible inter-character points in the line of text via a routine call and then, in step 1358, generates possible paths through the inter-character points, as discussed below with reference to FIGS. 20A-B.

Figure 13E:
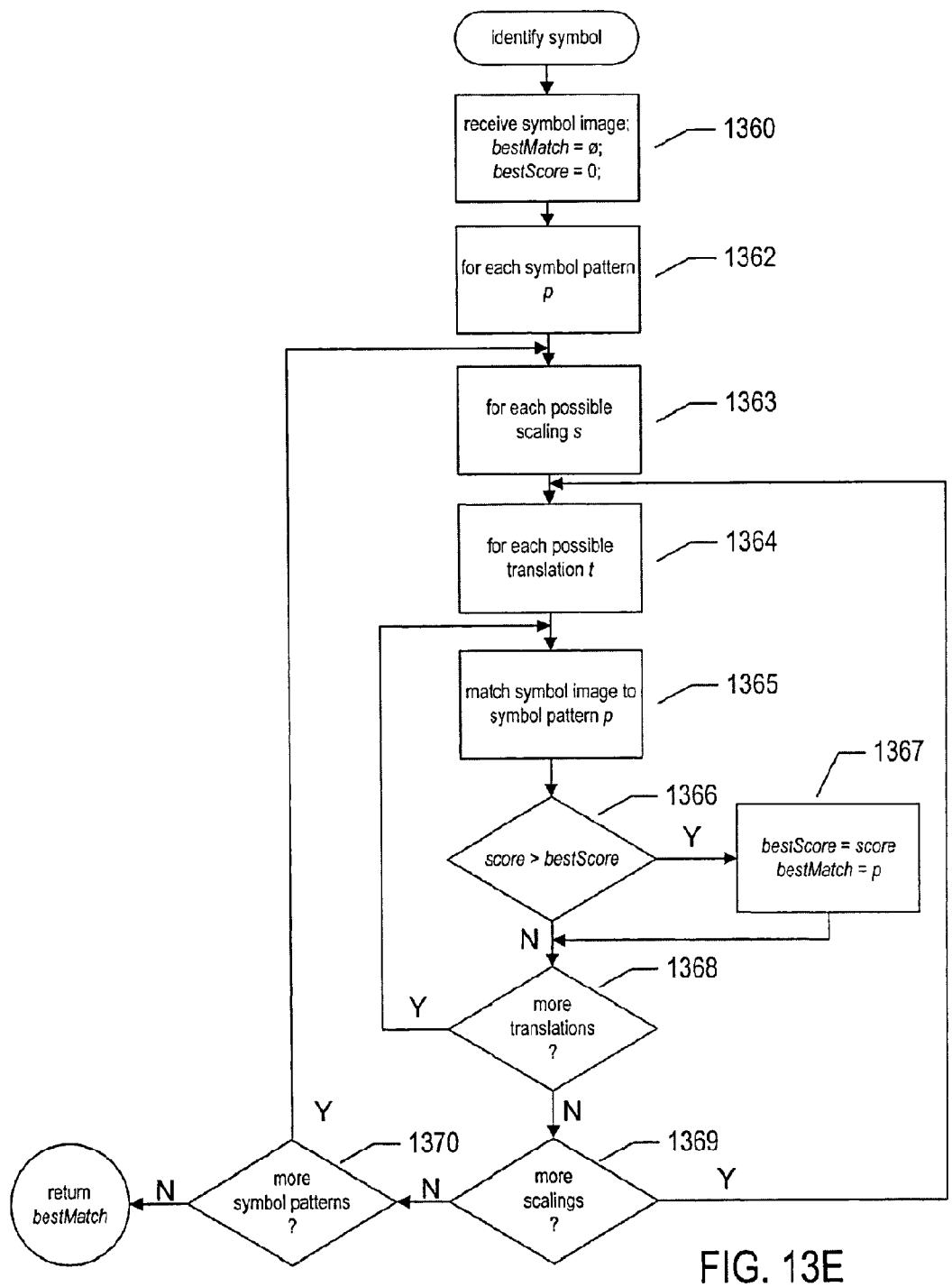

Following completion of the resolution phase of document-image conversion, illustrated by the resolution tree in FIG. 12 above the dashed horizontal line 1220, the leaf-node image elements, such as symbol images and pictures, need to be converted into corresponding digital encodings. This may be carried out by transformation classifiers called by the routine "resolve," discussed above, or as a separate phase of document-image-to-electronic-document conversion. The conversion of symbol images to Unicode characters or to some other digital encoding of symbols represents a significant step in the document-image-to-electronic-document conversion process that, in currently available systems, may be associated with a high computational overhead. FIG. 13E illustrates a routine "identify symbol" which converts a symbol image into a digitally encoded symbol. In step 1360, the routine "identify symbol" receives a symbol image, sets the variable best Match to null, and sets the variable best-Score to zero. Next, in the for-loop of steps 1362-1370, the routine "identify symbol" considers each possible symbol pattern for the language of the text containing the symbol image in order to identify the symbol pattern that most closely matches the symbol image. In the inner for-loop of steps 1363-1369, the routine "identify symbol" considers various different possible scalings of the symbol pattern in order to match the size of the symbol pattern with that of the received symbol image. In the innermost for-loop of step 1364-1368, the routine "identify symbol" considers each of various different possible combinations of vertical and horizontal translations of the scaled symbol pattern with respect to the symbol image in order to align the symbol pattern with the symbol image. In step 1365, the routine "identify symbol" attempts to match the symbol image with the symbol pattern p at the currently considered scaling s and translation t. When a score produced by the matching operation is greater than the score contained in the variable bestScore, as determined in step 1366, then the variable bestScore is updated to contain the score returned by the matching operation just completed in step 1365 and the variable bestMatch is set to reference the currently considered symbol pattern p.

The routine "identify symbol," as the routines "document conversion," "generate resolutions," and "resolve," and the various classifiers represent examples of document-image-to-electronic-document-conversion methods and techniques. There are many different approaches to implementing a document-image-to-electronic-document-conversion method and system described by FIGS. 11A-12.

Figure 14:
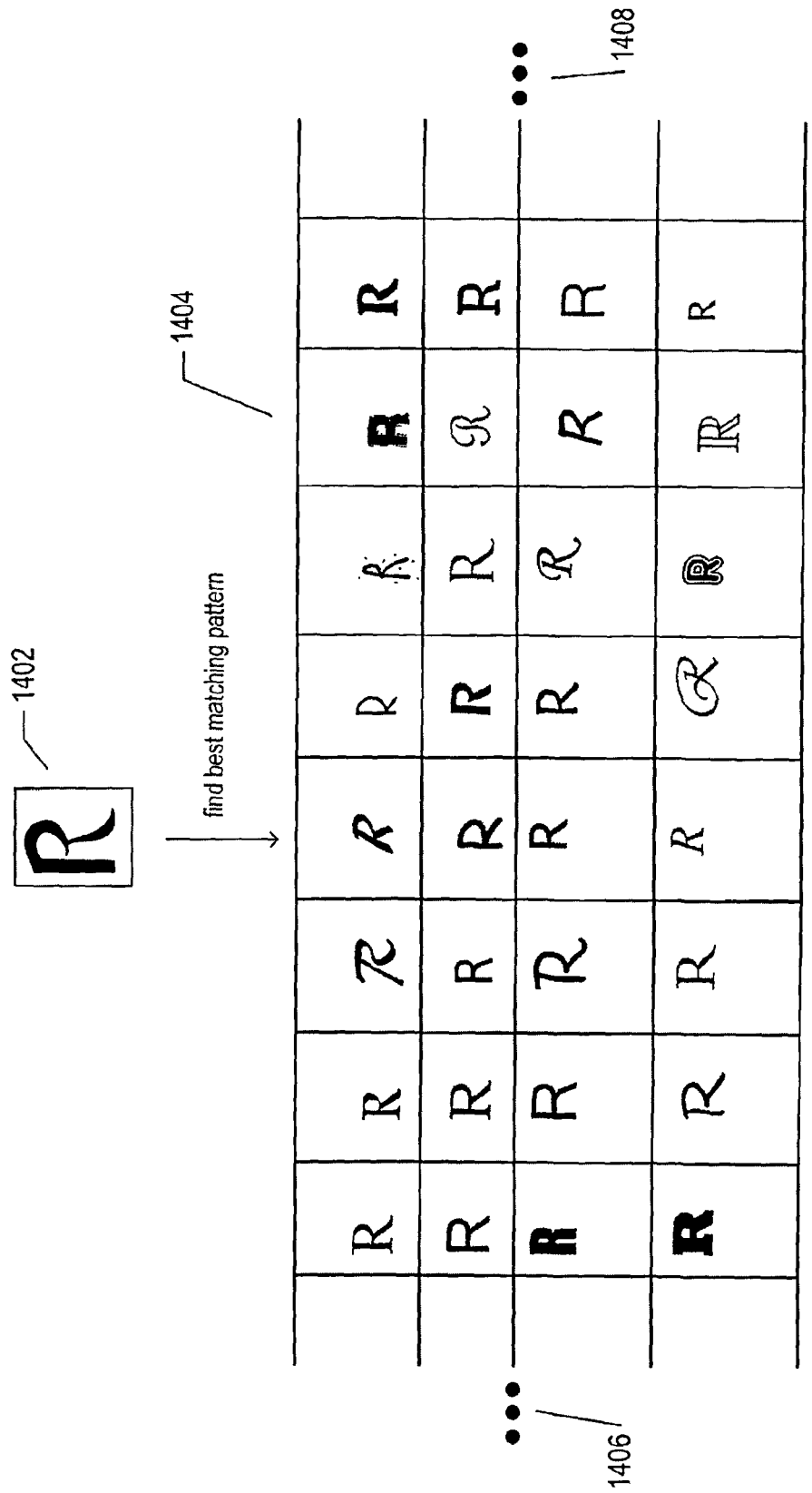
FIG. 14 illustrates a source of computational overhead in currently available document-conversion methods employed in OCR systems.

For character-based languages, such as Mandarin or Japanese, the routine "identify symbol" may need to consider many tens of thousands or more different symbol patterns. Even for alphabetic languages, such as English, the routine "identify symbol" may need to consider many thousands to tens of thousands of symbol patterns. FIG. 14 illustrates a source of computational overhead in currently available document-conversion methods employed in OCR systems. In FIG. 14, the image of a character "R" 1402 is matched, by the routine "identify symbol," against the symbol patterns maintained for the English language. As shown in FIG. 14, there may be a very large number of different symbol patterns even for the character "R," 1404. However, the routine "identify symbol" not only must attempt to match the character image 1402 against the various different symbol patterns corresponding to the character "R," but must attempt to match the character image against the many different character patterns for all of the characters that appear in English-language text, with ellipses on either side of the block of "R" patterns indicating that there are many additional patterns for "R" as well as for all other upper-case and lower-case letters, numerals, and punctuation symbols.

Figure 15:
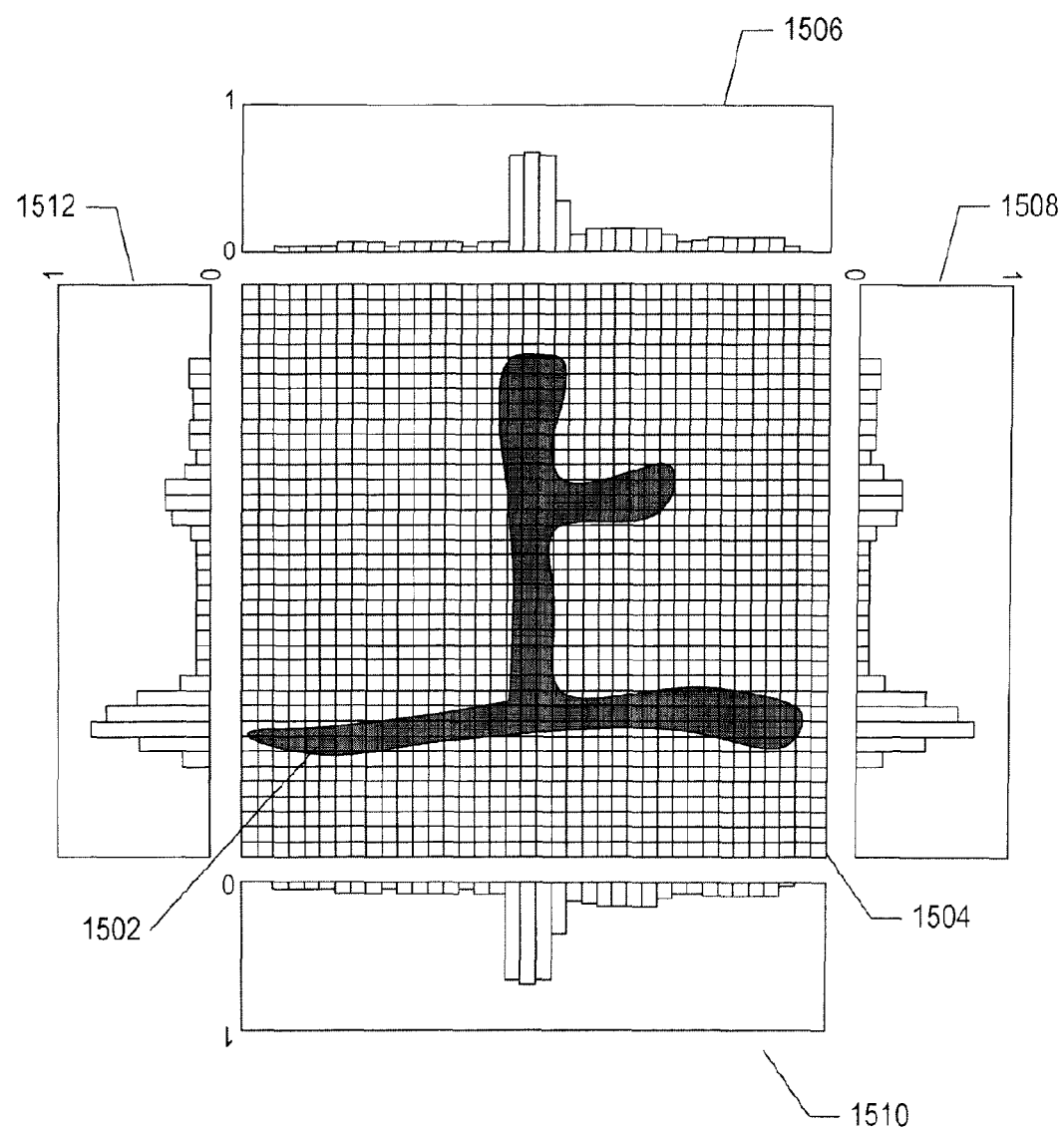
Figure 16:
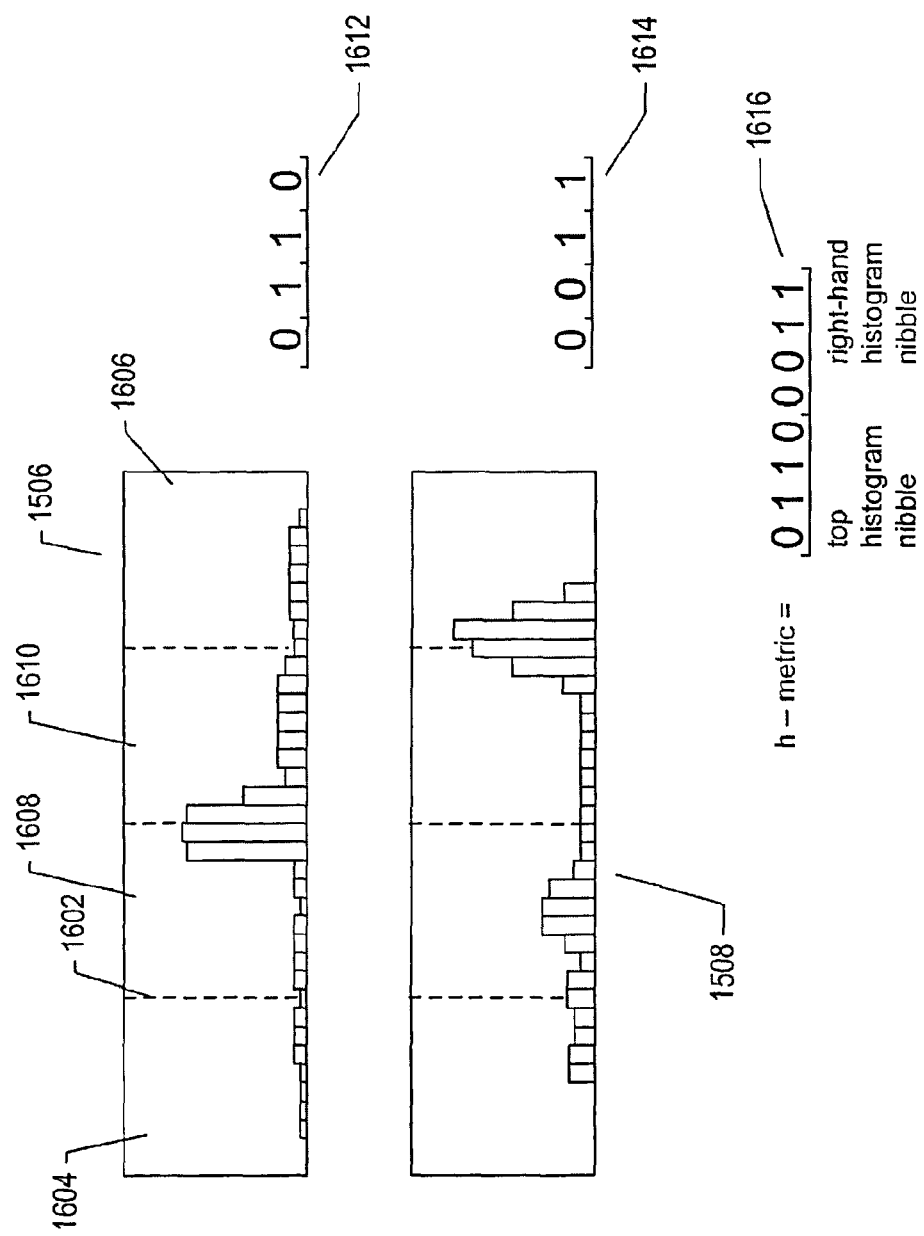

FIGS. 15-17 illustrate one computational approach to determining the identity and orientation of the symbol within a symbol image. This approach is a first type classifier that transforms an image element into a corresponding electronic-document element. In FIG. 15, a Japanese character 1502 is shown superimposed over a rectilinear grid 1504. As in region 508 of FIG. 5, each grid element or cell represents a matrix of pixel elements, as a result of which the character edges appear smooth. At higher magnification, as in region 512 of FIG. 5, the character edges would appear jagged. As discussed above, these pixels are assigned either of two bit values "0" and "1," to indicate whether or not the pixel corresponds to a portion of the background or to a portion of the symbol, respectively. The fraction of pixels within each column of grid elements is plotted in histogram 1506, shown above the rectilinear grid 1504. This histogram represents the horizontal spatial distribution of character pixels within the rectilinear grid, which represents a single-character-containing portion of a scanned-document image. Similarly, histogram 1508 shows the spatial distribution of symbol pixels in a vertical direction. Histogram 1510 is related to histogram 1506 by mirror symmetry, and histogram 1512 is related to histogram 1508 also by mirror symmetry. These histograms are signatures or fingerprints for character identification and orientation.

FIG. 16 illustrates a numeric metric that can be computed based on two of the four histograms shown in FIG. 15. In this figure, an orientation metric, referred to as the "histogram metric" or "h-metric," is computed from the top histogram and the right-hand histogram, 1506 and 1508, computed for a particular symbol in a particular orientation. Each histogram is partitioned into four regions by dashed vertical lines, such as dashed vertical line 1602. Each region is assigned a value "0" or "1" depending on whether or not a histogram column within the region exceeds a threshold value, such as 0.5. These bit values are ordered in the same order as the partitions. Thus, for example, for histogram 1506, there is no column in partitions 1604 and 1606 that exceeds the threshold value or height 0.5 while, in partitions 1608 and 1610, there is at least one column of the histogram that exceeds the threshold value or height 0.5. Thus, the bit values assigned to the partitions generate the four-bit nibble "0110" 1612. A similar computation for the right-hand histogram 1508 generates the four-bit nibble "0011" 1614. These two four-bit nibbles can be concatenated to generate an eight-bit h-metric 1616.

FIG. 17 illustrates the h-metrics generated for each of the four orientations for the asymmetric character shown in the lower row of FIG. 14. Each orientation of the character is shown in column 1702, with the corresponding eight-bit h-metric shown in column 1704 and the equivalent decimal number shown in column 1706. Clearly, generation of h-metrics for each of the possible orientations of a character allows the orientation of a character in a scanned-document image to be easily determined. Similarly, different characters generate different histograms and would have different h-metrics in each orientation than those for the Japanese character 1502.

Figure 18:
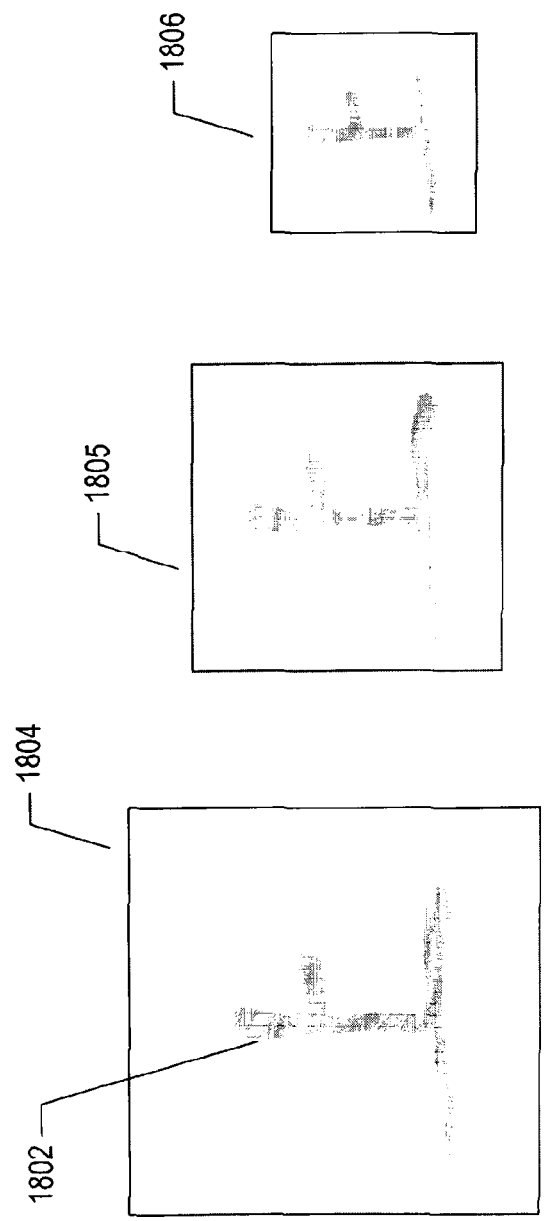
FIGS. 18-19B illustrate a different metric that can be employed to recognize a character in a scanned-document image.
Figure 19A:
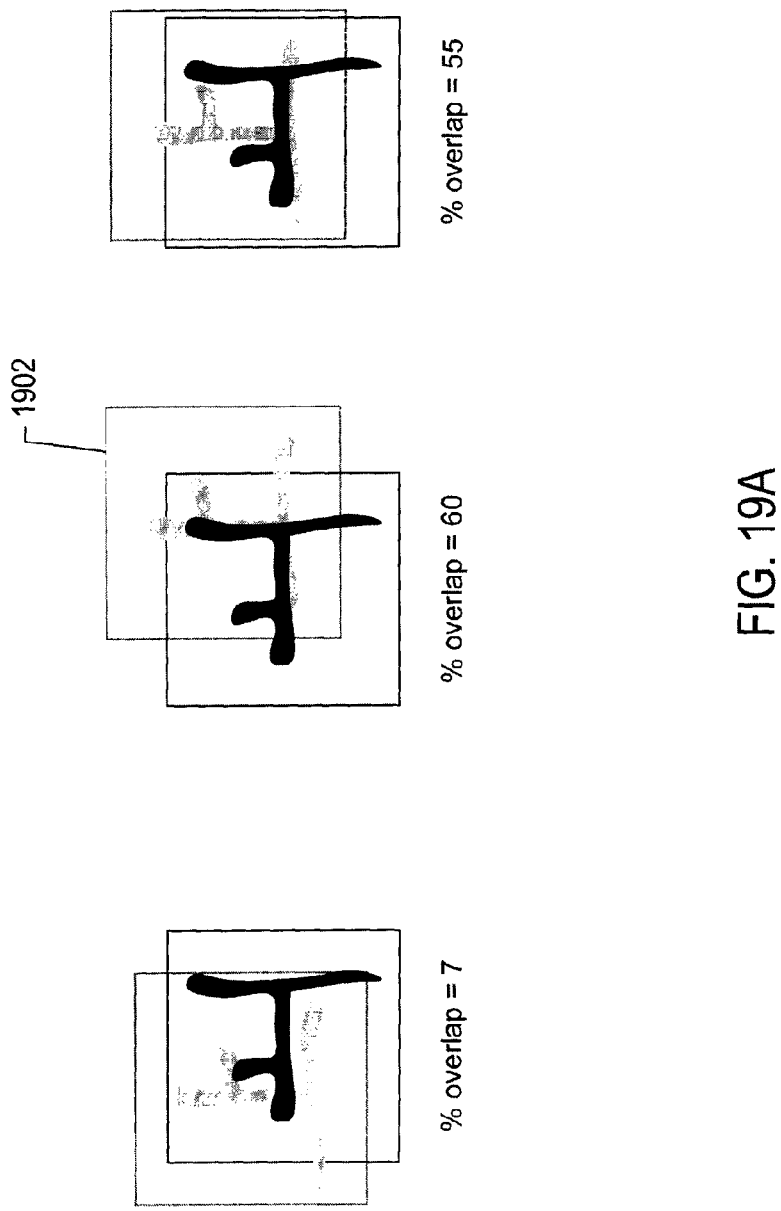

FIGS. 18-19B illustrate a different metric that can be employed to recognize a character in a scanned-document image. This metric can be used by a second type classifier that transforms an image element into a corresponding electronic-document element. FIG. 18 shows a representation of a character 1802 at three different scales 1804-1806. In order to recognize a particular symbol as well as the orientation of the symbol, the representation may be superimposed over a single-character-containing region of the scanned-document image and translated vertically and horizontally in order to compute the percentage overlap of the representation of the character with symbol pixels in the single-character-containing region of the scanned-document image at different positions. An overlap metric, or o-metric, may be obtained as the maximum overlap of the representation with symbol pixels in the underlying region of the scanned-document image for all of the possible positions. For example, in FIG. 19A, several different positions of the representation with respect to the underlying region of the scanned-document image are shown, with position 1902 providing the maximum overlap of 60 percent. When the same process is carried out for a region of a scanned-document image which contains the same character with the same orientation as represented by the representation, then a maximum overlap of 100 percent 1904 is obtained. Thus, 1 minus the maximum overlap, expressed as a fraction between 0 and 1 is an additional orientation and character-recognition metric that can be used alone or in combination with the above-described h-metric to both recognize a character within a scanned-document image and determine the orientation of the orientation-marker character. The o-metric value theoretically falls within the range [0, 1], with 0 indicating perfect overlap and 1 representing no overlap although, in practice, values above 0.95 are not generally obtained. As with the h-metric, there are many possible alternative approaches to generating an o-metric, such as that discussed above with reference to FIGS. 18-19A. For example, the o-metric may be alternatively computed as the difference between the maximum overlap and the average observed overlap over all positions of the character representation considered. Other types of metrics may include the percentage of symbol pixels within a single-character-containing region of a scanned-document image, or the percentage of symbol pixels within sub-regions of a single-character-containing region of a scanned-document image. In many implementations, tens to hundreds of different metrics may be used to recognize a character and the character's orientation.

Figure 20A:
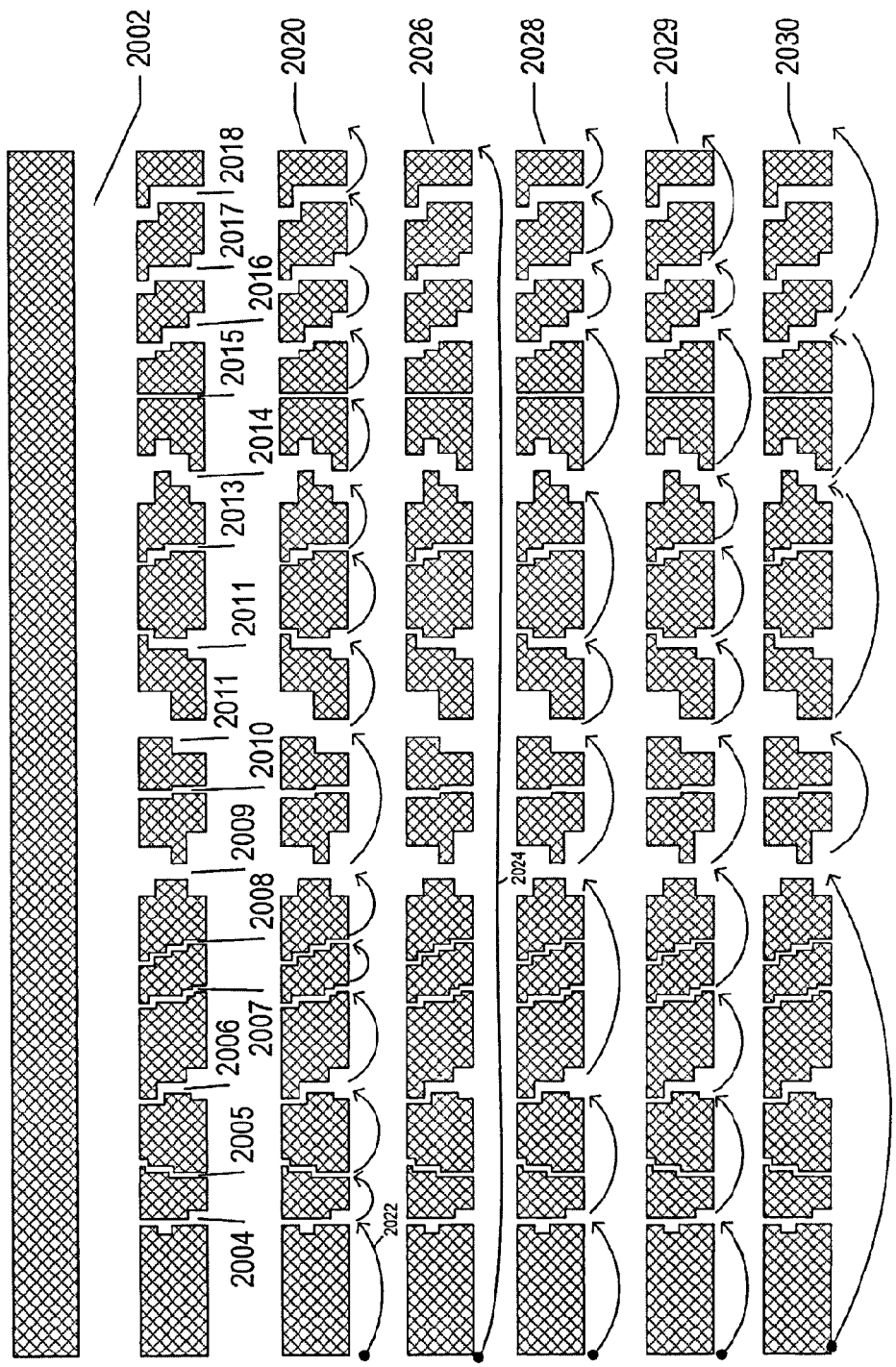
Figure 20B:
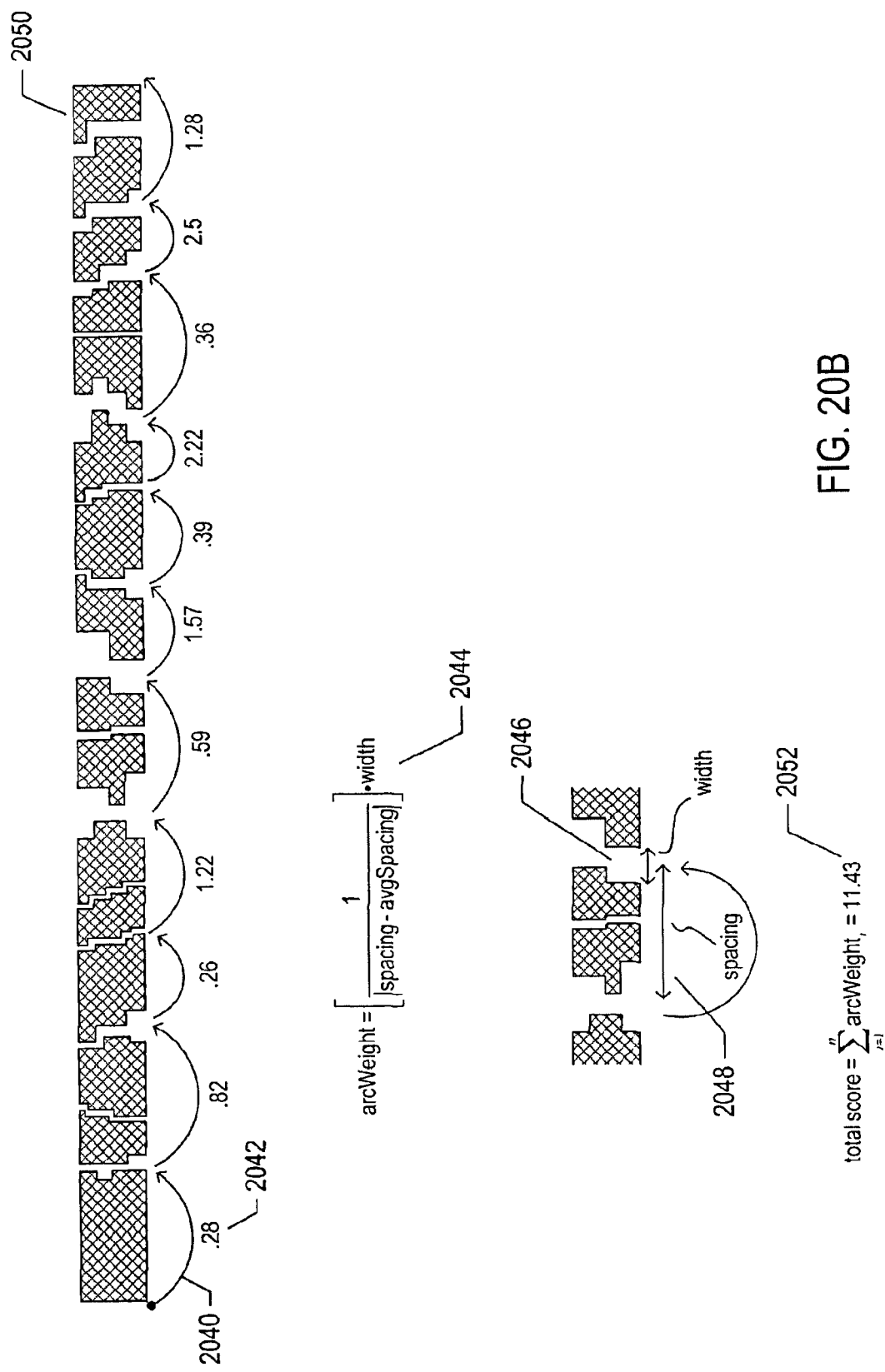

FIGS. 20A-B illustrate a type of classifier that may be used to generate hypotheses, or resolutions, with respect to resolving an image of a line of text into a sequence of symbol images. This third type of classifier resolves a document-image element into a set of lower-level document-image elements. This type of classifier is illustrated abstractly in FIGS. 20A-B. At the top of FIG. 20A, a text-line image 2002 is represented as a cross-hatched horizontal bar. In a first step undertaken by the third type of classifier, contiguous non-character bits within the bitmap representing with a text line that span the width of the text line are identified. These are shown as gaps 2004-2018. Next, the classifier may consider all possible paths that lead from the beginning of the text line to the end of the text line through the identified white-space gaps. For example, a first path that traverses all of the identified paths is illustrated with respect to gap text line 2020, where the path consists of a series of arcs, such as arc 2022. There are 15 gaps (2004-2018) and therefore 15 different arcs in the path illustrated with reference text line 2020. At the other extreme, there is a path of a single arc 2024 illustrated with respect to text line 2026. Three additional paths are illustrated with respect to text lines 2028-2030. Each possible path represents a different hypothesis with respect to grouping regions of the text-line image into higher-level elements.

In order to control the potential combinatoric explosion that would ensue by considering every possible hypothesis, or path, as a separate resolution during a document-image-conversion process, the possible paths are generally scored, and only the top-scoring path or some number of top-scoring paths are selected as hypotheses. FIG. 20B illustrates path scoring. In the approach shown in FIG. 20B, each arc, such as arc 2040, is associated with a weight, such as the weight 0.28 2042 associated with arc 2040. There are many ways to compute an arc weight. In one example, the arc weight is computed 2044 as the width of the white-space gap at the base of the text line to which the arc points 2046 times the inverse of the absolute value of the difference between the spacing represented by the arc 2048 and an average spacing for the text line, a text block including the text line, or some other higher-level image element. This particular arc-weight calculation 2044 assumes that the wider the gap, the more likely the gap represents a boundary between symbols or words and that the lengths of symbols or words fall about an average length. This third type of classifier may be used to resolve text lines into symbols, in one case, or to resolve text lines into words, in another case. The weighting function to determine arc weights may vary depending on whether the text line is being resolved into symbols or into words. The final score for the hypothesis represented by a particular path that traverses the white-space gaps, such as the path represented by the arcs in text line 2050 in FIG. 20B, is computed as the sum of the weights of the individual arcs 2052.

Challenges in Processing Arabic-Like Text

Figure 21:
FIG. 21 provides an example of a document image that includes Arabic text.
Figure 22:
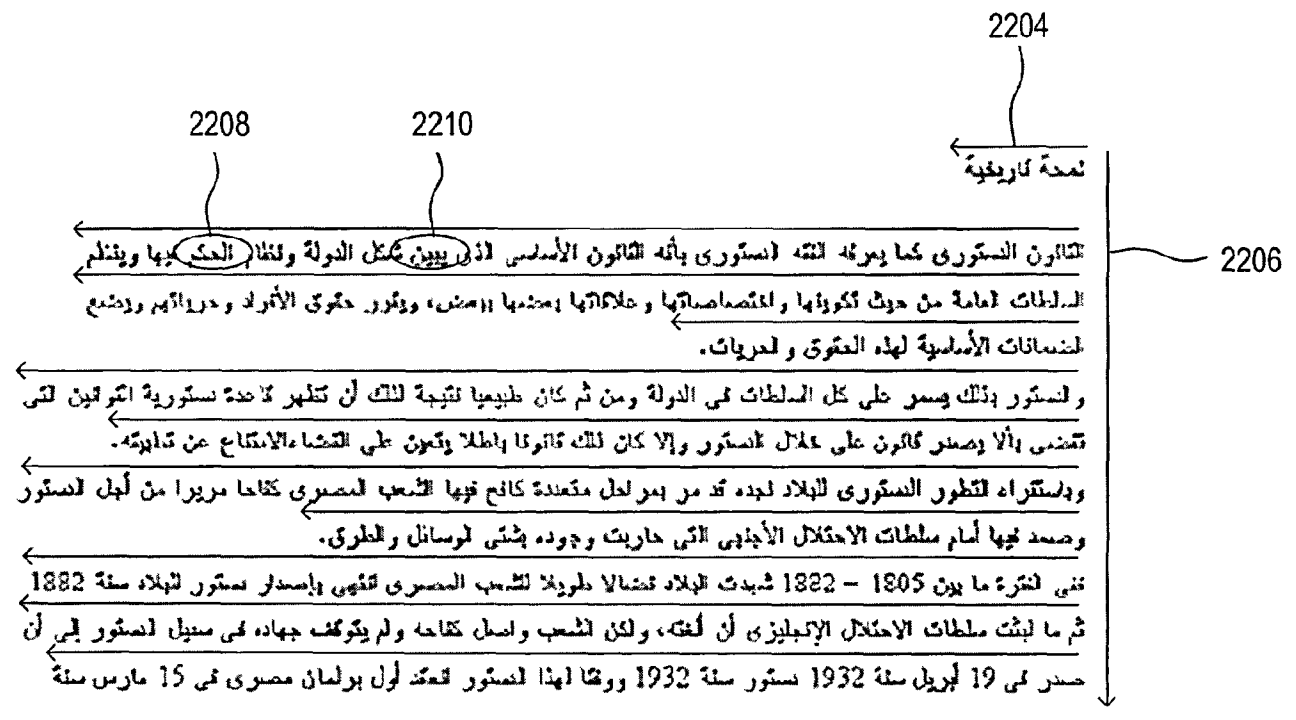

FIG. 21 provides an example of a document image that includes Arabic text. Currently available OCR methods and systems do not reliably convert document images containing Arabic-like text. FIG. 22 illustrates certain characteristics of Arabic-like text. The same writing system used for various dialects of Arabic is also used for other languages, including Persian, Pashto, Urdu, and several Turkish languages. Moreover, characteristics of Arabic-like text can be found in the Devanagari, Hindi, and Korean languages.

One characteristic of Arabic-like text is that the text lines are read from right to left 2204 and from top down 2206. Another characteristic of Arabic-like text is that individual alphabetic symbols are joined together into largely continuous text elements that represent words 2208 and 2210. By contrast, in English, German, Russian, and other alphabetic languages, the individual symbols are generally separated from one another by white space when printed.

Figure 23:
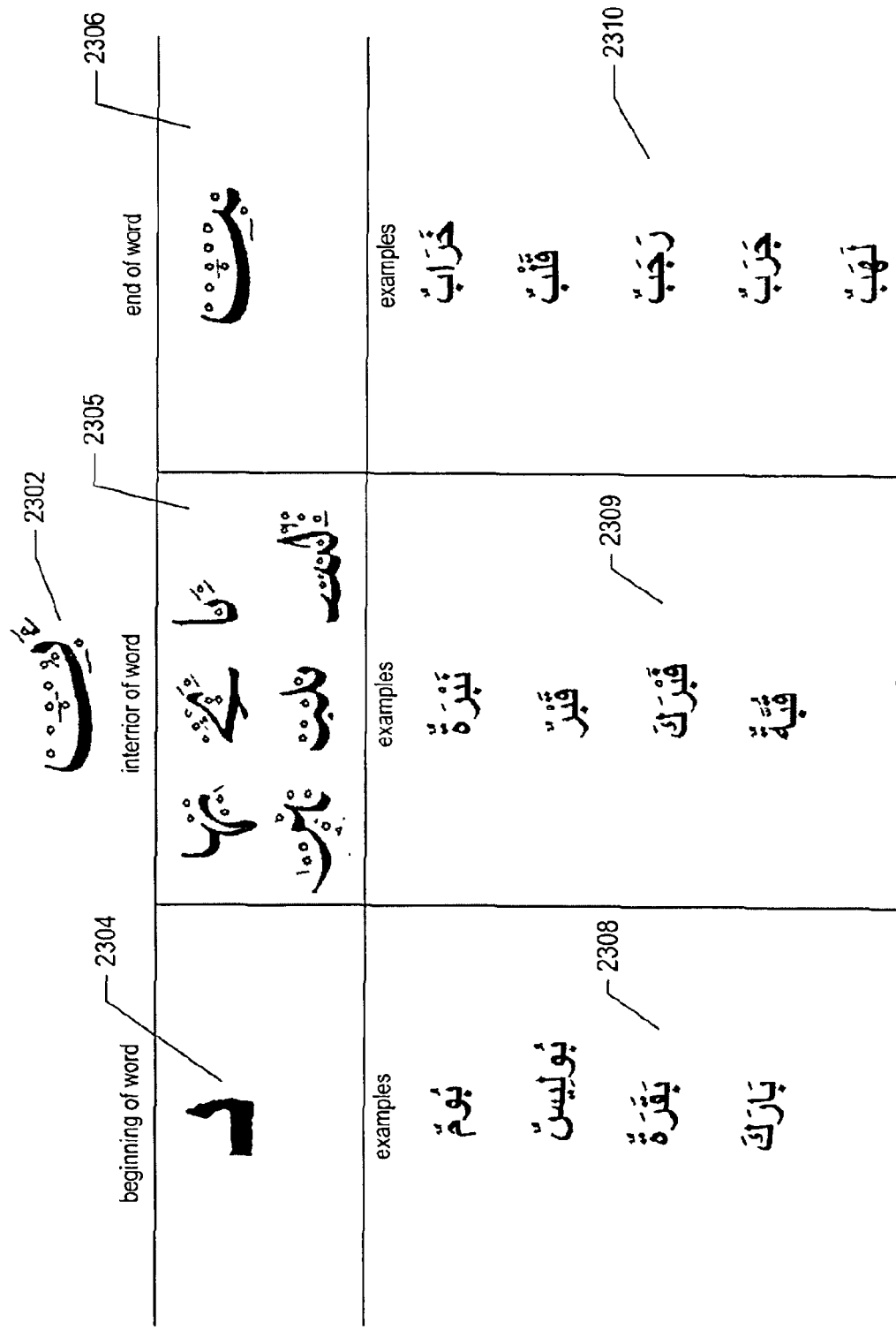
FIG. 23 shows additional features of Arabic-like text.

FIG. 23 shows additional features of Arabic-like text. FIG. 23 shows various different ways in which one alphabetic symbol, "ba," may be written depending on where, in a word, the symbol "ba" occurs. When written by itself, the symbol "ba" is a slightly slanted, lower portion of a loop or ellipse 2302. However, when written at the beginning of a word, the symbol "ba" has a form 2304, when written in the interior of a word, the symbol "ba" has various different representations that can be seen in multi-symbol combinations 2305, and, when written at the end of a word, the symbol "ba" has a form seen in the symbol combination 2306. In FIG. 23, below the beginning-of-the-word, interior-of-the-word, and end-of-the-word forms of "ba" are provided in numerous examples 2308-2310.

Figure 24:
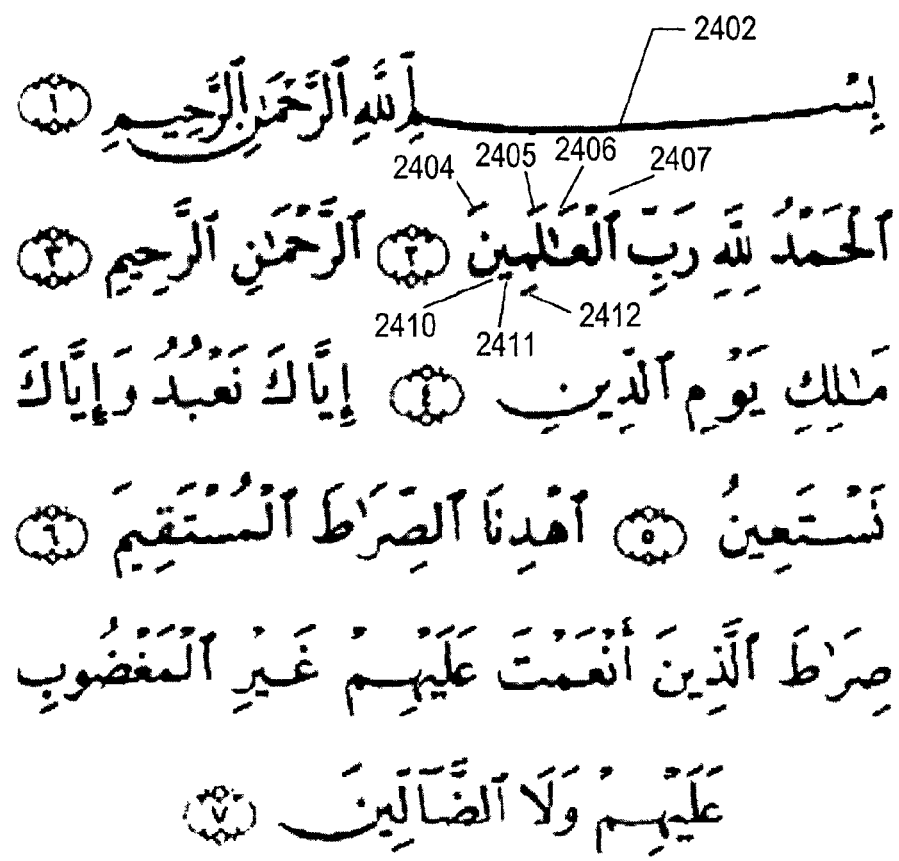
FIG. 24 illustrates yet additional characteristics of Arabic-like text.

FIG. 24 illustrates yet additional characteristics of Arabic-like text. One additional characteristic is that, in order to provide various degrees of spacing within text lines, two alphabetic symbols may be joined by a very long lengthening stroke 2402. Another additional feature is that Arabic-like text generally includes a large number of different types of diacritical marks, such as diacritical marks 2404-2407 and 2410-2412. These diacritical marks may represent various vowels, which generally are not symbolically written out in Arabic-like text, may represent emphasis, and may be used for other linguistic reasons. Often, the diacritical marks are optional, and are not uniformly applied. Another additional feature is that, while words are generally formed by joining numerous alphabetic symbols together, certain words may also include white-space breaks. Thus, while words are generally sets of alphabetical symbols linked together to produce a continuous metasymbol, as when words are written longhand in English, there are cases when gaps do appear within words.

Figure 25:
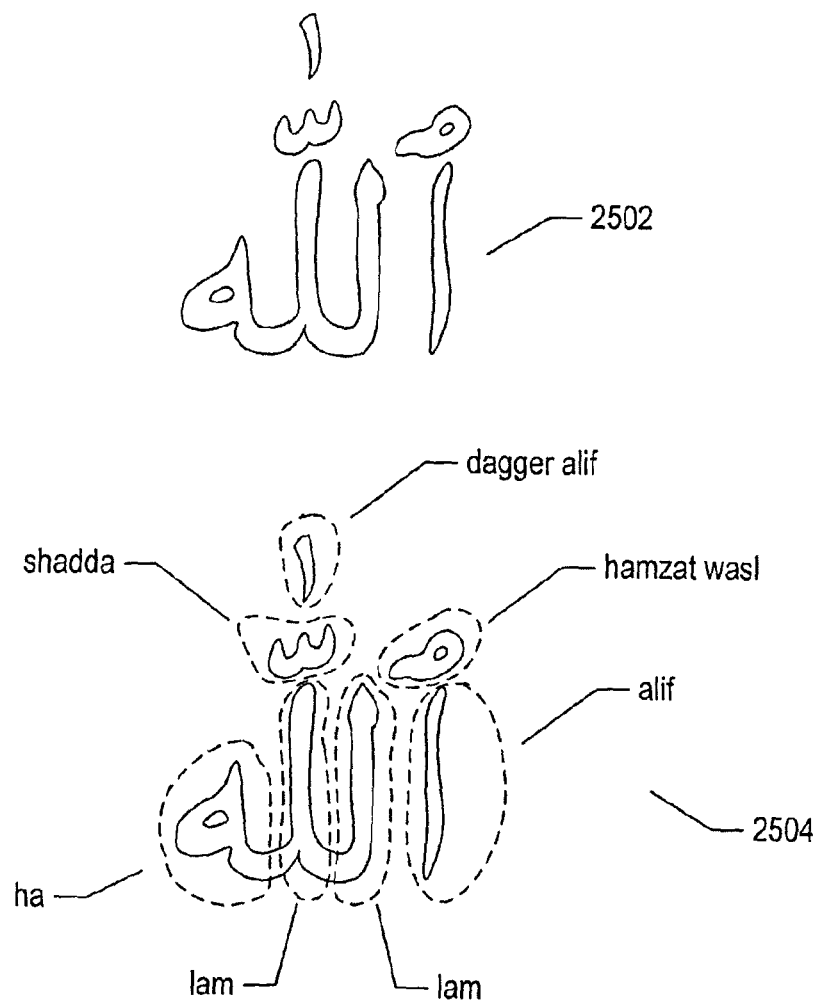
FIG. 25 illustrates yet an additional feature of Arabic-like text.

FIG. 25 illustrates yet an additional feature of Arabic-like text. In Arabic, there are many different ligatures in which individual alphabetic symbols, or portions of alphabetic symbols, are combined together to produce symbols representing combinations of fundamental symbols. These combination symbols may be symbol-like sub-words or may represent entire words. In FIG. 25, the ligature 2502 representing the word "Allah" is shown. The different parts of this ligature are illustrated using dashed circles and identified with symbol names in the representation 2504 of the ligature 2502 in the lower portion of FIG. 25.

Figure 26:
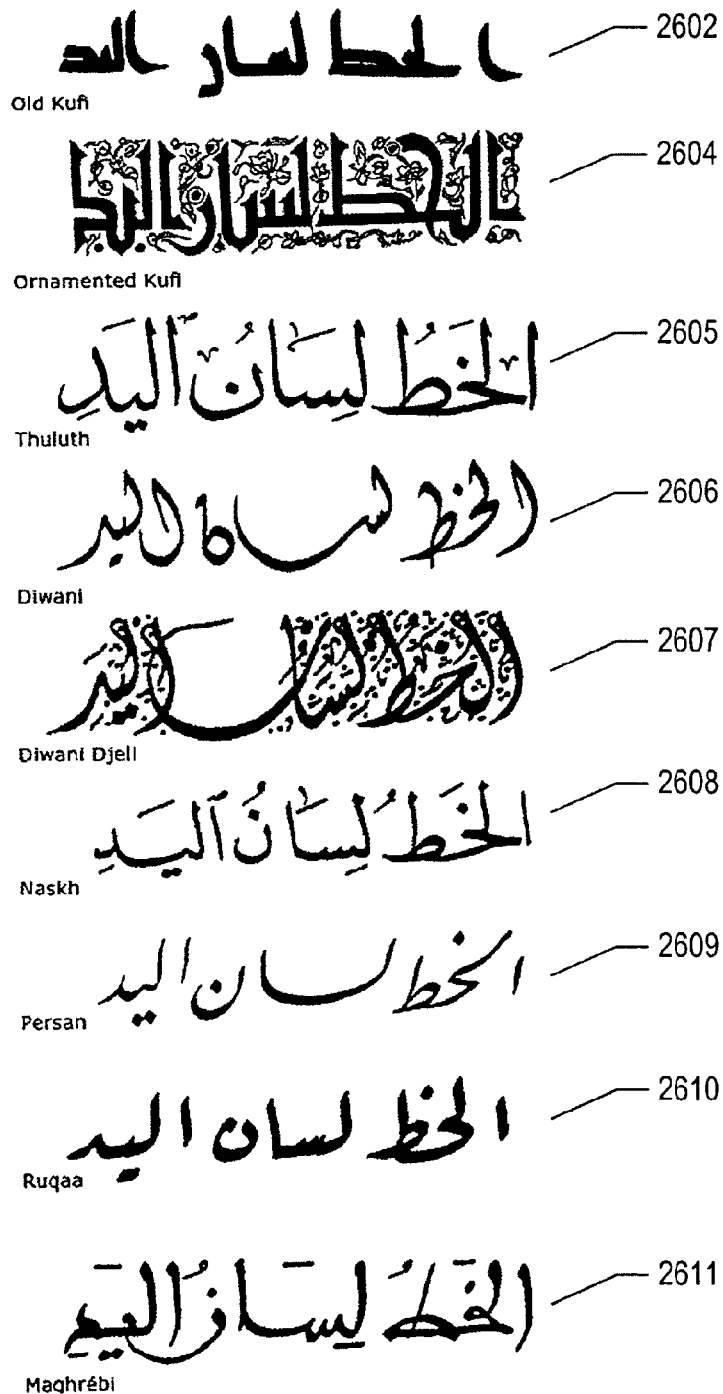
FIG. 26 shows yet an additional feature of Arabic-like text.

FIG. 26 shows yet an additional feature of Arabic-like text. In FIG. 26, a phrase written in a first script 2602 is shown written in a variety of additional scripts 2604-2611. As is readily apparent in FIG. 26, the different scripts, from an image-comparison standpoint, are quite different from one another.

Figure 27:
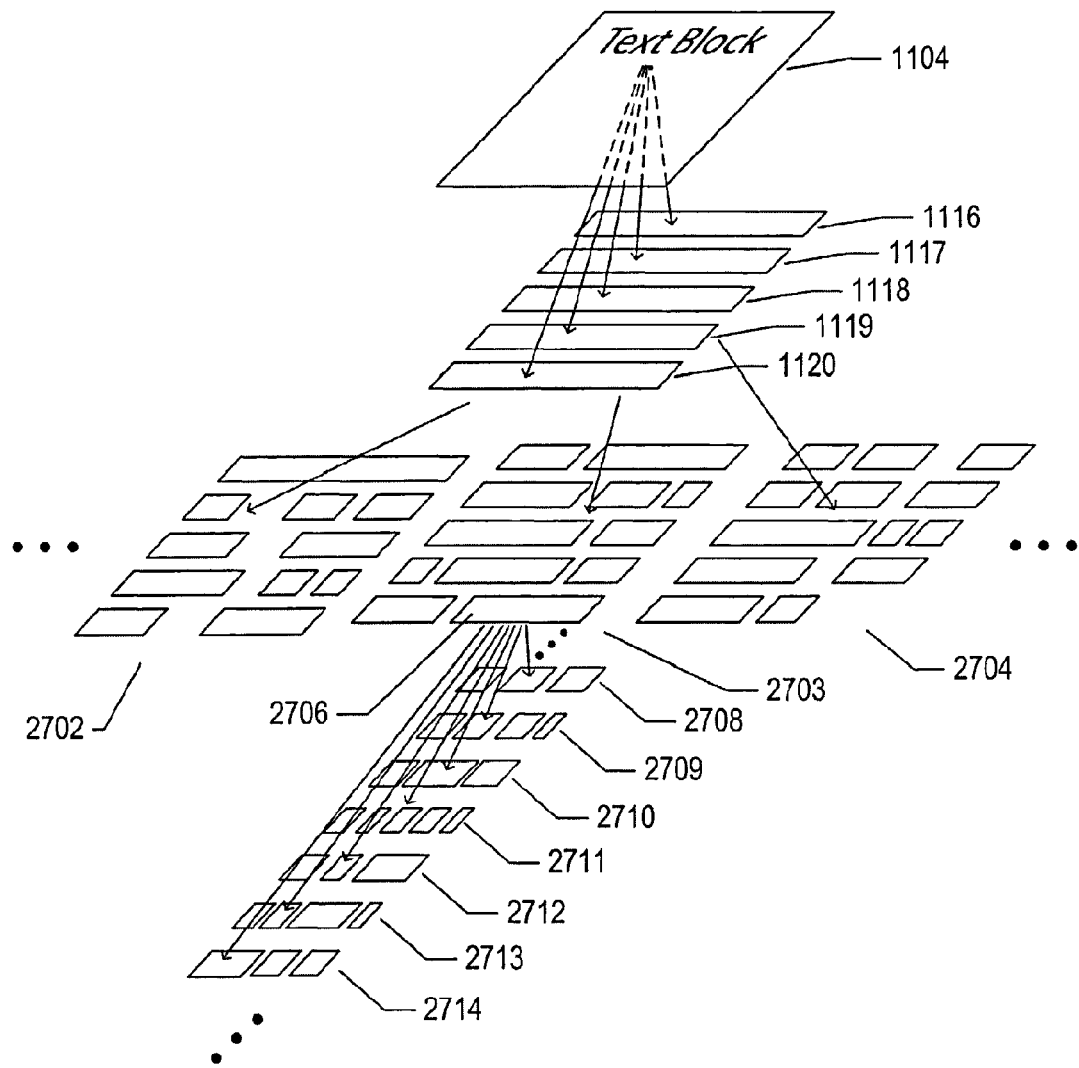
FIG. 27 illustrates a significant challenge associated with using conventional OCR techniques to recognize Arabic characters.

FIG. 27 illustrates a significant challenge associated with using conventional OCR techniques to recognize Arabic characters. In FIG. 27, the traditional methods discussed above with reference to FIGS. 11A-B have been employed to recognize text block 1104 and to resolve the text block into lines of text 1116-1120. However, in the case of Arabic-like languages, there are generally significantly more possibilities with respect to resolving lines of text into candidate words, such as line-to-word resolutions 2702-2704, and many more possibilities with respect to resolving candidate words into characters, such as the resolution of candidate word 2706 into various different possible sets of characters 2708-2714. As a result, the computational complexity of the traditional methods discussed above with respect to FIGS. 11A-B may exceed practical limits for tractability on even high-powered, modern computer systems. Furthermore, because of the many different possibilities with respect to resolving candidate words into characters, it is unlikely that a single, best resolution and corresponding electronic document can be obtained by traditional methods. Instead, traditional methods generally produce a large number of possible electronic documents that are often indistinguishable by figures of merit or probabilities of correctness.

Because of all of the features of Arabic-like text discussed above with reference to FIGS. 22-25, the approach to document-image conversion, discussed above with reference to FIGS. 13A-E cannot be effectively used for documents containing Arabic-like text. One basic reason is that there are simply far too many alternative representations of any given alphabetical symbol to allow for the comprehensive pattern-matching technique, illustrated in FIG. 13E, to be applied to Arabic-like text. As another example, because of the optional diacritical marks and because most vowels are not written as alphabetic symbols, a great deal of contextual information is necessary in order to determine which alphabetic symbols are explicitly or implicitly contained within any given portion of a text line. Consideration of such contextual information involves spanning hierarchical levels of resolution and similar hierarchical levels of electronic-document construction in ways that greatly complicate both document-image resolution and electronic-document construction as well as add tremendous additional computational overhead. A third reason is that morphemes and words in Arabic-like languages are continuous entities, rather than sequences of discrete symbols, and there are far more possible hypotheses, or resolutions, of a text-line image into symbol images than in the case of languages in which words comprise discrete characters or symbols. For all of these reasons, currently available approaches to conversion of text-containing document-image elements do not produce reliable conversion of text images containing Arabic-like text.

Methods and Systems to which the Current Application is Directed

Figure 28A:
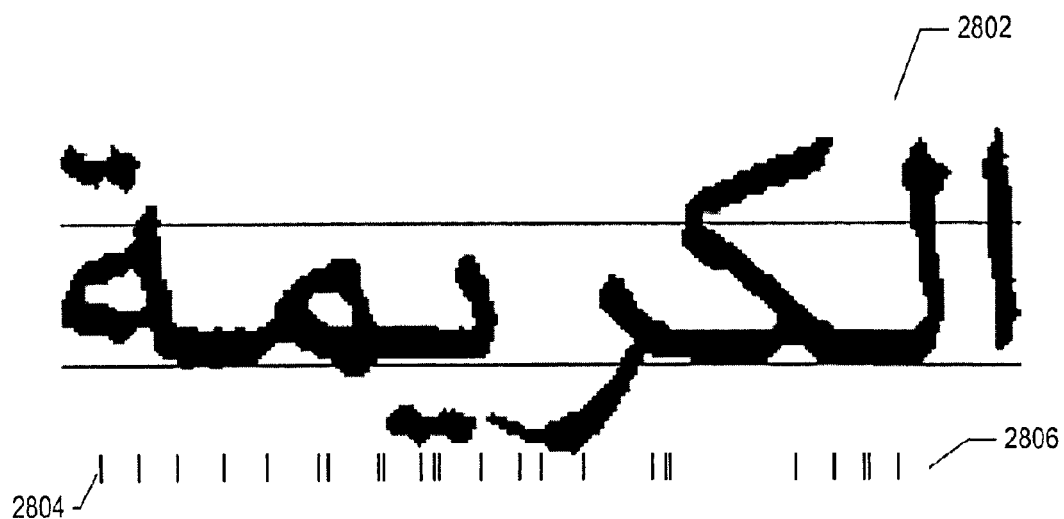
FIGS. 28A-B and 29 illustrate and motivate an approach represented by the OCR methods disclosed in the current application that find utility when applied to Arabic-like languages.
Figure 28B:
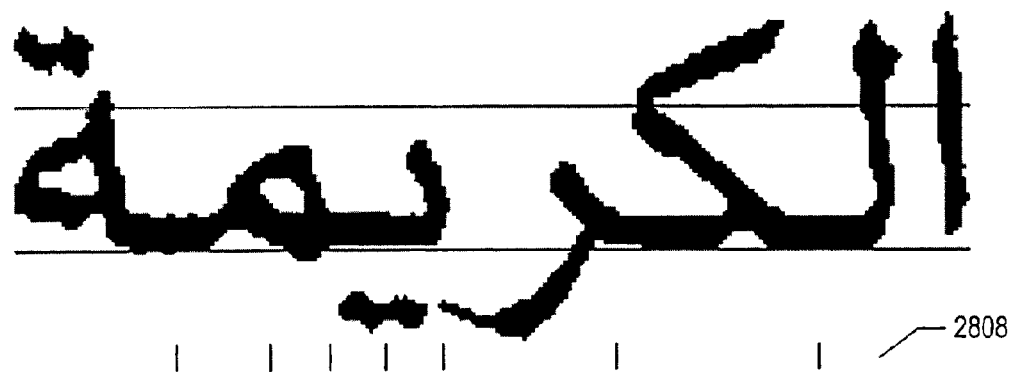
Figure 29:
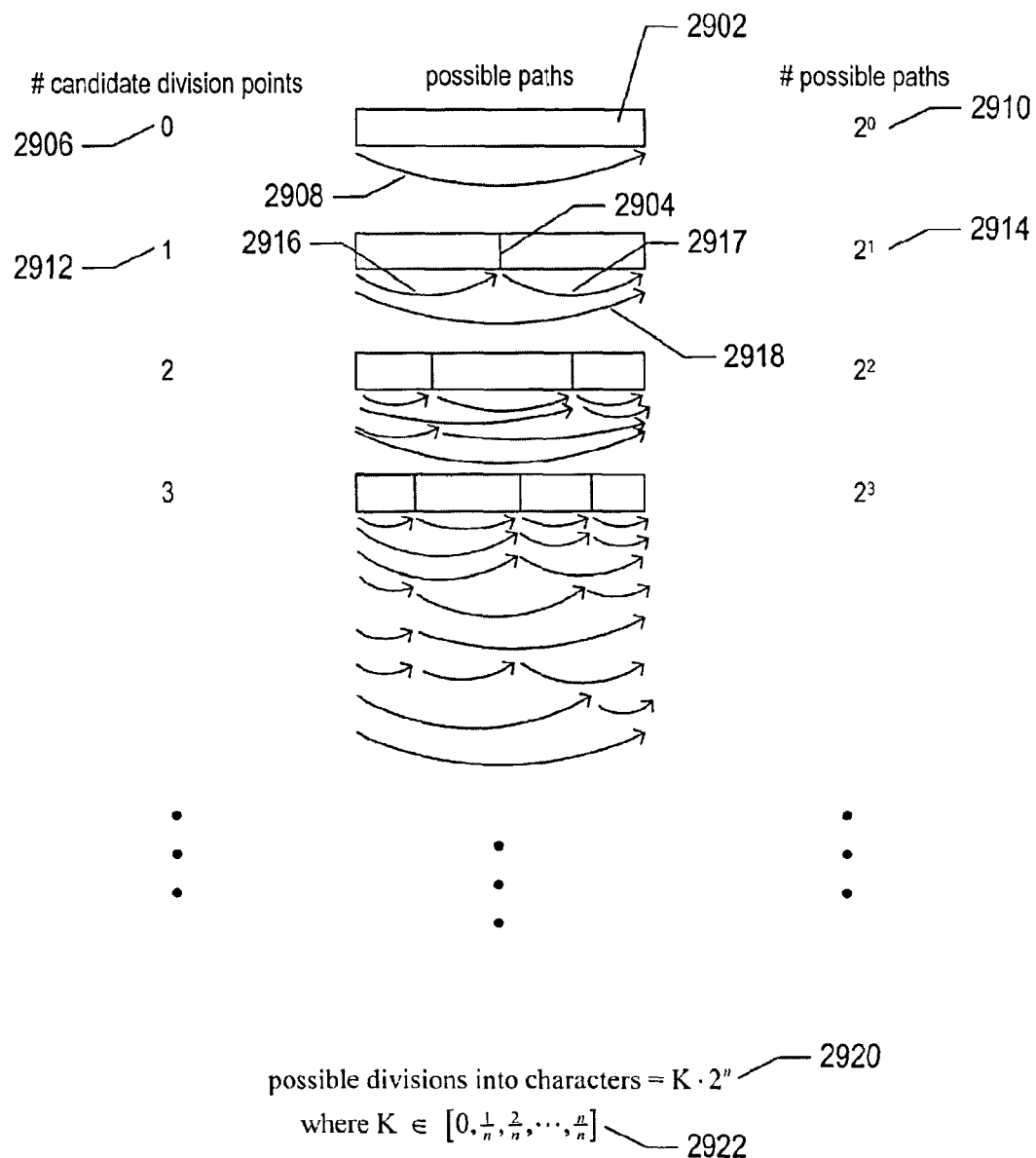

FIGS. 28A-B and 29 illustrate and motivate an approach represented by the OCR methods disclosed in the current application that find utility when applied to Arabic-like languages. FIG. 28A shows an Arabic word 2802, below which small vertical lines, such as vertical line 2804, indicate positions in which traditional OCR methods, discussed above with reference to FIGS. 11A-B, recognize potential points of division between characters. By contrast, FIG. 28B, using the same illustration conventions as used in FIG. 28A, shows the potential points of division between characters generated by the OCR methods discussed below. As can be readily appreciated from comparing FIG. 28A to FIG. 28B, the number of potential division points 2806 generated by traditional OCR methods significantly exceeds the number of potential character division points 2808 generated by the currently disclosed methods.

FIG. 29 illustrates why decreasing the number of potential division points between characters facilitates OCR of Arabic-like text. In FIG. 29, a word, phrase, or morpheme is represented by a horizontal bar 2902. FIG. 29 uses vertical line segments, such as vertical line segment 2904, to represent potential points of division between characters. When there are no potential points of divisions between characters 2906, as in the example morpheme, word, or phrase 2902, then there is only a single possible resolution of the morpheme, word, or phrase 2902, or single traversal path through the word, phrase, or morpheme in the sense of the paths discussed above with reference to FIGS. 20A-B. The single traversal path is indicated by arrow 2908 and the number of possible traversal paths in the case of no potential division points between characters is $2^0$, or 1 (2910 in FIG. 29). In the case that a single point of division between characters is found 2904, the single division point 2912 provides for two different possible traversal paths 2914, the first of which includes arrows 2916-2917 and the second of which includes arrow 2918. As can be seen from the progression of increasing number of points of division, in the downward vertical direction FIG. 29, the number of possible traversal paths is $2^n$, where n is the number of potential division points between characters within a morpheme, word, or phrase. The number of traversal paths representing possible divisions of a morpheme, word, or phrase into characters is equal to $K \cdot 2^n$ 2920, where $$K \in \left[0, \frac{1}{n}, \frac{2}{n}, \ldots, \frac{n}{n}\right] \quad 2922.$$

The constant K represents pruning of all possible traversal paths that occurs in traditional OCR systems to only those traversal paths with favorable probabilities of figures of merit. Therefore, the number of resolutions of text lines into characters increases exponentially with the number of potential division points between characters identified by an OCR method within a line of text. Clearly, minimizing the number of potential division points recognized during OCR processing can significantly decrease the computational overhead of the OCR method and can make tractable an otherwise computationally intractable OCR task. However, decreasing the number of potential division points between characters, alone, does not address the computational-complexity challenge. Instead, not only should the number of potential division points between characters be reduced, but the reduced set of potential division points between characters should be those potential division points with the highest probabilities of representing actual division points between characters. Otherwise, computational complexity would be lowered by lowering the probability of correctly converting a text image into a corresponding text encoding. The currently disclosed system and method additionally avoids generating unreasonable and unproductive traversal paths, as discussed below.

Figure 30A:
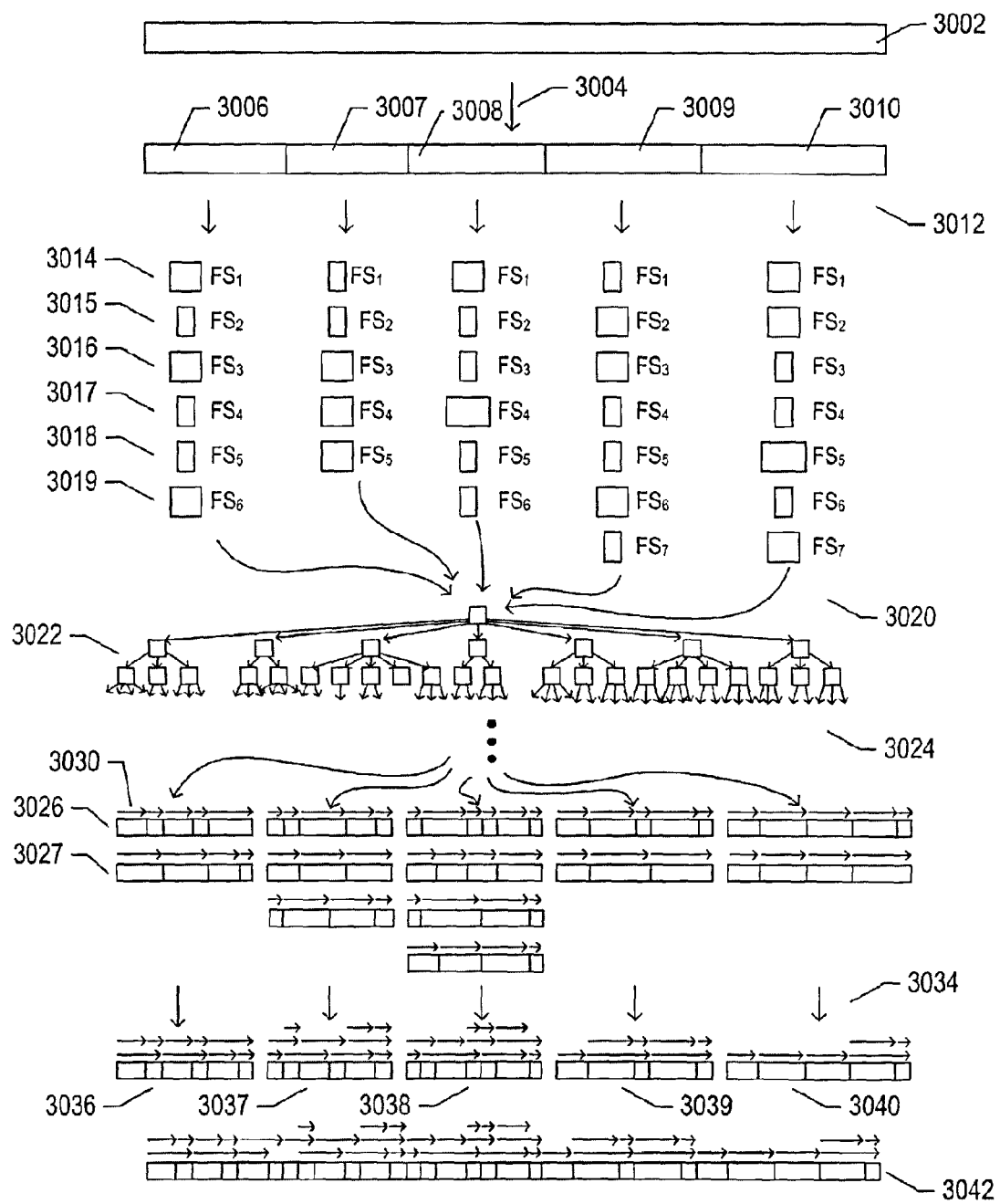
FIGS. 30A-B illustrates an example of OCR methods that resolve text lines into characters or symbols to which the current application is directed and which is particularly applicable to Arabic-like text.
Figure 30B:
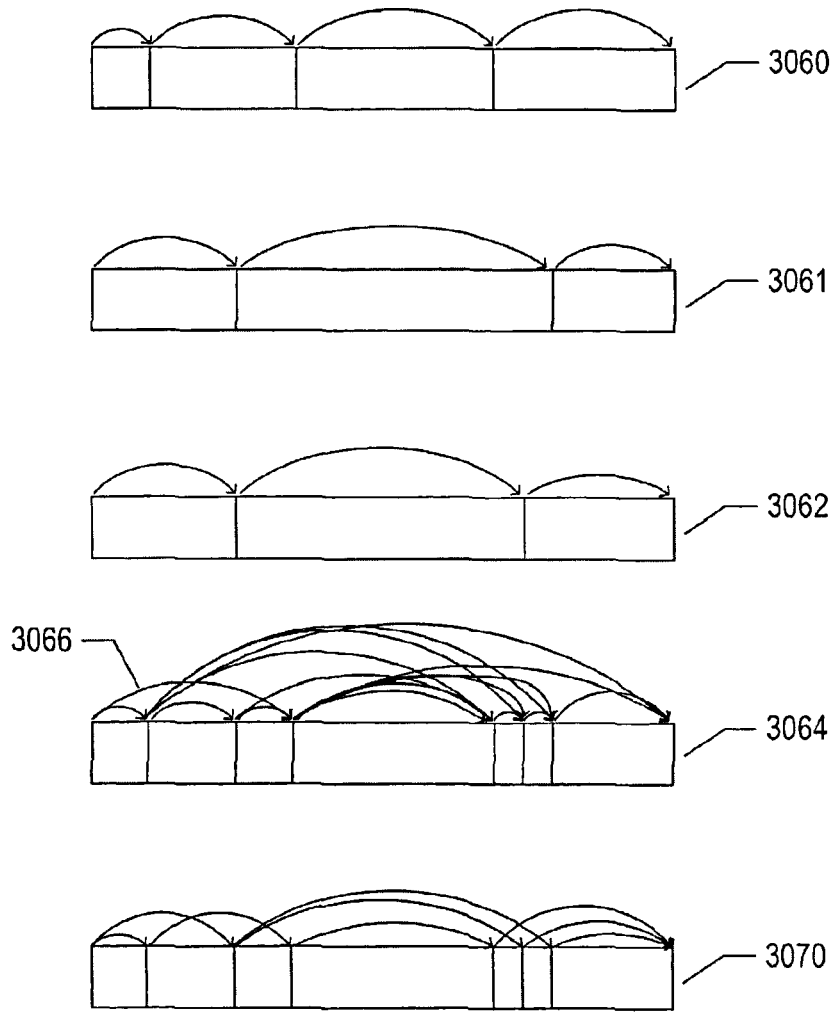

FIGS. 30A-B illustrates an example of OCR methods that resolve text lines into characters or symbols to which the current application is directed and which is particularly applicable to Arabic-like text. In FIG. 30, a line of Arabic-like text is represented by horizontal bar 3002. In a first step 3004, the line of text is divided into morphemes and/or words 3006-3010. This step is carried out by recognizing breaks in the continuity of the text, or vertical continuous white space gaps that span the line of text in a vertical direction, as discussed above with reference to FIGS. 20A-B. In a second step 3012, each morpheme or word in the text line is transformed into a sequence of feature symbols with associated parameters, such as the sequence of feature symbols with associated parameters 3014-3019 obtained by transformation of the morpheme or word 3006. In a third step 3020, each sequence of feature symbols with associated parameters corresponding to a word or morpheme extracted from the line of text is used to search a data structure 3022 to find one or more entries in the data structure equal or similar to the sequence of feature symbols with associated parameters. Each of the data entries includes indications of division points between characters, or intra-morpheme and intra-word character division points. In a fourth step 3024, the division points between characters encoded in each of the entries obtained from the data structure for a sequence of feature symbols with associated parameters are extracted from the data structure. For example, a search of the data structure for entries corresponding to the sequence of feature symbols with associated parameters 3014-3019 returns two entries, the points of division between characters represented by vertical line segments within horizontal bars 3026 and 3027. In addition, pointers of a traversal path through the image of the morpheme or word, shown in FIG. 30A by the small horizontal arrows, such as horizontal arrow 3030, are also recorded for each of the data entries. Each traversal-path pointer has a tail corresponding to a first intra-morpheme or intra-word character division point and a head, or point, corresponding to a second intra-morpheme and intra-word character division point. As discussed below, the traversal-path pointers are saved to avoid an unnecessary combinatoric explosion in possible traversal paths. In a final step 3034, the intra-morpheme and intra-word character division points and traversal-path pointers for each sequence of feature symbols with associated parameters, in turn corresponding to extracted morphemes or words, are accumulated into a final set of intra-morpheme and intra-word character division points and traversal-path pointers, 3036-3040, for each of the morphemes and/or words obtained in the first step 3004. These intra-morpheme and intra-word character division points and traversal-path pointers, when viewed as a single sequence of intra-morpheme and intra-word character division points and traversal-path pointers 3042, represent the set of intra-morpheme and intra-word character division points and traversal-path pointers from which various different possible paths, in the sense of the paths discussed above with reference to FIGS. 20A-B, are constructed, with associated probabilities, to represent alternative resolutions of the line of text into characters. Note that, in the final sequence of intra-morpheme and intra-word character division points and traversal-path pointers, duplicate intra-morpheme and intra-word character division points and traversal-path pointers are removed, leaving only unique intra-morpheme and intra-word character division points and traversal-path pointers.

FIG. 30B illustrates why traversal-path pointers are accumulated along with intra-morpheme and intra-word character division points in steps 3024 and 3034 of FIG. 30A. Consider three different sets of the intra-morpheme and intra-word character division points and traversal-path pointers 3060-3062 produced for a sequence of feature symbols with associated parameters corresponding to a word or morpheme in step 3024. Were only these intra-morpheme and intra-word character division points and traversal-path pointers accumulated, as shown by vertical line segments within horizontal bar 3064, then, subsequently, the system would need to consider all or a large fraction of the possible traversal paths based on these accumulated intra-morpheme and intra-word character division points. All possible traversal paths include path segments, such as path segment 3066, which are not actually encountered in any of the data-structure entries from which the intra-morpheme and intra-word character division points and traversal-path pointers 3060-3062 are obtained. Many of additional unobserved path segments are shown above horizontal bar 3064. Instead, by accumulating both traversal-path pointers and intra-morpheme and intra-word character division points, an accumulated set of traversal-path pointers are accumulated along with intra-morpheme and intra-word character division points 3070 actually observed in the data entries can be obtained. In general, these represent the traversal-path pointers and intra-morpheme and intra-word character division points with reasonable likelihood of subsequently generating meaningful and reasonable hypotheses regarding the sequence of symbols or characters represented by the image of a morpheme or word.

FIGS. 31A-M illustrate transformation of a morpheme or word extracted from a text-line image into a sequence of feature symbols with associated parameters. Such a transformation is carried out in step 3012 discussed above with reference to FIG. 30. It should be noted that the phrase "feature symbol with associated parameters" ("FSWAP") refers to a set of features symbols, certain members of which are generally associated with parameters and certain of which are not generally associated with parameters. These are an initial set of feature symbols that are compared against members of a second set of standard feature symbols, each member a standard feature symbol ("SFS"). In certain cases, an FSWAP may be identical to a corresponding SFS. In other cases, an FSWAP may, depending on the value of the associated parameters, map to two or more SFSs.

Figure 31A:
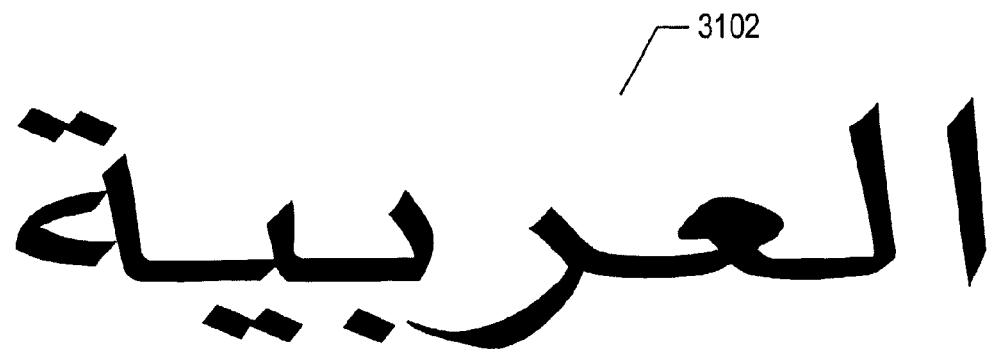

FIG. 31A shows an Arabic word 3102. FIG. 31B shows various metrics computed with respect to features in the text image of the word 3102 shown in FIG. 31A. First, the word is represented, in FIG. 31B, as having three horizontal portions: (1) a top portion 3104; (2) a main portion 3106; and (3) a bottom portion 3108. The main portion 3106 includes the bulk of the text line, including the generally continuous portions of the text line, with the top and bottom portions 3104 and 3108 containing chiefly diacritical marks as well as extensions of features resident within the main portion 3106, such as the top portions of the vertical strokes, such as vertical stroke 3110, in addition to containing additional strokes A number of different features are extracted from the Arabic-like text, as discussed in greater detail below. In the example of FIGS. 31A-M, one type of feature extracted from a text-line image is referred to as a "peak." The maximum peak height 3112 is the height of the tallest vertical feature 3110, and has a relative peak height of 1.0. The peak heights of additional vertical features, such as the peak height 3114 of vertical feature 3116, are computed as the relative height of the peak with respect to the tallest vertical feature 3110. Another type of feature extracted from the Arabic-like text is a loop 3118. Loops are characterized both by a position within the text relative to the above-mentioned main and bottom portions as well as by a real-valued quality metric 3120, in the range [0.0, 1.0], that indicates a loop quality that ranges from 0, indicating that the loop has no visible opening and is poorly formed to 1, indicating a clear and well formed loop containing a visible opening. Loop 3118 in FIG. 31B has no opening. Were the feature 3124 recognized as a loop, this feature would have an opening 3126, which is white space surrounded by solid text curves and lines.

Figure 31C:
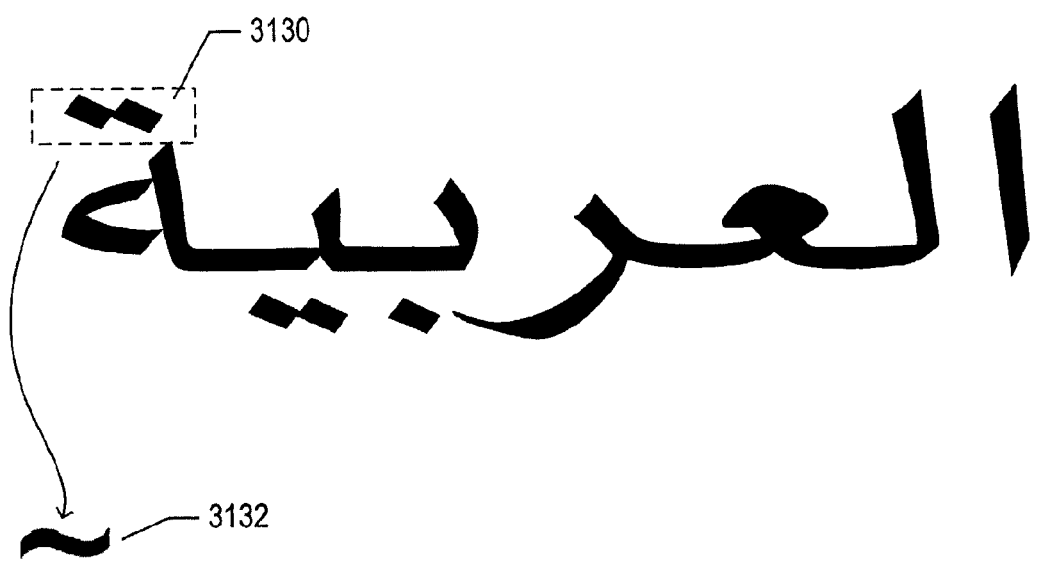
Figure 31B:
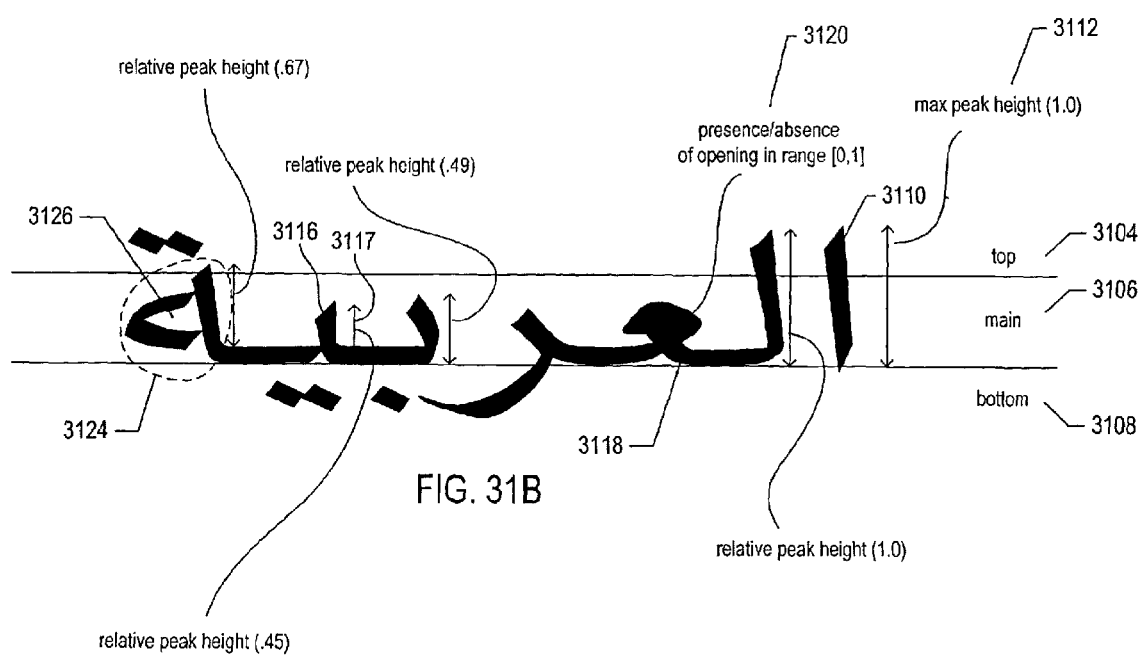

In FIGS. 31C-M, features are sequentially extracted from the word 3102, shown in FIG. 31A, along with numerical, Boolean, and/or other types of parameters associated with the features. In FIGS. 31C-M, the word image is processed from left to right, but the word image may be alternatively processed from right to left, in the direction that Arabic is read and written. In either case, as discussed below, a sequence of FSWAPs that represent the word is produced, with the sequence of FSWAPs arranged in correspondence with the features of the word. FIG. 31C shows recognition of a first feature in the word. The first feature 3130, is a diacritical mark in the top portion of the word which is transformed into an upper-diacritical FSWAP 3132. It should be noted that the upper-diacritical FSWAP 3132 is selected for visual description of the process of extracting features from the word. The FSWAPs may, in fact, be represented by particular character symbols, as in FIGS. 31C-M, but may also be represented by text strings, integers, or other representations.

Figure 31D:
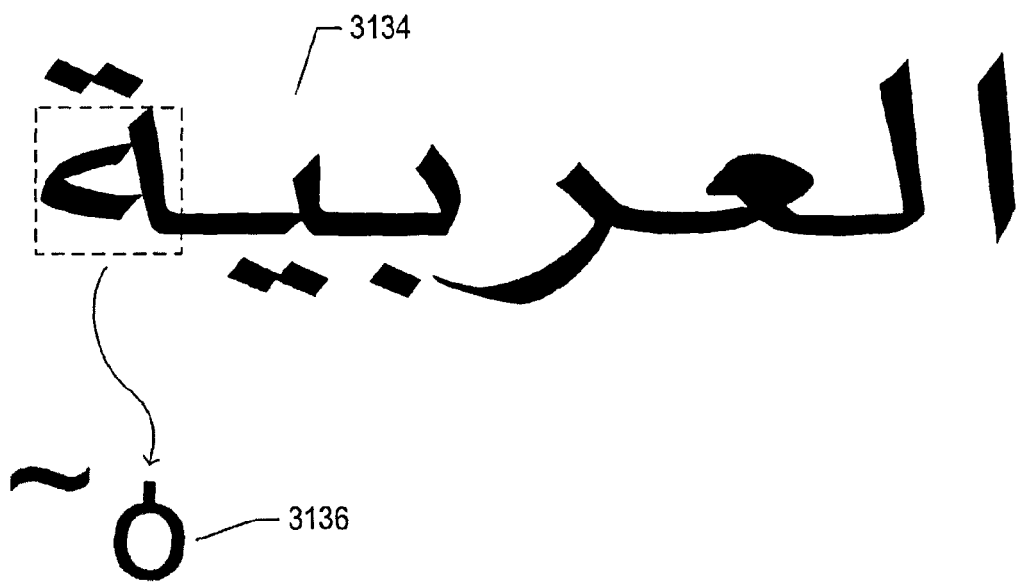
Figure 31E:
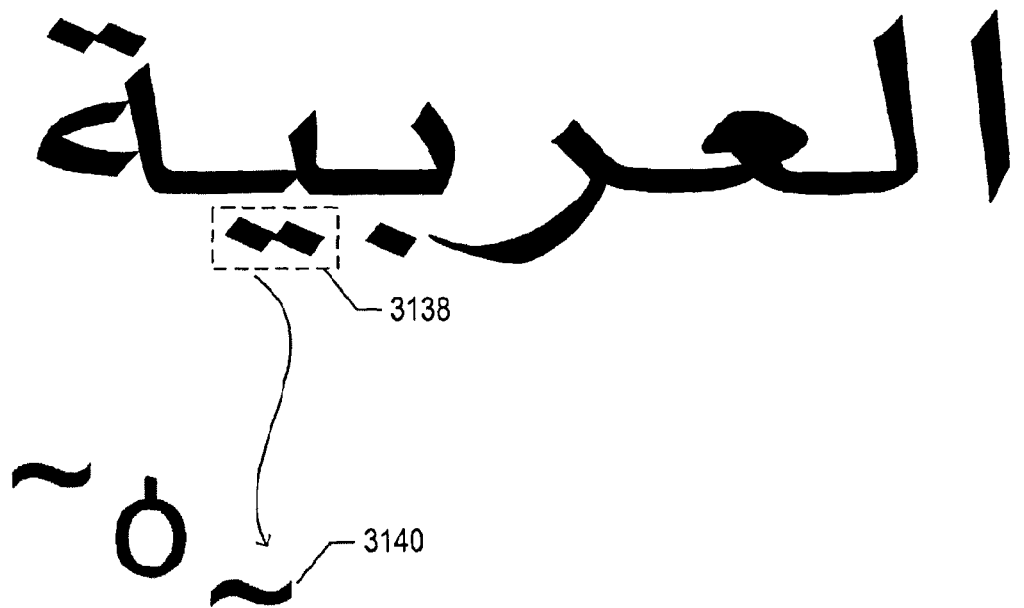
Figure 31F:
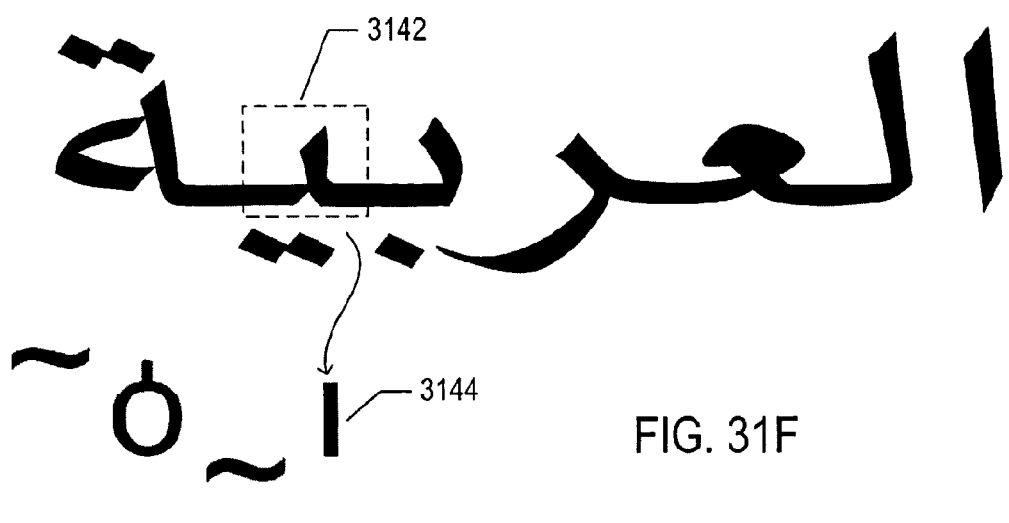

FIG. 31D illustrates extraction of a second feature from word 3102. The second feature 3134 is either a peak or loop, and is transformed into a "peak/loop" FSWAP 3136. FIG. 31E illustrates extraction of a third feature from word 3102. The third feature 3138 is a diacritical mark in the bottom portion of the word, and is transformed into a "lower-diacritical" FSWAP 3140. FIG. 31F illustrates extraction of a fourth feature from word 3102. The fourth feature 3142 is a peak 3144 associated with a relative peak height 3146.

Figure 31G:
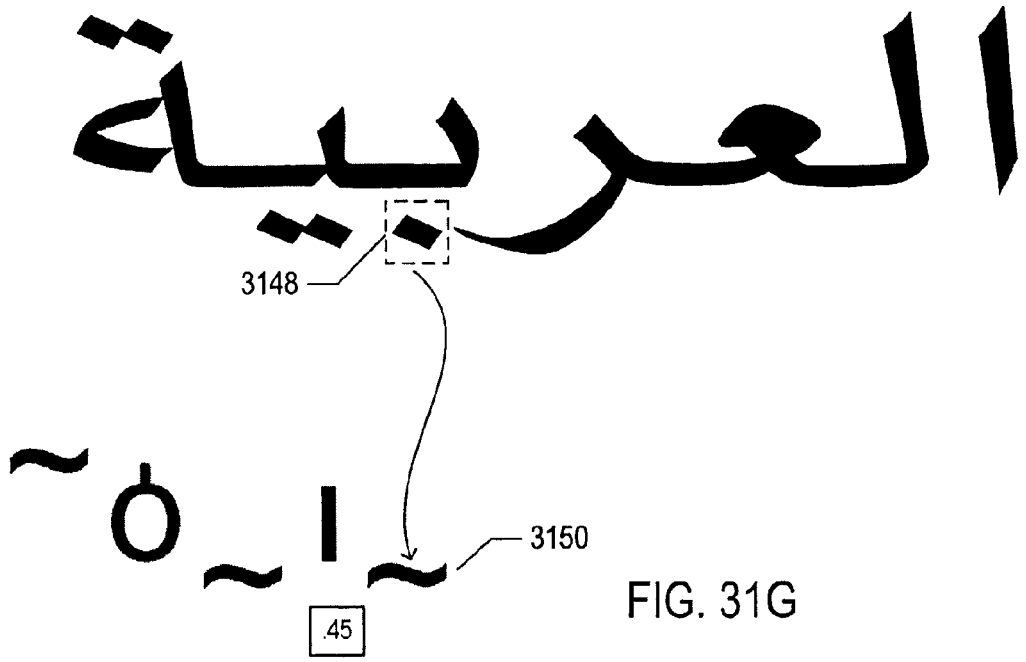
Figure 31H:
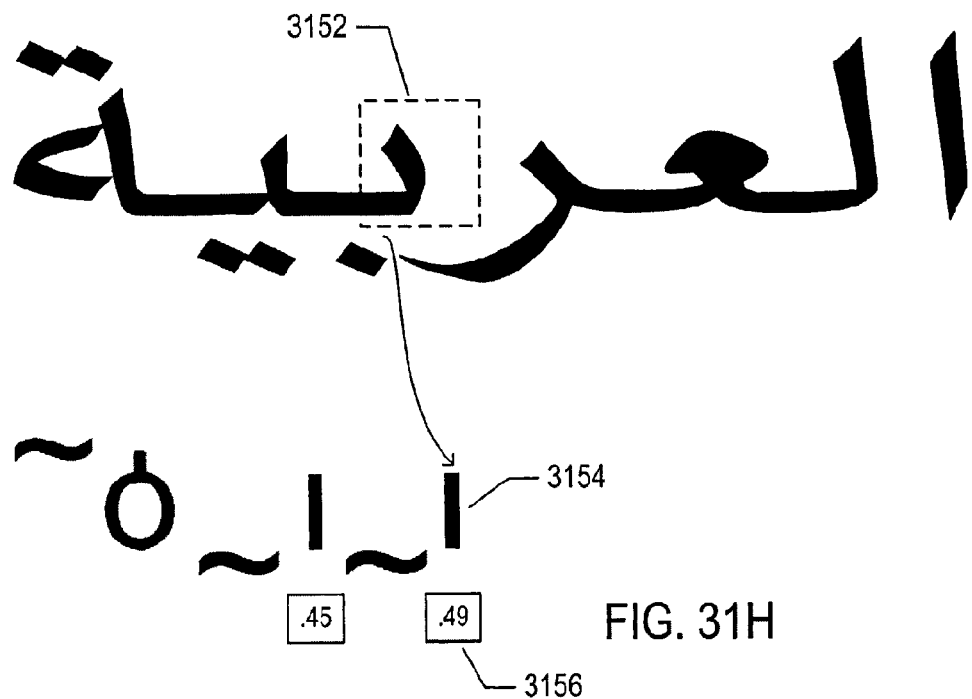
Figure 31I:
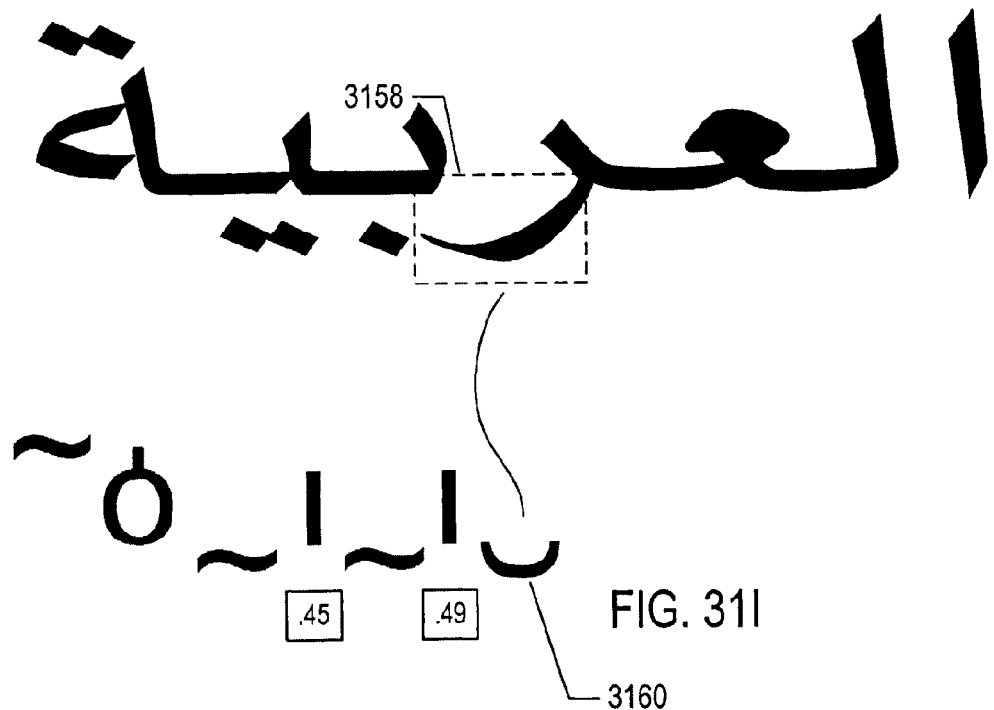
Figure 31L:
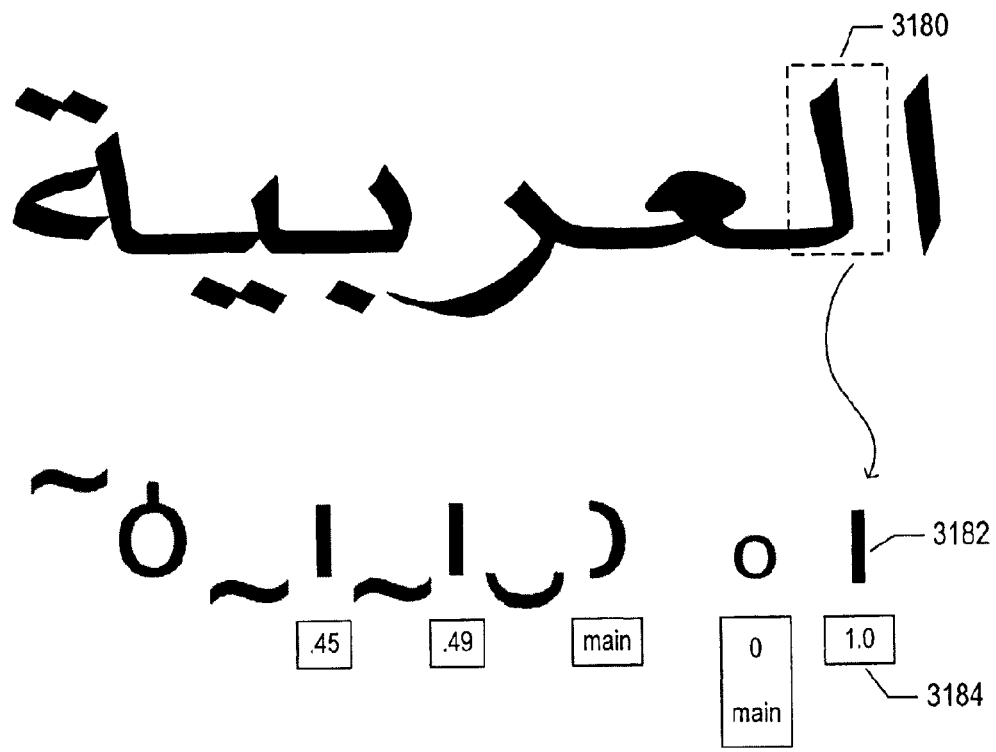
Figure 31M:
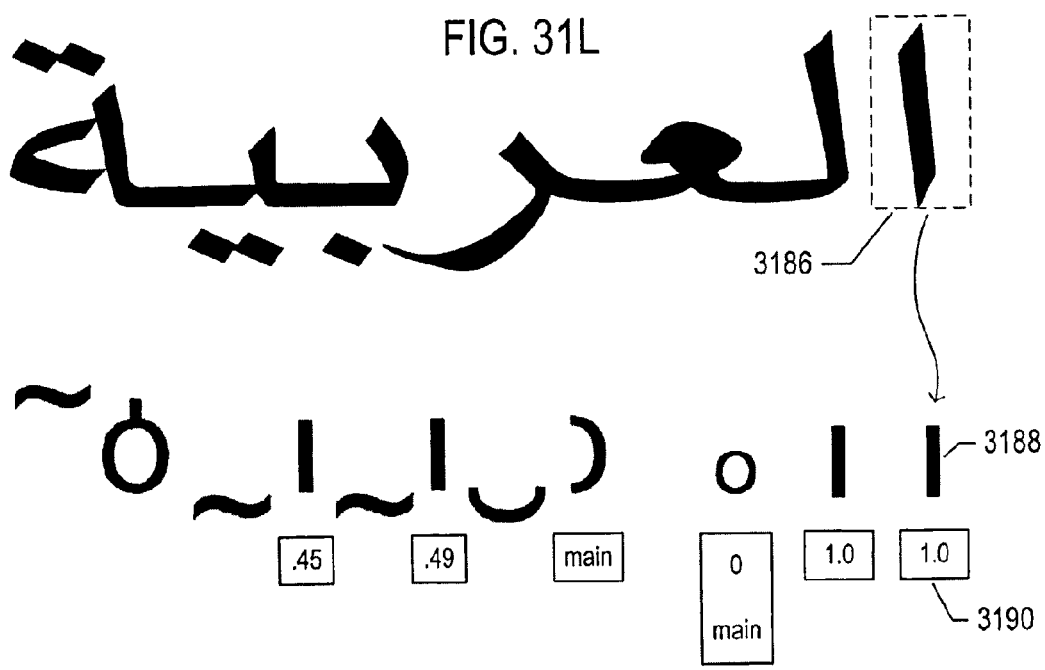

FIG. 31G illustrates extraction of a fifth feature from word 3102. The fifth feature 3148 is a lower-portion diacritical mark and is transformed into a "lower-diacritical" FSWAP 3150. FIG. 31H illustrates extraction of a sixth feature from word 3102. The sixth feature 3152 is transformed into a peak FSWAP 3154 with relative peak height 0.493156. FIG. 31I illustrates extraction of a seventh feature from word 3102. The seventh feature 3158 is a curve and is transformed into a "crater" FSWAP 3160. FIG. 31J illustrates extraction of an eighth feature from word 3102. The eighth feature 3162 is a vertically oriented curve and is transformed into a "right-crater" FSWAP 3164. The right-crater FSWAP is associated with a position parameter 3166 indicating whether or not the right-crater FSWAP occurs in the main portion of the word or in the bottom portion of the word. The extraction of the eighth feature illustrates that feature extraction may be based on considering extended portions of the word image, including multiple features. The process does not involve sequential consumption of adjacent portions of the word image, but instead considers up to the entire word image when extracting each FSWAP. FIG. 31K illustrates extraction of a ninth feature from word 3102. The ninth feature 3168 is a loop and is transformed into a loop FSWAP 3170 that is associated with four different parameters 3172 in the described implementation. The first parameter indicates the quality of the loop 3174, in this case 0, since the loop lacks any visible opening. The second parameter 3178 is a position parameter indicating whether the loop occurs in the main portion of the word or in the lower portion of the word. FIG. 31L illustrates extraction of a tenth feature from word 3102. The tenth feature 3180 is transformed into a peak FSWAP 3182 associated with a relative peak height of 1.0 3184. FIG. 31M illustrates extraction of an $11^{th}$ feature from word 3102. The $11^{th}$ feature 3186 is transformed into a peak FSWAP 3188 associated with a relative peak height of 1.0 3190.

FIG. 32 illustrates the set of features that can be extracted from Arabic-like text in the described implementation. Each row in the table, such as row 3202, represents one type of FSWAP. The first column illustrates the appearance of the feature in Arabic script 3204. The second column shows the FSWAP used to represent the feature 3206. The third column 3208 provides a name for the FSWAP. A fourth column 3210 lists the parameters associated with the FSWAP. A fifth column 3212 provides an alphanumeric representation of the FSWAP. The eight features and corresponding FSWAPs shown in FIG. 32 represent a comprehensive set of features and corresponding FSWAPs used for OCR in the described implementation of the OCR methods to which the current application is directed. However, in alternative methods to which the current application is also directed, the comprehensive set of FSWAPs may have a fewer or a greater number of features and FSWAPs, different features and FSWAPs, or different parameters associated with FSWAPs.

The data structure 3022 discussed above with reference to FIG. 30 stores entries that contain morphemes and words encoded in standard feature symbols. Standard feature symbols ("SFSs") are related to, but different from, the feature symbols with associated parameters ("FSWAPs") discussed above with reference to FIGS. 31A-M and 32. As further discussed, below, the entries in the data structure are obtained by transforming Arabic-like-language dictionary entries and other sources of morphemes and words of the particular Arabic-like language in which text to which the currently disclosed OCR methods is applied. The dictionary entries and other sources of morpheme and word text images are processed to generate SFS encodings in a process similar to, but different from, the process for extracting features and corresponding SFSs from morpheme and word images in text lines. The process differs from the process used in optical character recognition of text images in that the dictionary entries and other sources of morphemes and words are processed directly into standard feature symbols, rather than into FSWAPs. FSWAPs, as discussed above, may be accompanied by various parameters, such as loop quality and peak height. In a sense, the parameters represent a range of ambiguity that is resolved when an FSWAP is mapped to a standard feature symbol, as discussed below with reference to FIGS. 34 and 35. The ambiguity is useful when using the data structure during optical character recognition, enabling standard-feature-symbol encodings of multiple similar words and morphemes to be recognized as possible candidate matches to the sequence of FSWAPs that represent a particular word or morpheme image. However, in constructing the data structure, a direct standard-feature-symbol encoding for each dictionary entry and other word and morpheme images extracted from sources of morpheme and word text images is desirable, as the standard-feature-symbol encoding provides a direct mapping to a corresponding data-structure entry for the morpheme or word represented by the standard-feature-symbol encoding. In one implementation, a trie data structure is used to store SFS encodings of as many different morphemes and words as possible in order to facilitate reliable identification of the most likely division points between characters in a text line in steps 3020, 3024, and 3028 discussed with reference to FIG. 30. Data is entered into a trie by hierarchically traversing the trie according to a sequence of standard feature-symbols, creating new entries as needed so that an entire traversal path for the sequence of standard feature-symbols can be traversed. The traversal ends with a node into which the sequence of standard feature-symbols is stored, if the sequence of standard feature-symbols is not already stored in the node. As discussed below, standard feature symbols include letter-separator symbols that are not considered during the hierarchical traversal, but which are considered when comparing one sequence of standard feature-symbols to another. A trie entry may therefore include multiple stored entries with a common sequence of non-letter-separator standard feature symbols but which are different from one another when the letter-separator symbols are used in a comparison of the entries.

Figure 33:
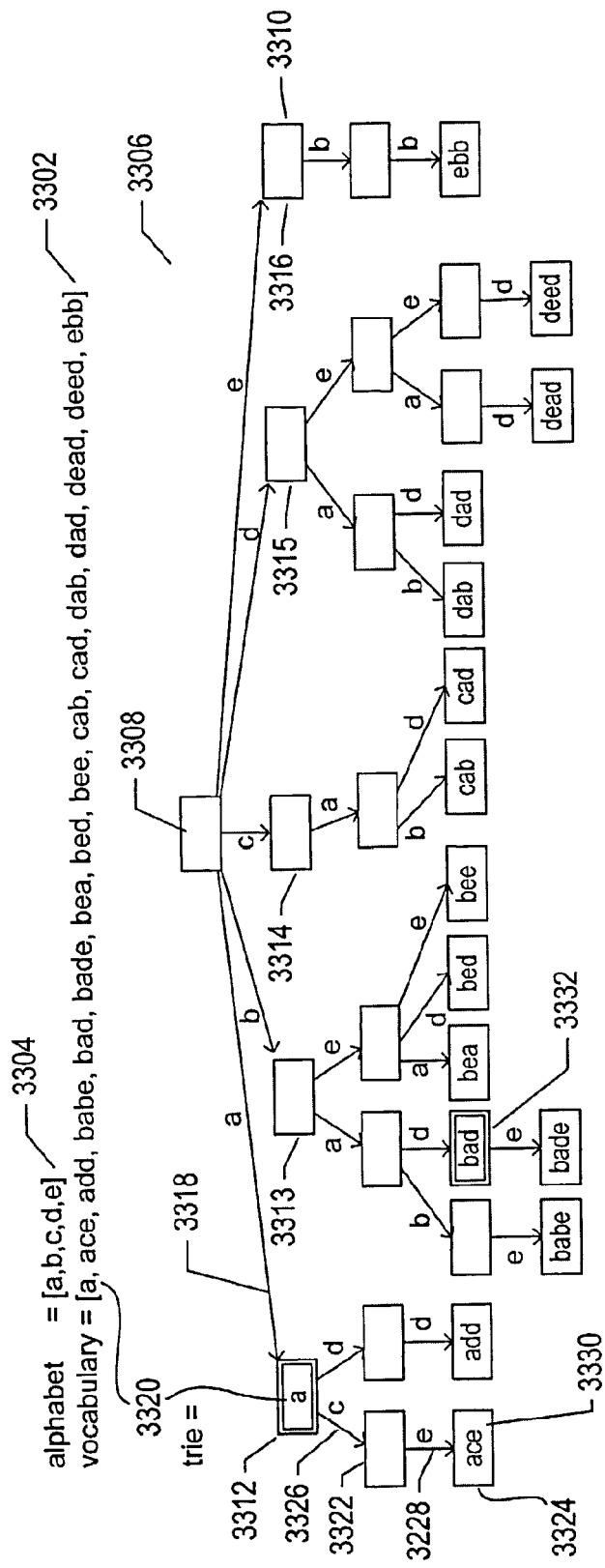
FIG. 33 illustrates a simple trie data structure.

FIG. 33 illustrates a simple trie data structure. In this example, a small set of words 3302, or a vocabulary, is composed from the English-language letters "a," "b," "c," "d," and "e," which together compose an alphabet 3304. A trie data structure 3306 is used to store the vocabulary in a tree-like data structure that allows the words of the vocabulary to be accessed in alphabetic order and that allows for easy storage of additional words and for recognizing already-stored words equal or similar to an input word. The trie data structure has an empty root node 3308. Because at least one word in the vocabulary 3302 begins with each of the five letters of the alphabet 3304, the second level of nodes in the trie 3310 includes five nodes 3312-3316 joined to the root 3308 by arcs or edges, such as edge 3318, each associated with one of the letters of the alphabet. Navigation within the trie from a node at one level to a node at a next lowest level is carried out through an edge associated with a letter, and represents adding that letter to a string of letters. The string of letters is empty, at the root node, and grows as the trie is traversed downward along edges. Whenever the string of letters obtained after traversing an edge represents one of the words of the vocabulary, the node reached through the edge includes an entry for that word. For example, navigation of the trie from the root node 3308 to node 3312 along edge 3318 involves adding the letter "a" to an initially empty string of characters. The resulting character string following the navigation along edge 3318 is the string "a," which corresponds to the first word in the vocabulary 3302. Therefore, the word "a" 3320 is included in node 3312. The character string resulting from navigation from the root node 3308 to node 3313 is "b." This character string does not correspond to a word in the vocabulary, and therefore node 3313 is empty. Traversing the trie from the root node 3308 to node 3312, then to node 3322, and finally to node 3324 along edges 3318, 3326, and 3328, constructs the symbol string "ace" which corresponds to the second word in the vocabulary, and therefore the word "ace" is included as an entry 3330 in node 3324. In the simple example shown in FIG. 33, all of the words of the vocabulary, other than the word "a," appear in leaf nodes of the trie. A depth-first search of the trie produces all of the words of the vocabulary in alphabetic order. New words can be added to the vocabulary, and to the trie, straightforwardly by traversing the trie in correspondence with the sequence of characters in the word, adding new edges and nodes when necessary. It should be noted that a given internal, non-leaf node, such as node 3312, may correspond to a word of the vocabulary, while other internal, non-leaf nodes, such as node 3313, may not correspond to a word of the vocabulary, instead corresponding to a partial word, such as "b" in the case of node 3313. In the example trie data structure 3306, internal, non-leaf nodes 3312 and 3332 correspond to words of the vocabulary, and are indicated as such by a double-lined rectangle. In a trie data structure containing standard feature symbols for Arabic-like words, a much higher percentage of internal, non-leaf nodes correspond to words and morphemes than the percentage of internal, non-leaf nodes corresponding to vocabulary words in the example trie 3306.

Figure 34:
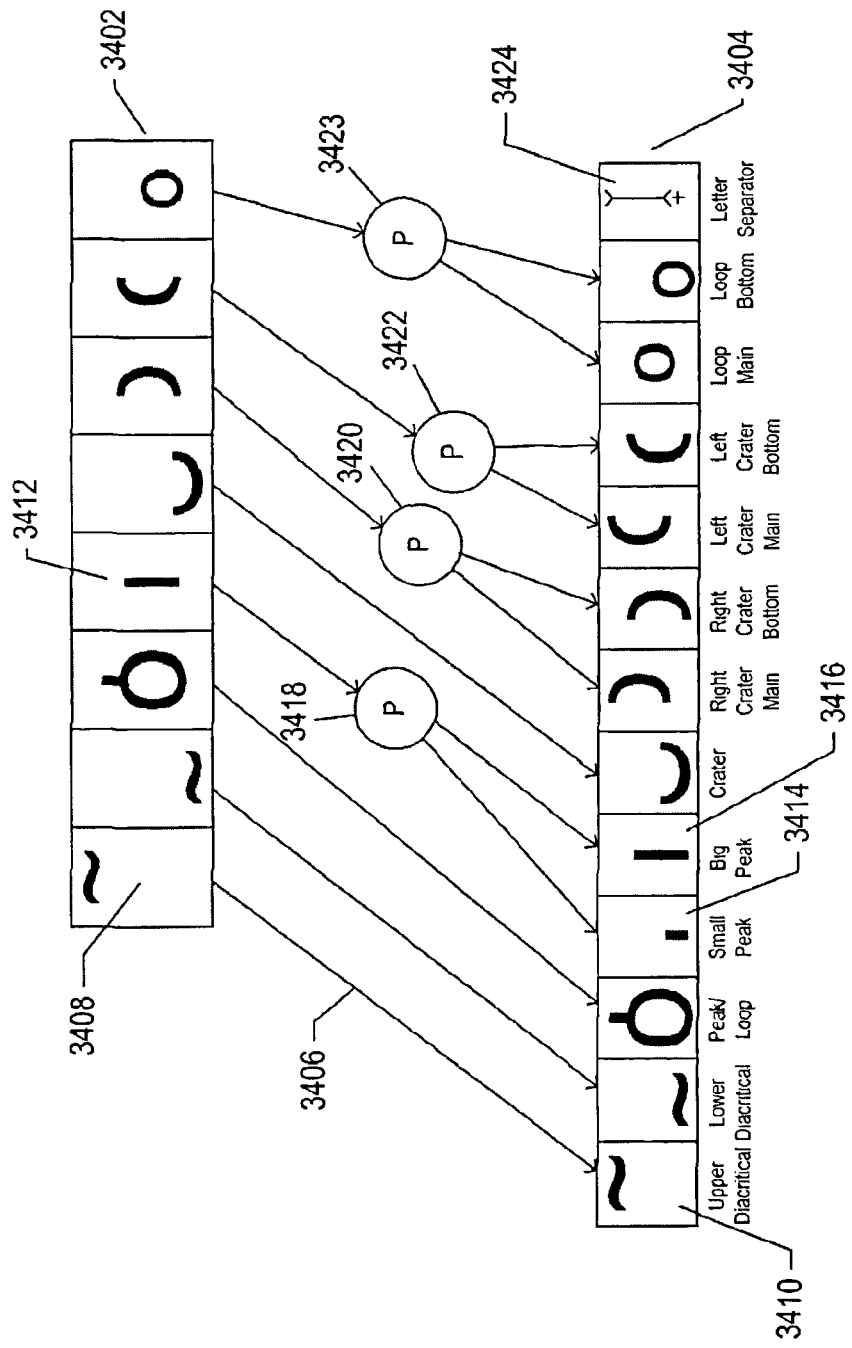
FIG. 34 illustrates the standard feature symbols ("SFSs") that are used to encode entries in the trie data structure as well as the correspondence between feature symbols with associated parameters ("FSWAPs"), discussed above with reference to FIGS. 31A-M and 32, and SFSs in one implementation.

FIG. 34 illustrates the standard feature symbols "SFSs" that are used to encode entries in the trie data structure as well as the correspondence between feature symbols with associated parameters ("FSWAPs"), discussed above with reference to FIGS. 31A-M and 32, and SFSs in one implementation. The FSWAPs previously discussed with reference to FIGS. 31A-M and 32 are shown in a first array 3402 at the top of FIG. 34. The SFSs are shown in a second array 3404 at the bottom of FIG. 34. The correspondence between FSWAPs in the first array 3402 and SFSs in the second array 3404 are shown in FIG. 34 by directed edges, such as directed edge 3406 indicating a one-to-one correspondence between the upper-diacritical FSWAP 3408 and the upper-diacritical standard feature symbol 3410. In this case, the upper-diacritical FSWAP and the upper-diacritical standard feature symbol are identical. However, in other cases, an FSWAP, such as FSWAP 3412, may be mapped to two or more standard feature symbols, such as standard feature symbols 3414 and 3416. The peak FSWAP 3412, in other words, may correspond to either the small-peak standard feature symbol 3414 or the big-peak standard feature symbol 3416. The mapping is controlled by the parameters associated with FSWAPs during feature extraction and transformation of extracted features to FSWAPs, discussed above with reference to FIGS. 31A-M. The mapping is represented in FIG. 34 by circles labeled with the character "P," such as circle 3418. As discussed above with reference to FIGS. 31B, 31F, 31H, and 31L-M, peak feature symbols are associated with relative heights. The relative-height parameter is used to map the peak feature symbol 3412 to either of the small-peak standard feature symbol 3414 or the big-peak standard feature symbol 3416.

Figure 35:
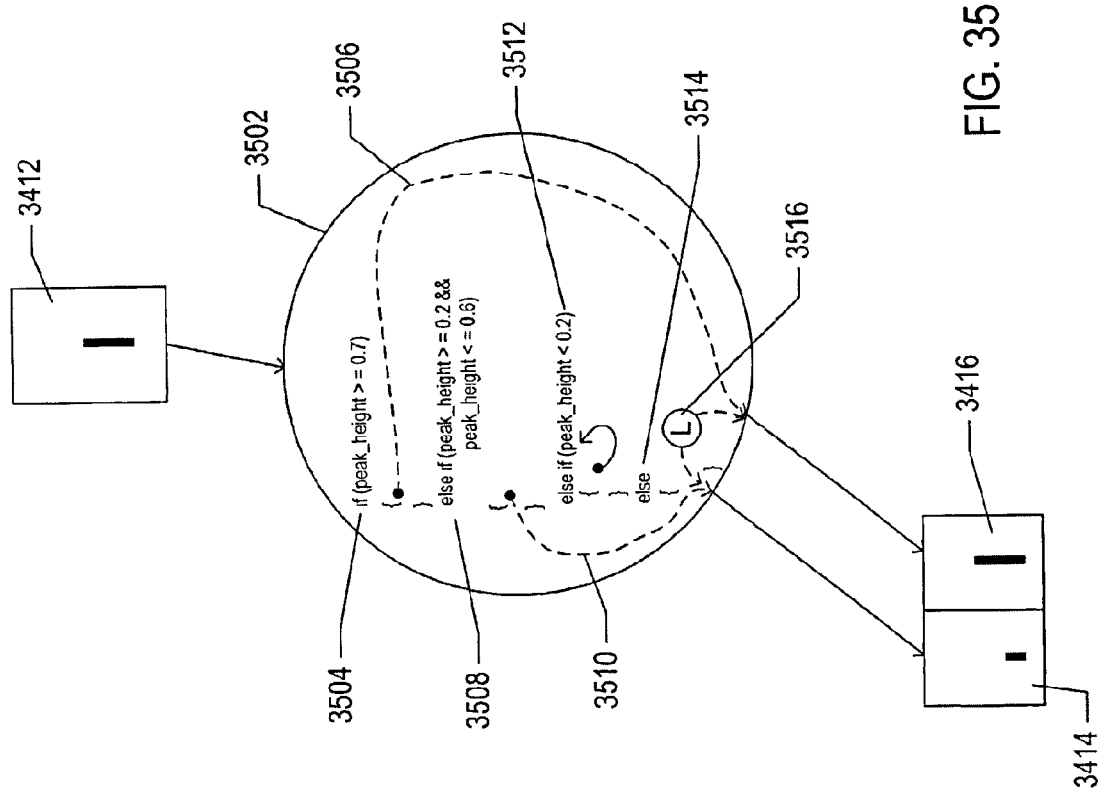
FIG. 35 illustrates details of a parameter-based mapping shown in FIG. 34.

FIG. 35 illustrates details of a parameter-based mapping shown in FIG. 34. In FIG. 35, pseudocode is included within the circle 3502 previously shown as circle 3418 in FIG. 34. When the relative peak height is greater than or equal to 0.7 (3504 in FIG. 35), the peak FSWAP 3414 is mapped to the big-peak standard feature symbol 3416, as indicated by dashed arrow 3506. When the relative peak height associated with the peak FSWAP 3414 is greater than or equal to 0.2 and less than or equal to 0.6 (3508 in FIG. 35), then, as indicated by dashed arrow 3510, the peak FSWAP 3414 is mapped to the small-peak standard feature symbol 3414. When the relative peak height is less than 0.2 3512, the peak FSWAP 3412 is dismissed or discarded. In this case, rather than mapping the FSWAP to a standard feature symbol, the FSWAP is removed from further consideration. Finally, when the relative peak height is greater than 0.6 but less than 0.7 3514, then additional logic 3516 is invoked to determine whether or not to map the FSWAP 3412 to the small-peak standard feature symbol 3414 or the big-peak standard feature symbol 3416. The additional logic may involve consideration of adjacent features to the peak feature in the word from which features are extracted, consideration of various entries present in the trie, and other such considerations.

Parameter-based mappings 3420 and 3422 are relatively directly obtained from the position parameters associated with left-crater and right-crater FSWAPs. Parameter-based mapping 3423 considers the loop-quality metric and the loop position to categorize the feature as a main-portion loop or a bottom-portion loop.

The standard feature symbols also include a letter-separator standard feature symbol 3424 that designates separations between Arabic-like characters or symbols. Note that Arabic-like characters or symbols do not necessarily correspond in one-to-one fashion to FSWAPs or standard feature symbols. For example, an Arabic-like character or symbol may be composed of two or more FSWAPs or SFSs. Letter separators are included in the trie entries and are associated with relative length coordinates, allowing the currently described OCR methods to straightforwardly obtain points of division points between characters in morpheme and word images in a scale-invariant fashion.

While a trie has many potential uses, one use employed by the currently described OCR methods is to identify well-known morphemes and words, represented as sequences of SFSs, that correspond to sequences of FSWAPs extracted from Arabic-like text during resolution of text lines. This use of a trie is next described, using the simple example trie provided in, and discussed with reference to, FIG. 33.

Figure 36A:
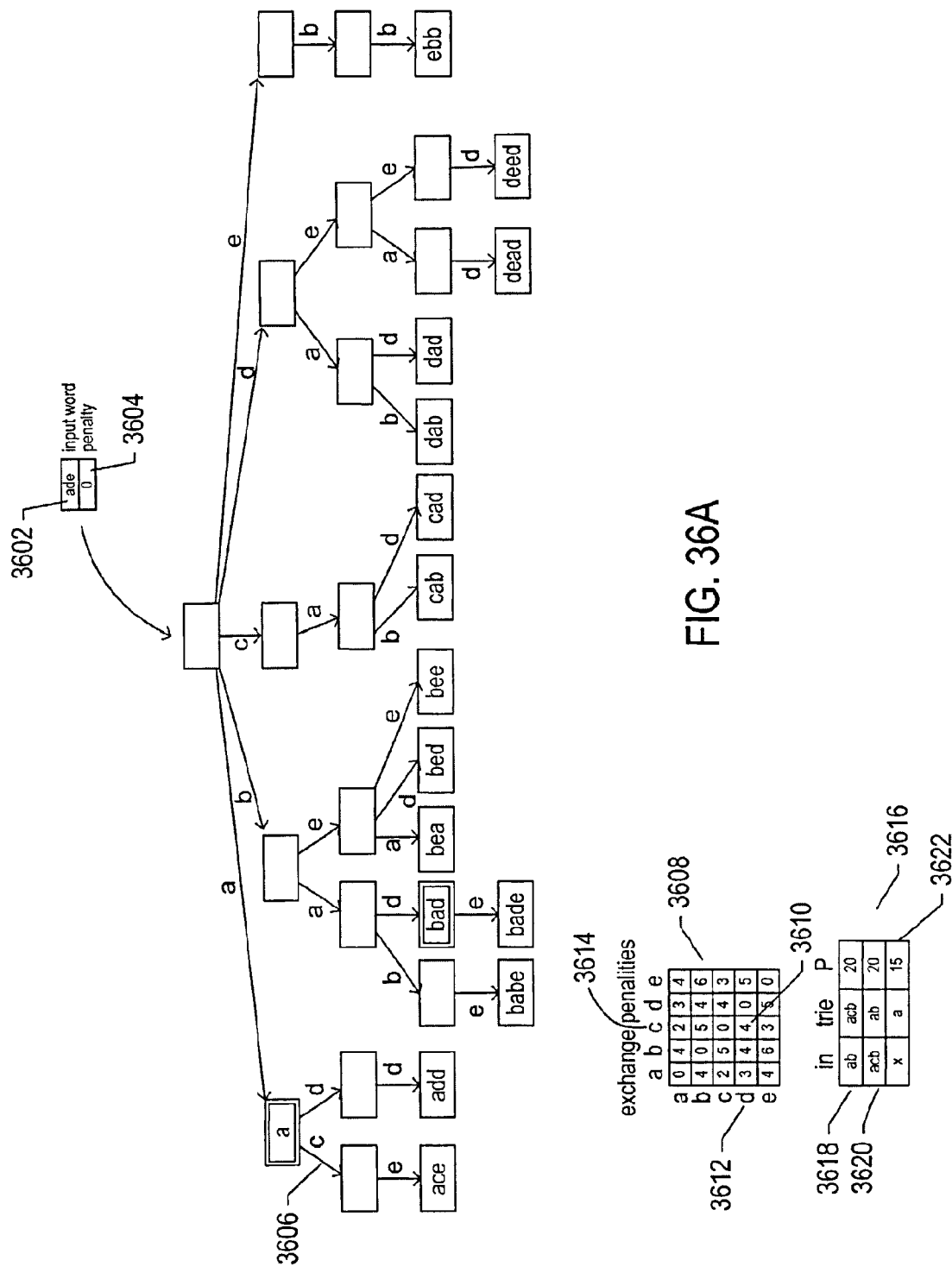
FIGS. 36A-G illustrate use of the trie, as discussed with reference to FIG. 33, in identifying vocabulary words similar or equal to an input word.
Figure 36B:
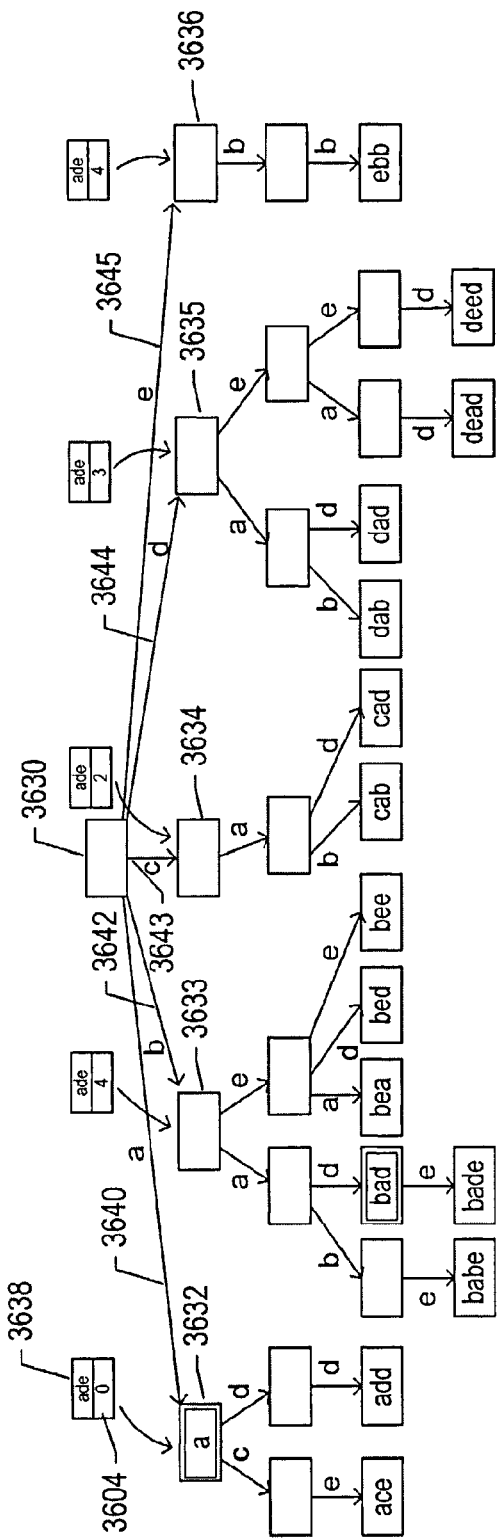
Figure 36C:
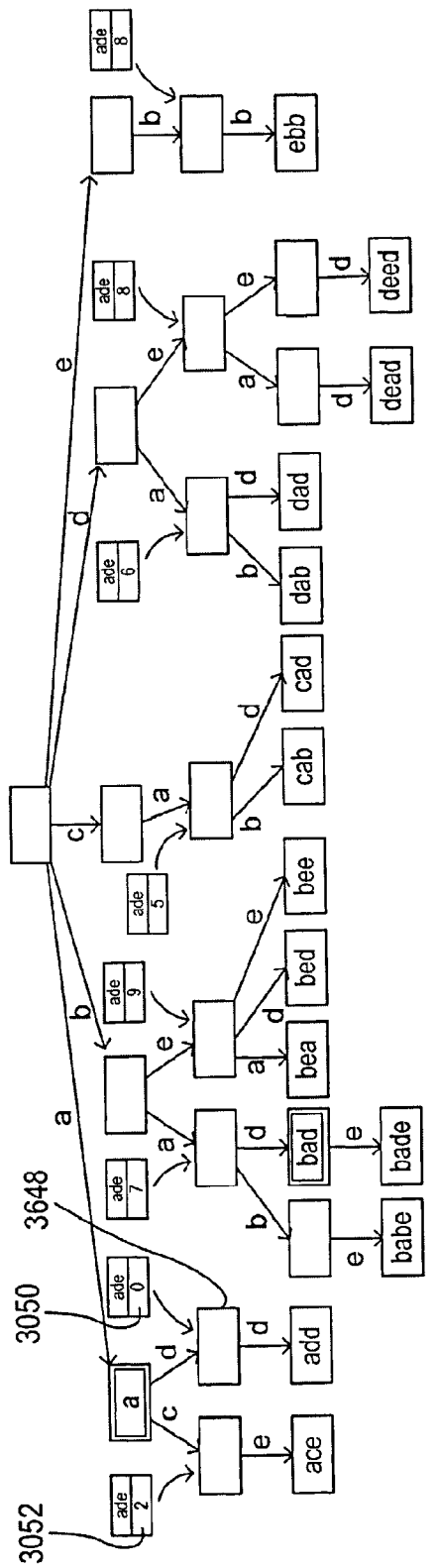

FIGS. 36A-G illustrate use of the trie, as discussed with reference to FIG. 33, in identifying vocabulary words similar or equal to an input word. In FIG. 36A, the input word "ade" 3602 is shown along with an initial traversal penalty, or penalty, of 0 (3604 in FIG. 36A). In FIGS. 36B-E, the trie is searched exhaustively to identify the input word or words similar to the input word in the vocabulary represented by the trie. As discussed later, a non-exhaustive search can be more efficiently used for the same purpose. During the search, the trie is traversed and the penalty 3604 is adjusted depending on the correspondence between the symbols of the input word and the symbols associated with edges that are traversed. There are various different types of adjustments that can be made to the penalty. Exchange penalties, tabulated in table 3608, are numeric penalties associated with substitution of a particular character in the input word for another character of the alphabet during a trie traversal. For example, in searching the trie for the input word "ade," traversing edge 3606 in the trie represents an exchange of the letter "d" in the input word "ade" with the character "c." The penalty associated with traversing edge 3606 with respect to input word "ade" is then found, in the table of exchange penalties 3608, as 4 (3610 in FIG. 36A), indexed by the input-word character "d" 3612 and the edge-associated character "c" 3614. In the example shown in FIG. 36A, the table of exchange penalties is diagonally symmetric, with the same penalty associated with replacing character "x" in the input word with character "y" associated with an edge as the penalty associated with replacing character "y" in the input word with the character "x" associated with an edge. However, the exchange-penalty table may not be diagonally symmetric in actual applications. Table 3616 shows additional types of penalties. An entry in the trie with an additional character with respect to the input word receives a penalty of 20, as represented by the first row 3618 in table 3616. A character in the input word omitted from an entry in the trie, represented by row 3620 in table 3616, also receives a penalty of 20. A character in the input word that is not a character in the alphabet (3304 in FIG. 33) receives a penalty of 15, as represented by the third row 3622 in table 3616.

Figure 36D:
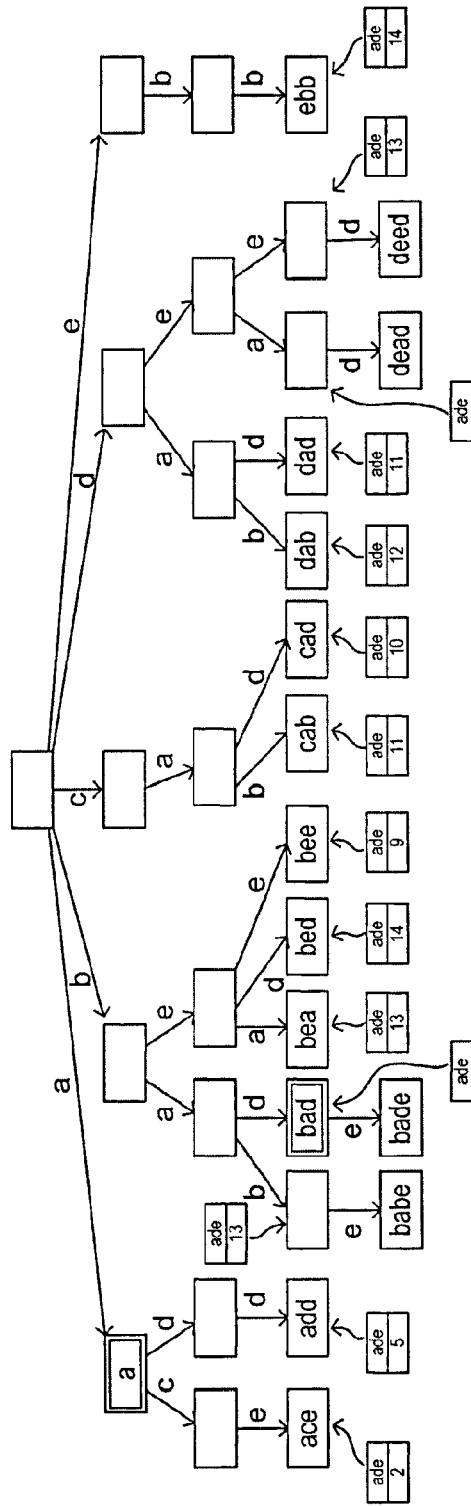

In a first step in the exhaustive search of the trie, shown in FIG. 38B, the trie is traversed from the root node 3630 to the second-level nodes 3632-3636. The input word and associated penalty resulting from each of these five edge traversals are shown in correspondence with the second-level nodes, such as input word and penalty 3638 associated with node 3632. Because the first letter of the input word is "a," traversal of edge 3640, associated with the letter "a," does not increase the penalty. Thus, the penalty associated with node 3632 remains 0 3604. However, traversal of the remaining edges from the root node to second-level nodes 3642-3645 is associated with the penalty obtained from the table of exchange penalties 3608 since edges 3642-3645 are associated with characters other than the character "a." In FIG. 36C, the exhaustive search is continued by following all edges from second-level nodes to third-level nodes. The penalty associated with third-level node 3648 remains 0 3650 because the edges followed to this node are associated with the character string "ad" which is equivalent to the first two characters in the input word "ade." The penalties associated with all other third-level nodes, such as penalty 3652, have increased according to exchange penalties found in the table of exchange penalties 3608, since all other edges emanating from second-level nodes are associated with characters other than the character "d." FIG. 36D shows traversal from third-level nodes to fourth-level nodes. Finally, FIG. 36E shows traversal from fourth-level nodes to fifth-level nodes, completing an exhaustive search of the trie.

Figure 36E:
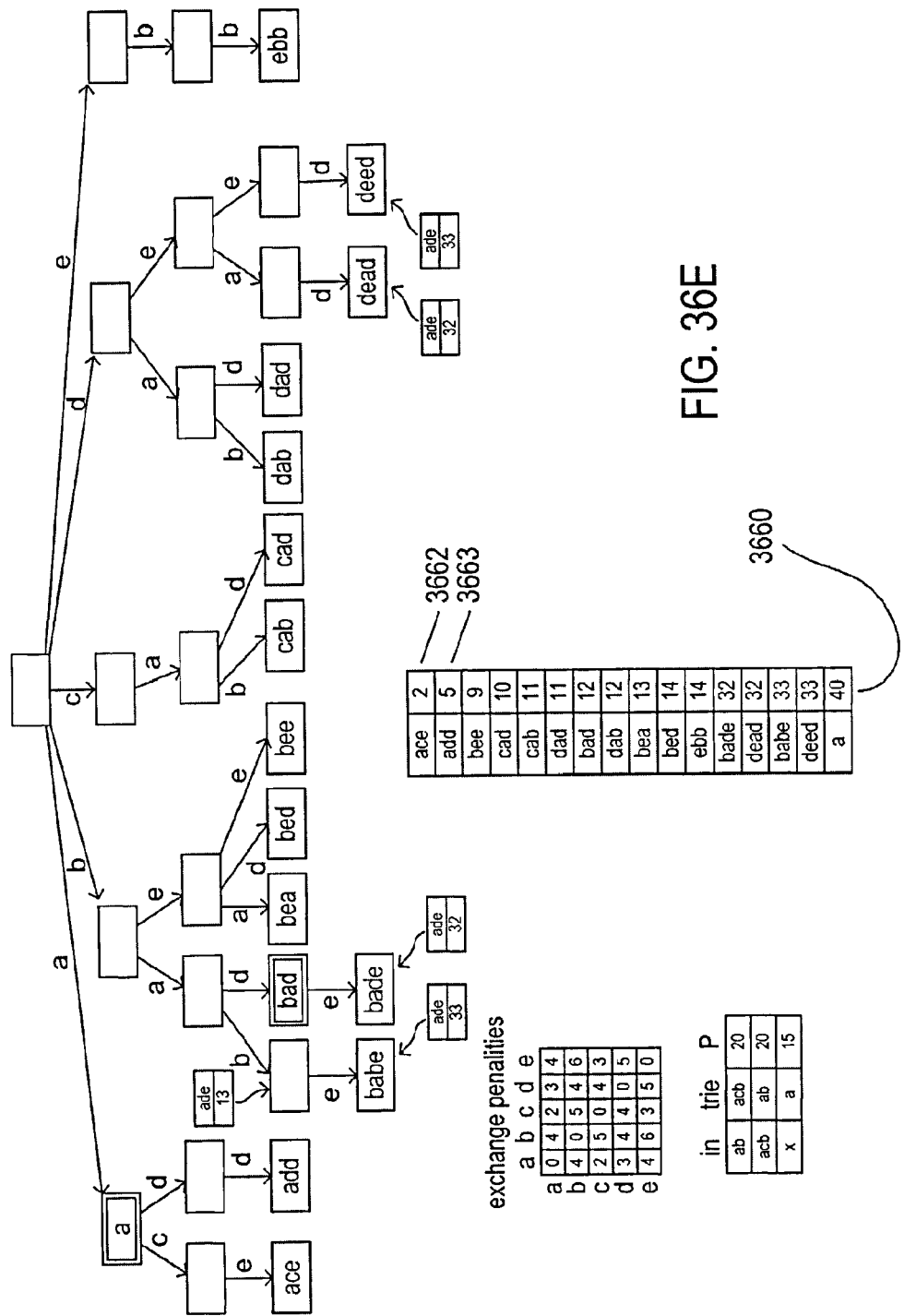

In FIG. 36E, an additional table 3660 is added to show the correspondence between entries in the trie, which correspond to words in the vocabulary 3302, and the penalties associated with the nodes containing these entries obtained by the above-described traversal of the trie during an exhaustive search of the trie. The two words in the vocabulary 3302 closest to the input word "ade" are recognized as the first two entries 3662-3663 in table 3660 having the smallest penalties. The entries are sorted in ascending penalty-value order. Thus, an exhaustive search of the trie in which the trie is navigated and penalties are accumulated according to the exchange penalties 3608 and the additional penalties in table 3616 result in an ordering of the words of the vocabulary, represented by the trie, in decreasing similarity to the input word. The ordering of vocabulary words with respect to the exhaustive search depends on the types of penalties and the numeric values of particular penalties. Both the exchange penalties and other types of penalties may be obtained empirically, may be obtained semi-analytically by assigning penalties in correspondence with the likelihood of particular character exchanges, omissions, and additions, or by various combinations of empirical and semi-empirical methods.

Figure 36F:
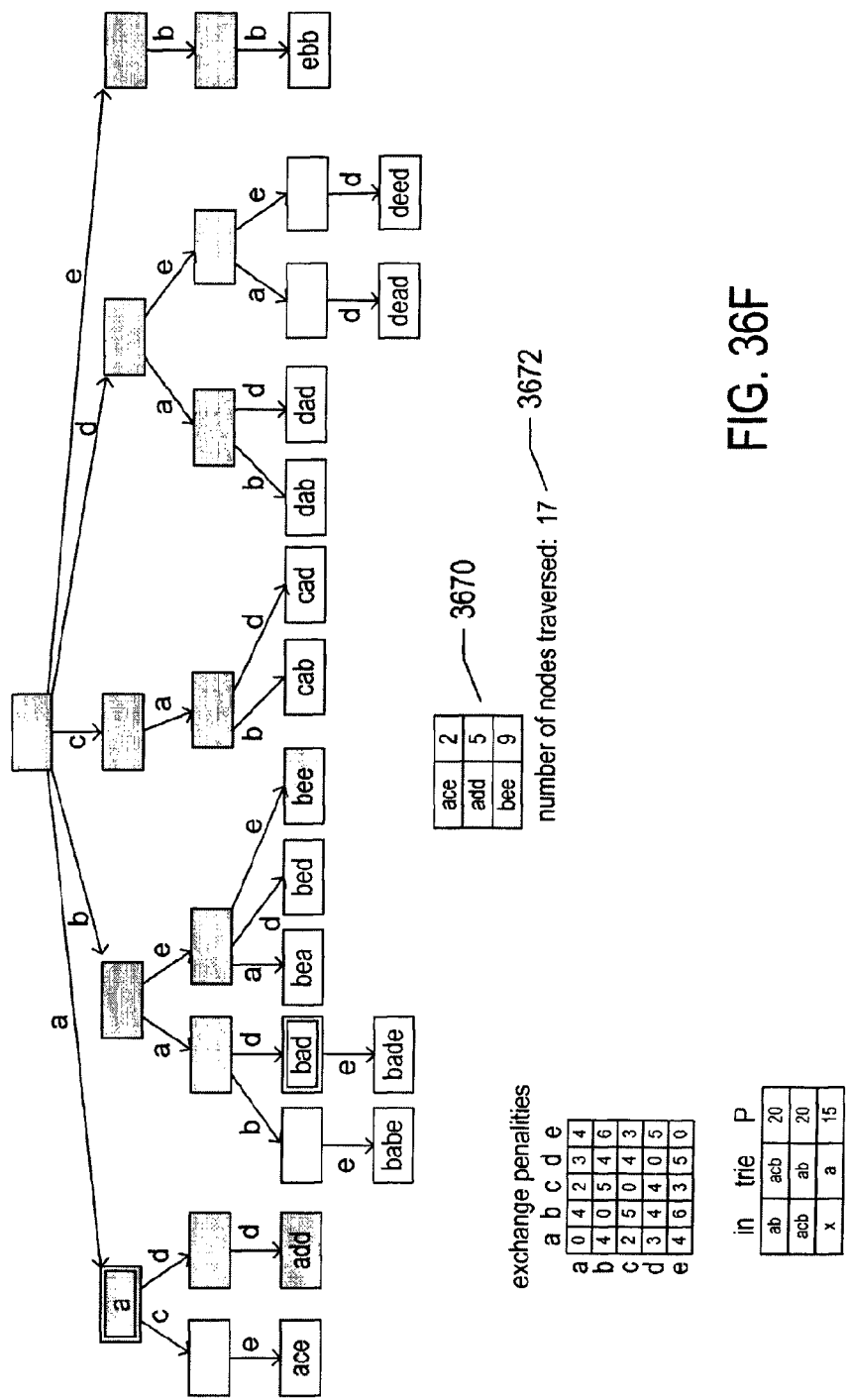
Figure 36G:
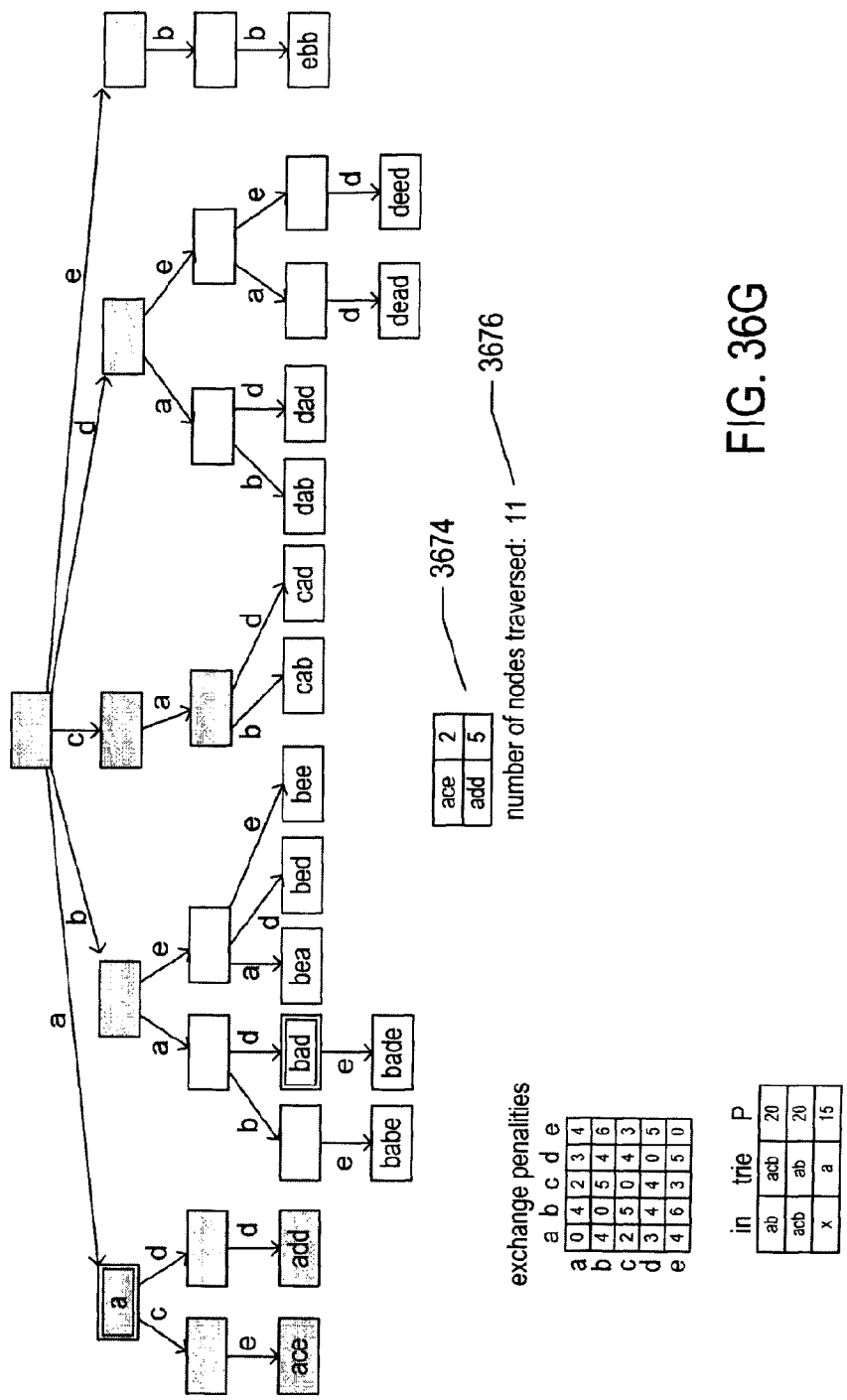

An exhaustive search of the trie for a large vocabulary is a generally computationally complex task. Because of the properties of the trie, an exhaustive search is generally not needed in order to identify the best-matching candidates for a particular input word. One way to prune the exhaustive search is to halt additional searching/navigation from any node where the computed penalty exceeds some threshold value. FIG. 36F illustrates a first pruning of the exhaustive search in which a threshold penalty of 10 is used. In this case, only three results 3670 are returned and only the 17 nodes shaded in FIG. 36F are considered or traversed, as indicated by statement 3672, during a search for vocabulary words similar to input word "ade." Fewer nodes are considered and a smaller number of results are returned, in comparison with the exhaustive search. FIG. 36G shows a search when a lower threshold of 6 is used. In this case, an even smaller number of results 3674 are returned, and only the 11 nodes shaded in FIG. 36G are considered during the search, as indicated by statement 3676. Thus, the threshold value can be used to adjust the percentage of nodes visited during a search for vocabulary words identical to or similar to an input word. In the small example trie used to illustrate trie-based searching, in FIGS. 33 and 36A-G, the impact of lowering the threshold is modest, but in much larger tries used in implementations of OCR systems, which may include thousands, tens of thousands, hundreds of thousands, or more nodes, lowering a threshold by 50% may result in a huge decrease in the number of nodes traversed. Each node traversal involves execution of numerous instructions and numerous memory accesses. Therefore, the threshold-based non-exhaustive search provides significant increases in efficiency and decreases in expended instruction cycles and, ultimately, power consumed.

In the currently disclosed methods, a trie, filled with standard-feature-symbol-encoded entries corresponding to morphemes and words in an Arabic-like language obtained by analyzing various sources of digitally encoded Arabic-language morphemes and words, is searched by threshold-based, non-exhaustive searches, such as those described with reference to FIGS. 36F-G, in a fashion similar to the search of the example trie illustrated in FIGS. 36A-E. Each word or morpheme (3006-3010) identified in a text line (3002) is transformed into a sequence of FSWAPs, and the sequence of FSWAPs is then used as an input to a non-exhaustive search of a trie containing standard-feature-symbol entries. This method, and systems incorporating this method, therefore produce candidate division points between characters based on actual character division points within morphemes and words extracted from standardized text sources, including dictionaries. As discussed above, the standard-feature-symbol-encoded entries additionally include letter-separator SFSs with relative coordinates to allow candidate division points between characters or symbols to be precisely identified within a morpheme or word image to which the currently described OCR methods are applied. This method accomplishes both a significant reduction in generation of candidate division points as well as relatively robust and high precision by identifying the most likely candidate division points. Rather than attempting to identify candidate division points along a continuous representation of a morpheme or word, actual well-known division points within well-known morphemes and words are employed. Because the trie data structure contains entries transformed from actual morphemes and words, the candidate division points have high probabilities of being correct. Non-exhaustive searching of a trie for morphemes and words similar to a sequence of FSWAPs extracted from an input morpheme or word image is computationally efficient because of threshold-based pruning and the directed, sequential nature of a trie-based search.

Figure 37A:
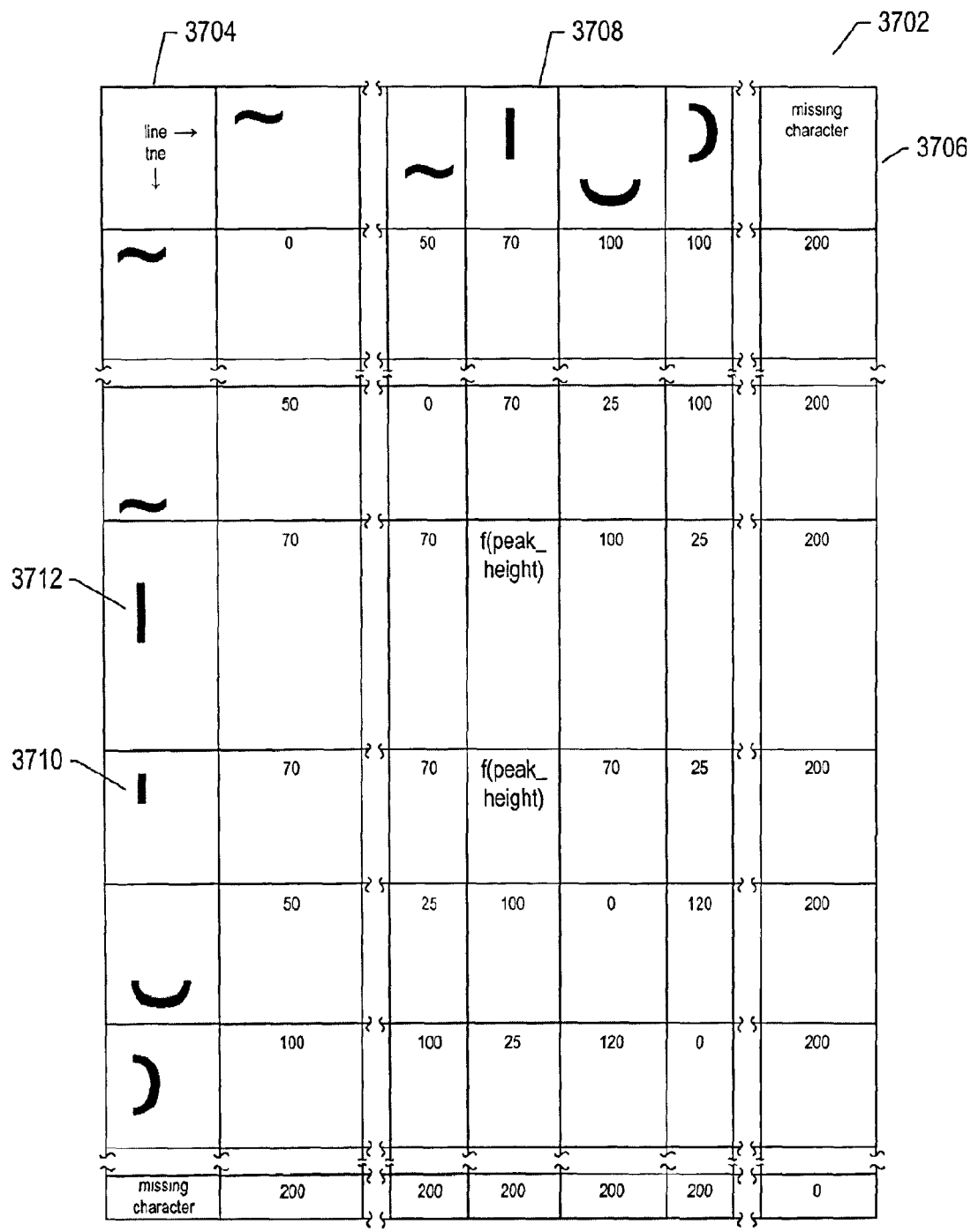

FIGS. 37A-B show portions of table of penalties used in searching a trie with standard-feature-symbol-encoded entries for words and morphemes similar to an input sequence of FSWAPs. FIG. 37A provides a portion of a table of penalties for FSWAP/SFS mismatches. Indexing SFSs are shown in a first column 3704 and FSWAPs extracted from a text line are shown in a first row 3706. Using a single FSWAP and a single standard feature symbol from this first row and first column, respectively, the penalty associated with a mismatch encountered during a trie search can be computed. Note that the penalty associated with a mismatch between a peak FSWAP 3708 and one of a small-peak standard feature symbol 3710 and a big-peak standard feature symbol 3712 is computed based on the relative height of the peak feature corresponding to the peak FSWAP 3708. The table of penalties 3702 additionally includes missing-character penalties equivalent to the penalties shown in the first two rows of the table of penalties 3616 in FIG. 36A.

FIG. 37B provides a portion of a table of penalties used in searching a trie with standard-feature-symbol-encoded entries for words and morphemes similar to an input sequence of FSWAPs but with the sequence of a pair of FSWAPs reversed. In other words, inversion of two adjacent FSWAPs is allowed, but a penalty accrues for the inversion.

Figure 38:
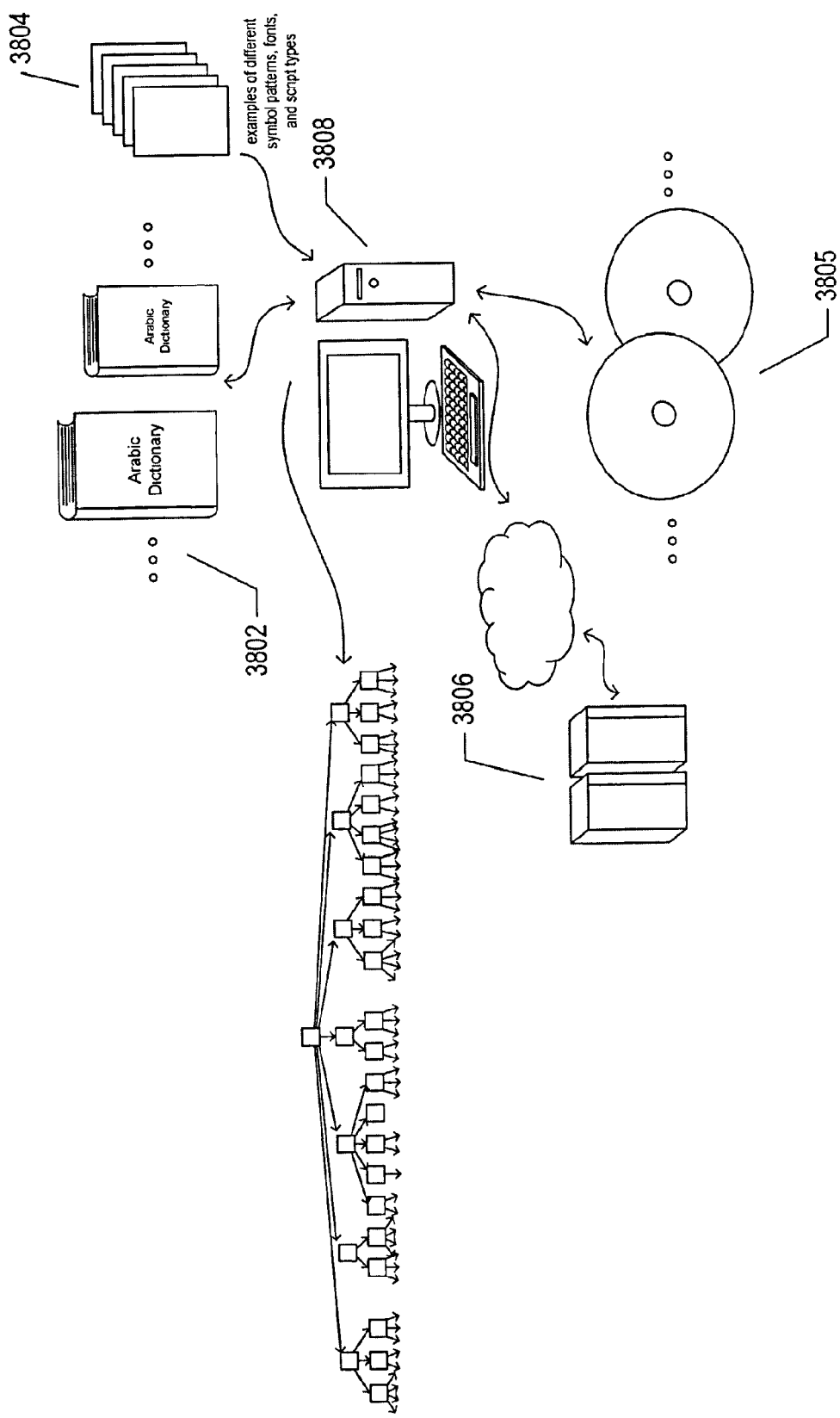
FIG. 38 illustrates the sources of morphemes and words used to create the data structure of standard-feature-symbol-encoded morphemes and words (3022 in FIG. 30) that are used to identify candidate division points between characters according to the method and system to which the current application is directed.

FIG. 38 illustrates the sources of morphemes and words used to create the data structure of standard-feature-symbol-encoded morphemes and words (3022 in FIG. 30) that are used to identify candidate division points between characters according to the method and system to which the current application is directed. As discussed above, the morpheme-and-word store may be a trie data structure that is stored in one or both of a mass-storage device and electronic memory within a computer system. In order to create the trie-based word store, many different types of sources may be used, including digitally encoded Arabic-like-language dictionaries 3802, with the word entries extracted, converted to standard-feature-symbol encodings, and input to the trie data structure. As many examples of these sources in as many different Arabic-like-language fonts and script styles are desirable, as well additional examples of various different Arabic-like-language fonts and script styles. These sources are generally digitally-encoded sources stored in removable storage media 3805 or available from various on-line sources 3806 via the Internet. Morphemes and words are extracted from the various sources and converted into sequences of standard feature symbols which are input into the trie.

Figure 39A:
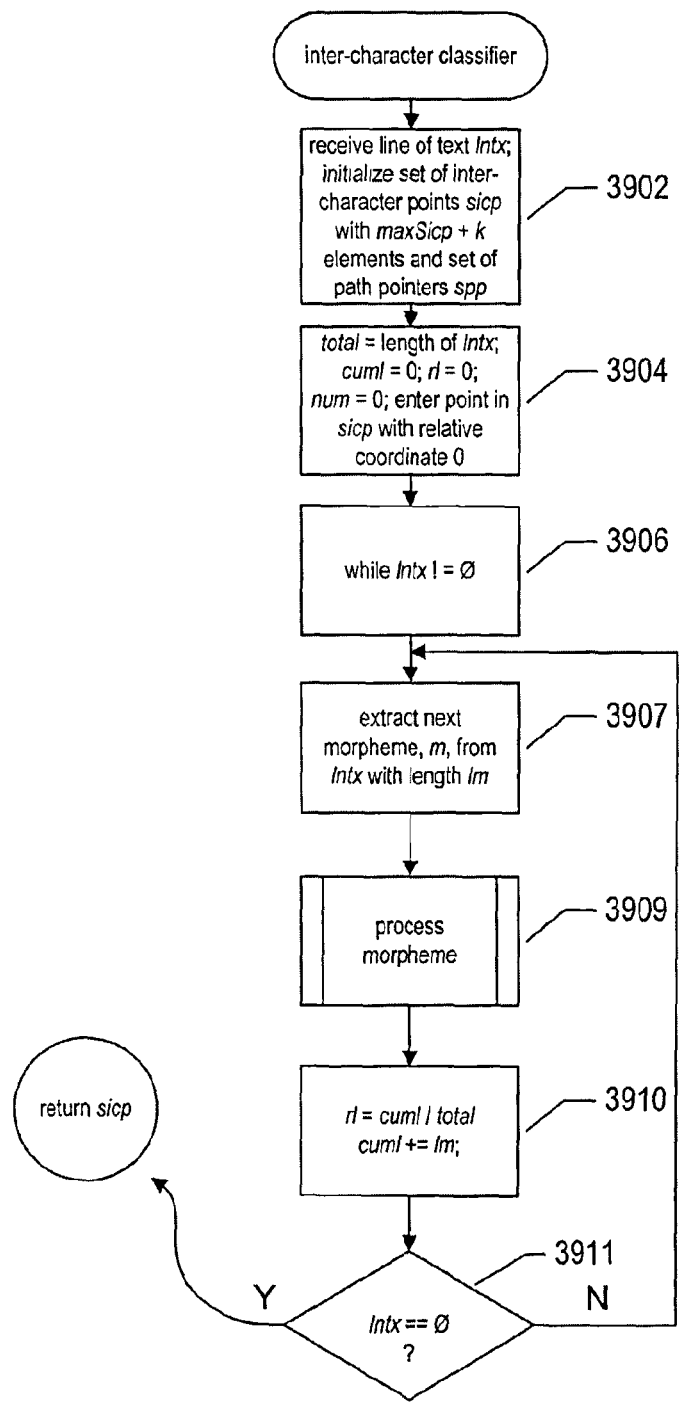
FIGS. 39A-D provide control-flow diagrams that illustrate one implementation of the methods and systems to which the current application is directed.

FIGS. 39A-D provide control-flow diagrams that illustrate one implementation of the methods and systems to which the current application is directed. FIG. 39A provides a control-flow diagram of a routine "inter-character classifier," one possible implementation of the method discussed above with reference to FIG. 30. This routine identifies high-probability candidate division points between character or symbols in continuously formed morphemes and words of Arabic-like languages along with a set of possible traversal-path pointers. This routine replaces traditional methods in steps 1356-1358 of FIG. 13D, producing a small set of high-probability candidate division points, as illustrated in FIG. 28B, and a reasonable set of traversal-path pointers, as illustrated in FIG. 30B, rather than a large set of candidate division points, as illustrated in FIG. 28A and a large set of unreasonable and unobserved traversal-path pointers, as discussed with reference to FIG. 30B. As discussed above, a large set of candidate division points and traversal-path pointers undistinguishable from one another by probabilities or metrics may render traditional OCR methods computationally inefficient or intractable as well as imprecise or unreliable.

The routine "inter-character classifier" receives, in step 3902, a text-line image lntx, initializes a set of inter-character division points, sicp, that can contain up to max-Sicp+k elements, where k is a modest number of additional elements to avoid precise limit checking in the example implementation, and, initializes a set of traversal-path pointers, spp, of similar size. As mentioned above, a traversal-path pointer may be represented by a pair of inter-character division points. The set of inter-character division points sicp may be an array or other type of data structure and may be maintained in ascending relative-coordinate order of the division points. The set of inter-character division points, sicp, and the set of traversal-path pointers, spp, correspond to the result 3042 produced by the method described with reference to FIG. 30. In step 3904, a local variable total is set to the length of the text line lntx and local variable cuml and rl, the cumulative length and relative length of the processed portion of the received text line, respectively, are both set to 0, the variable nuns is set to 1, which indicates the number of candidate division points currently residing in sicp, and an initial point is entered into sicp. During processing, morphemes and/or words are extracted from the input text line lntx to generate candidate division points and candidate traversal-path pointers. Next, in the while-loop of steps 3906-3911, morphemes and/or words are extracted, one by one, from the received line of text and processed to generate candidate division points and candidate traversal-path pointers, for the characters of each of the extracted morphemes via a call to the routine "process morpheme" in step 3909. In step 3907, a next morpheme, m, is extracted from the line of text lntx, with the image length of the extracted morpheme stored in local variable lm. As discussed above, with reference to FIG. 30, morphemes and/or words are recognized as continuous text separated from additional continuous text in a text line by vertical whitespace gaps. In the call to the routine "process morpheme" in step 3909, additional candidate division points and traversal-path pointers are obtained from the morpheme via the process discussed above with reference to FIG. 30. In step 3910, the variable cuml is incremented by the length of the just-extracted morpheme, cuml and a new relative length for the beginning of the next extracted morpheme is computed as the cumulative length divided by the total length, or cuml/total. The while-loop continues until all of the morphemes have been extracted from the received line of text, as determined in step 3911. The contents of the set sicp and spp, corresponding to a set of possible inter-character division points shown as set 3036 in FIG. 30.

Figure 39B:
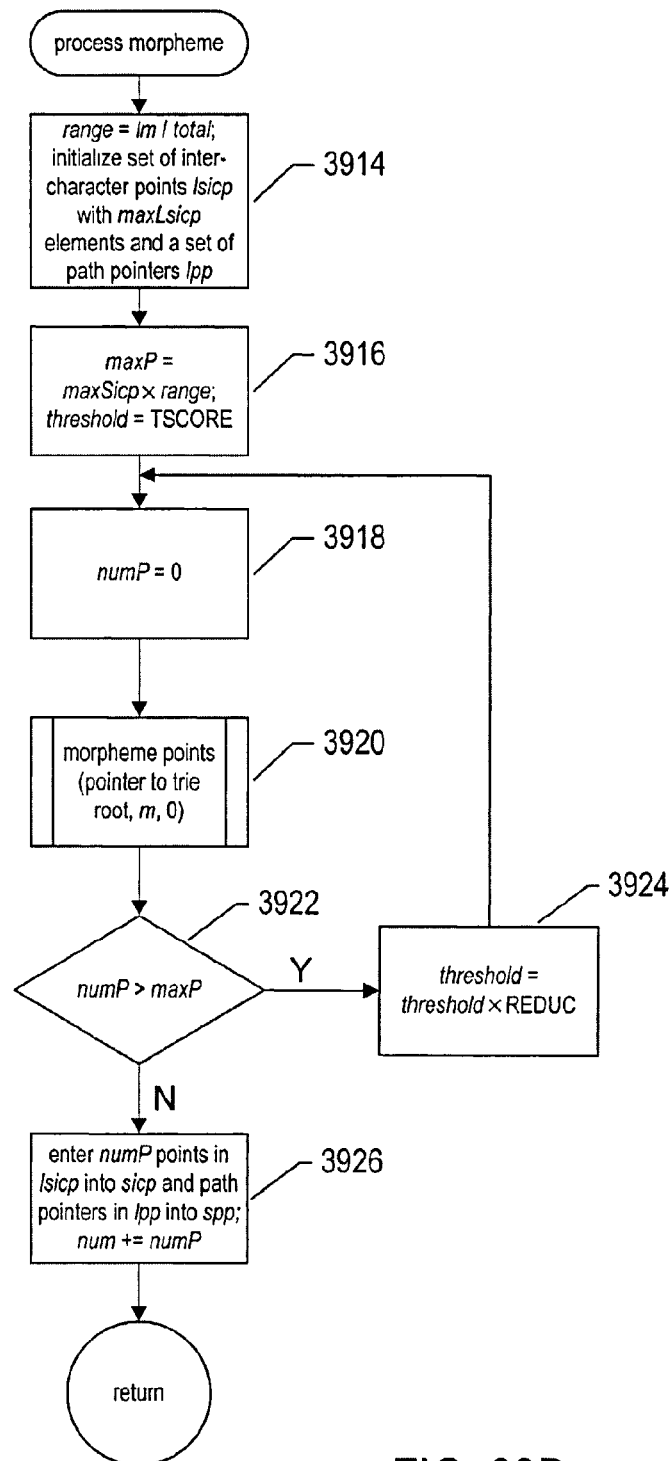

FIG. 39B provides a control-flow diagram for the routine "process morpheme," called in step 3910 of FIG. 39A. The routine "process morpheme" identifies and records potential division points within a morpheme extracted from a line of text in step 3907 in FIG. 39A. In step 3914, the routine "process morpheme" determines the relative length of the morpheme with respect to the total line of text, sets the local variable "range" to this relative length, initializes a set of inter-character division points lsicp which can contain up to maxLsicp elements, and initializes a corresponding set of traversal-path pointers lpp. In step 3916, the routine "process morpheme" sets local variable maxP, the maximum number of candidate division points to be obtained for the currently considered morpheme or word, to maxSicp times the value stored in local variable range. This ensures that a maximum number of candidate division points is allotted to each morpheme based on the relative length of the morpheme to the entire text line. Also in step 3916, the routine "process morpheme" sets local variable threshold to an initial value TSCORE. In step 3918, the local variable numP, the number of candidate division points so far obtained from the currently considered word or morpheme, is set to 0. In step 3920, a routine "morpheme points" is called to search the trie data structure (3022 in FIG. 30) for entries similar to the morpheme using a non-exhaustive search controlled by the value stored in local variable threshold. The routine "morpheme points" is called with arguments including a pointer to the trie root, the extracted morpheme m, and an initial penalty of 0. When the routine "morpheme points" returns more than the number maxP of candidate division points, as determined in step 3922, then the threshold is reduced by a ratio REDUC, in step 3924, and the routine "morpheme points" is again called to generate a set of candidate division points for the morpheme. When an acceptable number of morpheme points has been generated, the morpheme points for the morpheme, stored in the set lsicp, are entered into the set sicp and the corresponding traversal-path pointers are entered into the set spp, in step 3926, with duplicate removal. In FIG. 39B, it is assumed that the threshold can be gradually reduced in order to obtain an acceptable number of candidate division points and that the initial threshold value TSCORE is sufficiently large to generate a reasonably large initial set of candidate division points. Various alternative approaches may involve altering the threshold both to greater and to smaller values, as needed, in order to obtain an acceptable number of candidate division points for the morpheme.

Figure 39C:
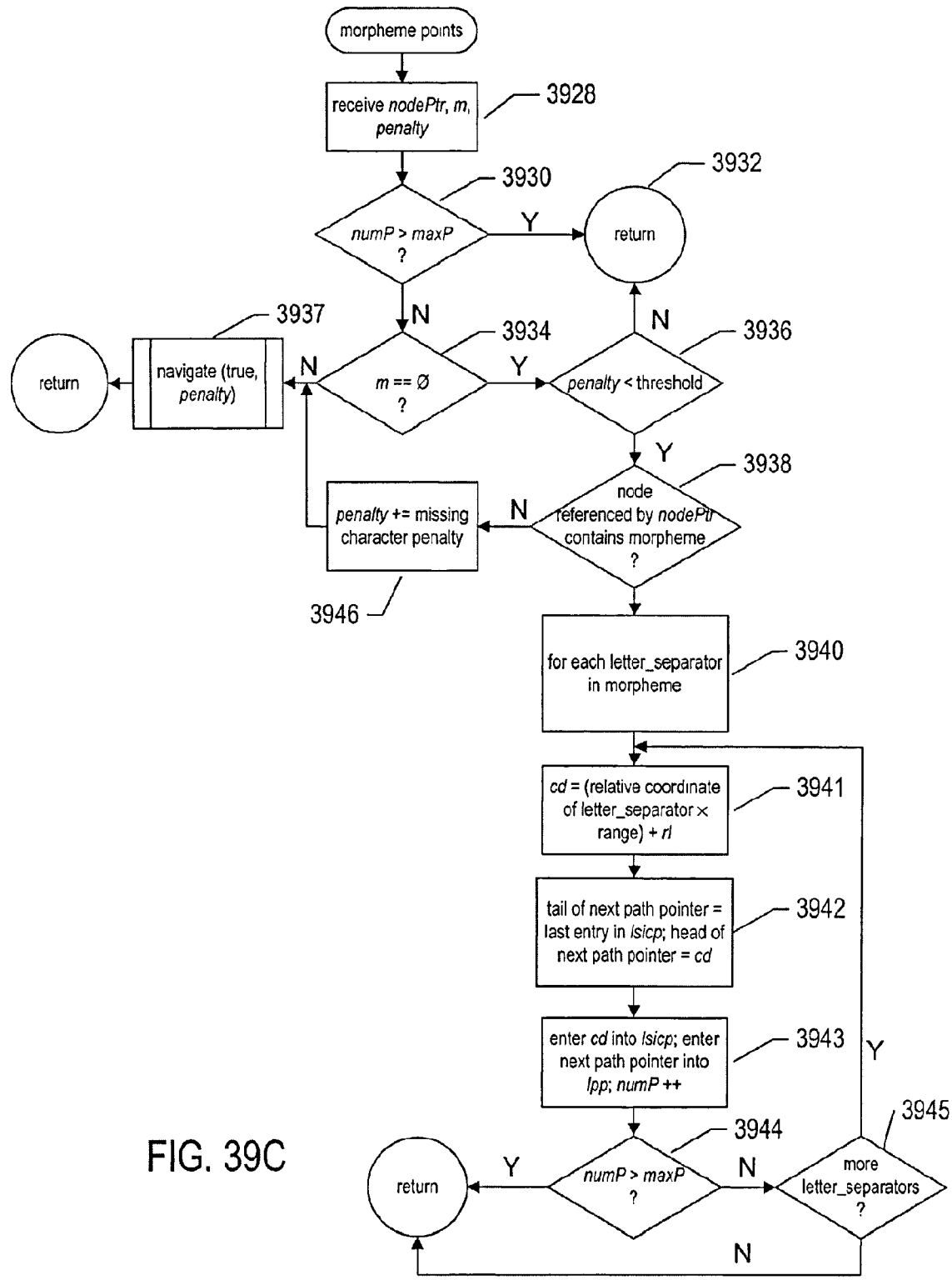

FIG. 39C provides a control-flow diagram for the routine "morpheme points" called in step 3920 of FIG. 39B. The routine "morpheme points" carries out a non-exhaustive search, controlled by the value stored in variable threshold in order to find standard-feature-symbol-encoded entries in the trie similar to a feature-symbol encoding of the current morpheme m. In step 3928, the routine "morpheme points" receives a node pointer, a current morpheme m, and a penalty. The routine "morpheme points" is recursive, in nature. In step 3930, the routine "morpheme points" determines whether the value in local variable numP is greater than the value stored in variable maxP. If so, then the routine "morpheme points" returns in step 3932. Otherwise, in step 3934, the routine "morpheme points" determines whether or not the current morpheme m is now of 0 length, or empty. If not, then, in step 3936, the routine "navigate" is called to descend one level within the trie. When the current morpheme is now of 0 length, as determined in step 3934, and when the current penalty is less than the threshold, as determined in step 3936, and when the node referenced by the argument nodePtr contains a standard-feature-symbol-encoded morpheme or word, as determined in step 3938, then, in the for-loop of steps 3940-3944, the standard-feature-symbol letter separators in the standard-feature-symbol-encoded morpheme within the trie node referenced by nodePtr are extracted and entered into the set of potential division points lsicp and corresponding traversal-path pointers are entered into the set of traversal-path pointers lpp. When the node referenced by nodePtr does not contain a morpheme, then, in step 3946, the penalty is incremented by the missing character penalty and control flows to step 3936, at which the routine "navigate" is called. In the for-loop of steps 3940-3944, the relative coordinate cd for each considered letter separator within the text line is computed, in step 3941, a corresponding traversal-path pointer is computed in step 3942, and the relative coordinate cd is entered into the set lsicp and the computed next path pointer is entered into the set lpp, in step 3943, after which numP is incremented.

Figure 39D:
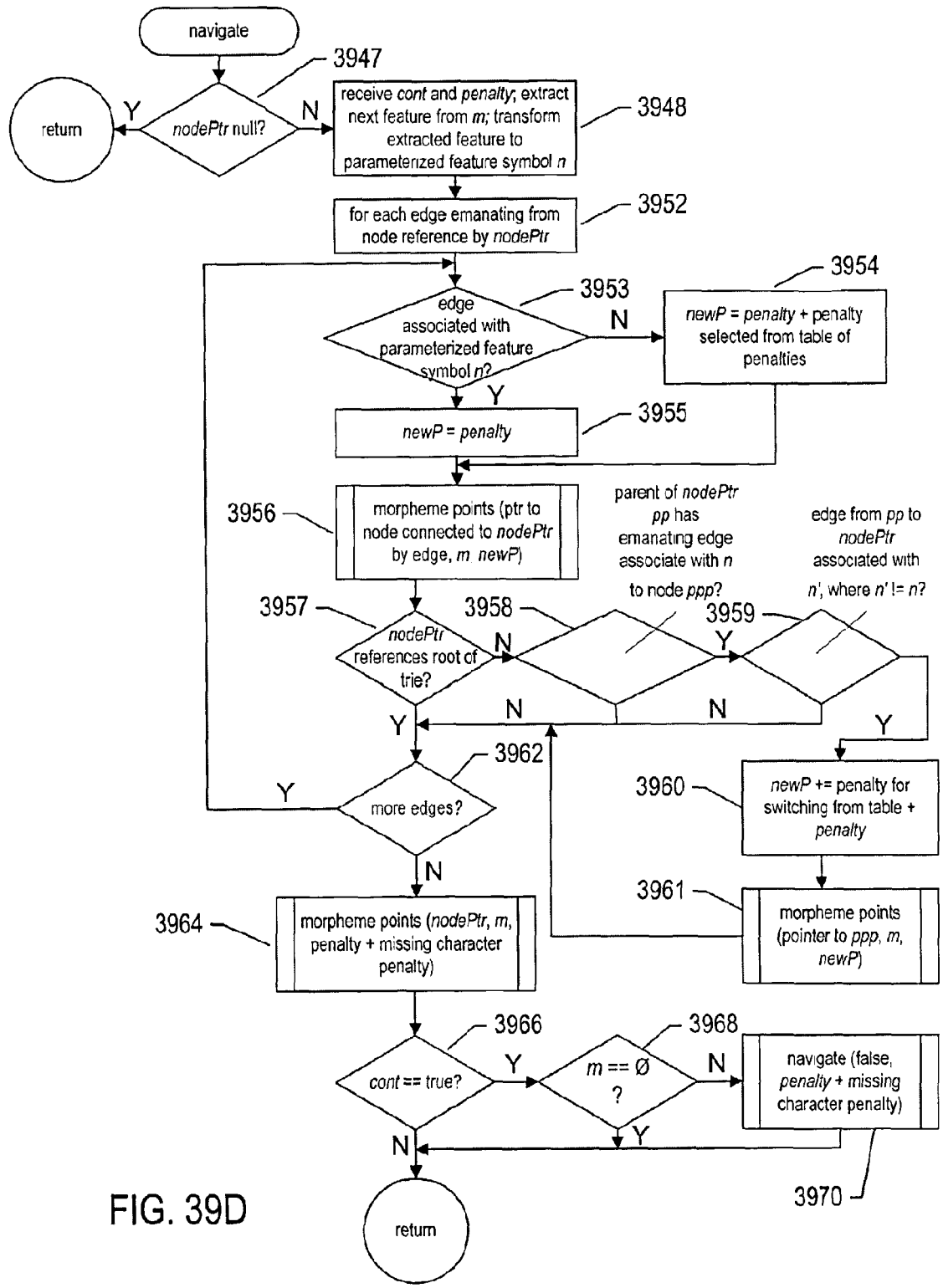

FIG. 39D provides a control-flow diagram for the routine "navigate" called in step 3936 of FIG. 39C. In step 3947, the routine "navigate" determines whether nodePtr is a null pointer. When the nodePtr is null, the routine terminates. In step 3948, the routine "navigate" receives a Boolean argument cont and a current-penalty argument penalty. The Boolean argument cont indicates whether or not this is the first of two successive calls to the routine "navigate." Also in step 3948, the routine "navigate" extracts a next feature from the current morpheme m and transforms the extracted feature first to an FSWAP and then to a standard feature symbol, as discussed above with reference to FIGS. 31A-M and 34. In the for-loop of steps 3952-3962, the routine "navigate" traverses each edge emanating from the trie node referenced by variable nodePtr and calls the routine "morpheme points," essentially recursively, for the node reached via the edge from the trie node currently referenced by variable nodePtr. When the currently considered edge is associated with the standard feature symbol n corresponding to the feature extracted from the morpheme in step 3948, as determined in step 3953, then the variable newP is set to the current penalty in step 3955. Otherwise, the variable newP is set to the current penalty plus a symbol-exchange penalty selected from a table of penalties, such as that shown in FIG. 37A. In step 3956, the routine "morpheme points" is recursively called to continue the trie traversal. When at least one standard feature symbol has been considered in the current traversal, as determined in step 3957, when the previously considered node pp, the parent of the node referenced by nodePtr, has an edge associated with standard feature symbol n connecting node pp to a node ppp, as determined in step 3958, and when the edge connection node pp with the node referenced by nodePtris associated with a standard feature symbol n' that is not equal to n, as determined in step 3959, then the variable newP is set to the current penalty o then the variable newP is set to the current penalty in step 3955 plus a penalty for inverting n' and n, obtained from a table of penalties such as that shown in FIG. 37B, in step 3960 and the routine "morpheme points" is recursively called in step 3961. When there are more edges emanating from the trie node referenced by variable nodePtr, as determined in step 3962, control flows back to step 3952. Otherwise, the routine "morpheme points" is again called, in step 3964, with the current nodePtr, but with a new penalty increased by the missing-character penalty, representing missing characters in subsequently considered trie entries. When the Boolean variable cont is true, as determined in step 3966, and when the currently considered morpheme m is not empty, as determined in step 3968, then the routine "navigate" is again called, in step 3970, this time with the Boolean argument FALSE, to continue the search assuming a missing character in any subsequently considered trie entries. A combination of the routines "morpheme points" and "navigate" carry out a recursive non-exhaustive, threshold-based search of the trie, as discussed above with reference to FIGS. 36A-G.

The implementation illustrated in FIGS. 39A-D assumes, for the sake of clarity and simplicity of illustration, that each sequence of standard feature symbols stored in the trie-like data structure is unique, without regard to the placement of letter-separators within the sequence. However, it may be the case that different patterns of letter-separator standard feature symbols within a sequence of non-letter-separator standard feature symbols may represent alternative representations of a word or morpheme or different words or morphemes. In this case, each node of the trie may include multiple sequences of standard feature symbols, all containing the same sequence of non-letter-separator standard feature symbols but representing different divisions of that sequence of non-letter-separator standard feature symbols into characters or symbols by different patterns of letter-separator standard feature symbols within the multiple sequences of standard feature symbols. When a node is identified as corresponding to an input sequence of FSWAPs, inter-character division points and path-traversal pointers for all of the sequence of standard feature symbols are accumulated for the input sequence of FSWAPs.

Although the present invention has been described in terms of particular embodiments, it is not intended that the invention be limited to these embodiments. Modifications within the spirit of the invention will be apparent to those skilled in the art. For example, any of many different implementation and design parameters, including programming language, control structures, modular organization, data structures, and other such implementation and design parameters may be varied to provide alternative embodiments of the present invention. As discussed above, although the trie data structure is convenient for identifying well-known morphemes and/or words corresponding to a morpheme or word identified in a text line, other types of searchable data structures may be used in alternative implementations. As also discussed above, while the FSWAP set and standard-feature-symbol set discussed above with reference to FIGS. 32 and 34 are used in one implementation directed to OCR processing of Arabic-language text, alternative feature-symbol sets and standard-feature-symbol sets may be used both for Arabic and other Arabic-like languages. The currently disclosed systems and methods may be additionally applied to cursive handwriting and handwriting-like text in languages including English and Russian.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A system that transforms a document image into an electronic document, the system comprising:
   one or more processors;
   one or more electronic memories; and
   a hierarchically organized data structure, stored in one or more of the one or more electronic memories, the hierarchically organized data structure comprising a plurality of entries corresponding to one or more natural-language entities selected from among one or more morphemes, words, or phrases encoded as sequences of standard feature symbols, wherein the plurality of entries are associated with a plurality of scores; and computer instructions, digitally encoded and stored in one or more of the one or more electronic memories and executed on the one or more processors, that:

receive an image comprising text of a language;

identify a subimage within the image, the subimage corresponding to one or more of words and morphemes;

identify a set of character-sequences that represent candidate character-sequence representations of the subimage, wherein a character-sequence of the set is identified by traversing a path of the hierarchically organized data structure and accumulating a value for the character-sequence based on the scores on the path, wherein the value for the character-sequence in the set satisfies a predetermined threshold;

use the candidate character-sequence representations of the subimage as hypotheses regarding lexical identities of the subimage;

construct a portion of an electronic document corresponding to the received image of text using the hypotheses regarding the lexical identities of the subimage; and store the constructed portion of the electronic document in one or more of the one or more electronic memories.

2. The system of claim 1 wherein the language comprises at least one of Arabic, Persian, Pashto, Urdu, Devanagari, Hindi, Korean, or a Turkish language.

3. The system of claim 1 wherein the image comprising text is a digital encoding of a scanned or otherwise imaged block of text that is stored in one or more of the one or more electronic memories.

4. The system of claim 1 wherein the computer instructions, executed on the one or more processors, identify the set of character-sequences that represent candidate character-sequence representations of the subimage by:

transforming the subimage into a sequence of feature symbols with associated parameters, each feature symbol associated with no, one, two, or more than two parameters and each feature symbol with associated parameters corresponding to a text-line feature;

storing the sequence of feature symbols with associated parameters in one or more of the one or more electronic memories;

using the sequence of feature symbols with associated parameters to identify candidate words, candidate morphemes, or candidate words and morphemes corresponding to the subimage that are encoded as sequences of standard feature symbols within the hierarchically organized data structure;

using the identified candidate words to determine and store, in one or more of the one or more electronic memories, probable inter-character division points and traversal paths for the subimage;

using the probable inter-character division points and traversal paths for the subimage to generate candidate traversal paths for the subimage; and generating the set of character-sequences that represent candidate character-sequence representations of the subimage from the candidate traversal paths.

5. The system of claim 4 wherein the hierarchically organized data structure comprises:

a root node; and
direct and descendent nodes of the root node;
wherein
each descendent node is linked to a parent node by a link, the link representing a standard feature symbol, and
each node contains, or is associated with, at least one sequence of standard feature symbols.

6. The system of claim 5 wherein the computer instructions, executed on the one or more processors, use the sequence of feature symbols with associated parameters to identify candidate words, candidate morphemes, or candidate words and morphemes corresponding to the subimage that are encoded as sequences of standard feature symbols within the hierarchically organized data structure by:

traversing the hierarchically organized data structure, according to the sequence of feature symbols with associated parameters, to identify candidate nodes of the hierarchically organized data structure.

7. The system of claim 6 wherein the computer instructions, executed on the one or more processors, traverse the hierarchically organized data structure, according to the sequence of feature symbols with associated parameters, to identify candidate nodes of the hierarchically organized data structure by:

setting the value to a penalty value comprising an initial value; and recursively traversing the hierarchically organized data structure from the root node downward, accumulating a current penalty associated with each node in each traversal path through the hierarchically organized data structure, to identify candidate nodes as those nodes for which the accumulated penalty value is less than a threshold penalty value.

8. The system of claim 7 wherein the current penalties include:

a substitution mismatch penalty;

an inversion mismatch penalty for reversing the order of two adjacent feature symbols with associated parameters or standard feature symbols;

a missing-feature-symbol mismatch penalty; and a missing-standard-feature-symbol mismatch penalty.

9. The system of claim 6 wherein the computer instructions, executed on the one or more processors, use the identified candidate nodes to determine and store, in one or more of the one or more electronic memories, probable inter-character division points and traversal paths for the subimage by:

initializing a set of traversal-path pointers and a set of inter-character division points; and for each identified candidate node,
for each sequence of standard feature symbols within the candidate node,
for each letter-separator standard feature symbol in the sequence of standard feature symbols,
determining a relative position within the subimage corresponding to the letter-separator standard feature symbol,
adding the determined relative position to the set of inter-character division points, and
adding a previous relative position and the determined relative position to the set of traversal-path pointers.

10. The system of claim 9 wherein the computer instructions, executed on the one or more processors, use the probable inter-character division points and traversal paths for the subimage to generate candidate traversal paths for the subimage by:

constructing possible traversal paths that traverse the subimage from a first end to a second end as a set of traversal steps, each traversal step corresponding to a traversal-path pointer from the traversal-path pointers.

11. A method comprising:
receiving, by one or more processors, an image comprising text of a language;
identifying a subimage within the image, the subimage corresponding to one or more of words and morphemes;
identifying a set of character-sequences that represent candidate character-sequence representations of the subimage, wherein a character-sequence of the set is identified by traversing a path of the hierarchically organized data structure and accumulating a value for the character-sequence based on the scores on the path, wherein the value for the character-sequence in the set satisfies a predetermined threshold;
using the candidate character-sequence representations of the subimage as hypotheses regarding the lexical identities of the subimage;
constructing a portion of an electronic document corresponding to the received image comprising text using the hypotheses regarding the lexical identities of the subimages; and
storing the constructed portion of the electronic document in one or more of the one or more electronic memories.

12. The method of claim 11 wherein the language is one of Arabic, Persian, Pashto, Urdu, Devanagari, Hindi, Korean, or a Turkish language.

13. The method of claim 11 wherein the image comprising text is a digital encoding of a scanned or otherwise imaged block of text that is stored in one or more of the one or more electronic memories.

14. The method of claim 11 wherein identifying the set of character-sequences that represent candidate character-sequence representations of the subimage further comprises:
transforming the subimage into a sequence of feature symbols with associated parameters, each feature symbol with associated parameters associated with no, one, two, or more than two parameters and each feature symbol with associated parameters corresponding to one, two, or more strokes, loops, diacritical marks, or other text-line features;
storing the sequence of feature symbols with associated parameters in one or more of the one or more electronic memories;
using the sequence of feature symbols with associated parameters to identify candidate words, candidate morphemes, or candidate words and morphemes corresponding to the subimage that are encoded as sequences of standard feature symbols within the hierarchically organized data structure;
using the identified candidate words to determine and store, in one or more of the one or more electronic memories, probable inter-character division points and traversal paths for the subimage;
using the probable inter-character division points and traversal paths for the subimage to generate candidate traversal paths for the subimage; and
generating the set of character-sequences that represent candidate character-sequence representations of the subimage from the candidate traversal paths.

15. The method of claim 14 wherein the hierarchically organized data structure comprises:
a root node; and
direct and descendent nodes of the root node;
wherein
each descendent node is linked to a parent node by a link, the link representing a standard feature symbol, and
each node contains, or is associated with, at least one sequence of standard feature symbols.

16. The method of claim 15 wherein using the sequence of feature symbols with associated parameters to identify candidate words, candidate morphemes, or candidate words and morphemes corresponding to the subimage that are encoded as sequences of standard feature symbols within the hierarchically organized data structure further comprises:
traversing the hierarchically organized data structure, according to the sequence of feature symbols with associated parameters, to identify candidate nodes of the hierarchically organized data structure.

17. The method of claim 16 wherein traversing the hierarchically organized data structure, according to the sequence of feature symbols with associated parameters, to identify candidate nodes of the hierarchically organized data structure further comprises:
setting the value to a penalty value comprising an initial value; and
recursively traversing the hierarchically organized data structure from the root node downward, accumulating a current penalty associated with each node in each traversal path through the hierarchically organized data structure, to identify candidate nodes as those nodes for which the accumulated penalty value is less than a threshold penalty value.

18. The method of claim 17 wherein the current penalties include:
a substitution mismatch penalty;
an inversion mismatch penalty for reversing the order of two adjacent feature symbols with associated parameters or standard feature symbols;
a missing-feature-symbol mismatch penalty; and
a missing-standard-feature-symbol mismatch penalty.

19. The method of claim 16 wherein using the identified candidate nodes to determine and store, in one or more of the one or more electronic memories, probable inter-character division points and traversal paths for the subimage further comprises:
initializing a set of traversal-path pointers and a set of inter-character division points; and
for each identified candidate node,
for each sequence of standard feature symbols within the candidate node,
for each letter-separator standard feature symbol in the sequence of standard feature symbols,
determining a relative position within the subimage corresponding to the letter-separator standard feature symbol,
adding the determined relative position to the set of inter-character division points, and
adding a previous relative position and the determined relative position to the set of traversal-path pointers.

20. The method of claim 19 wherein using the probable inter-character division points and traversal paths for the subimage to generate candidate traversal paths for the subimage further comprises:
constructing possible traversal paths that traverse the subimage from a first end to a second end as a set of traversal steps, each traversal step corresponding to a traversal-path pointer from the traversal-path pointers.

* * * * *